May 21, 1963  A. J. MALAVAZOS  3,090,554
CALCULATING MACHINE
Filed May 18, 1961  18 Sheets-Sheet 1

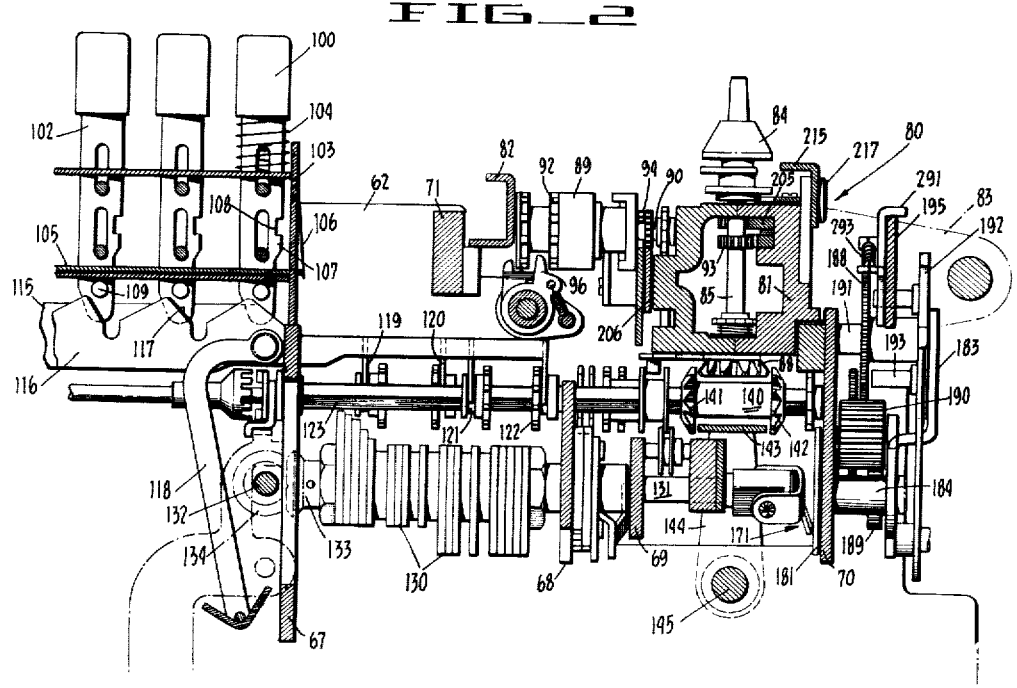

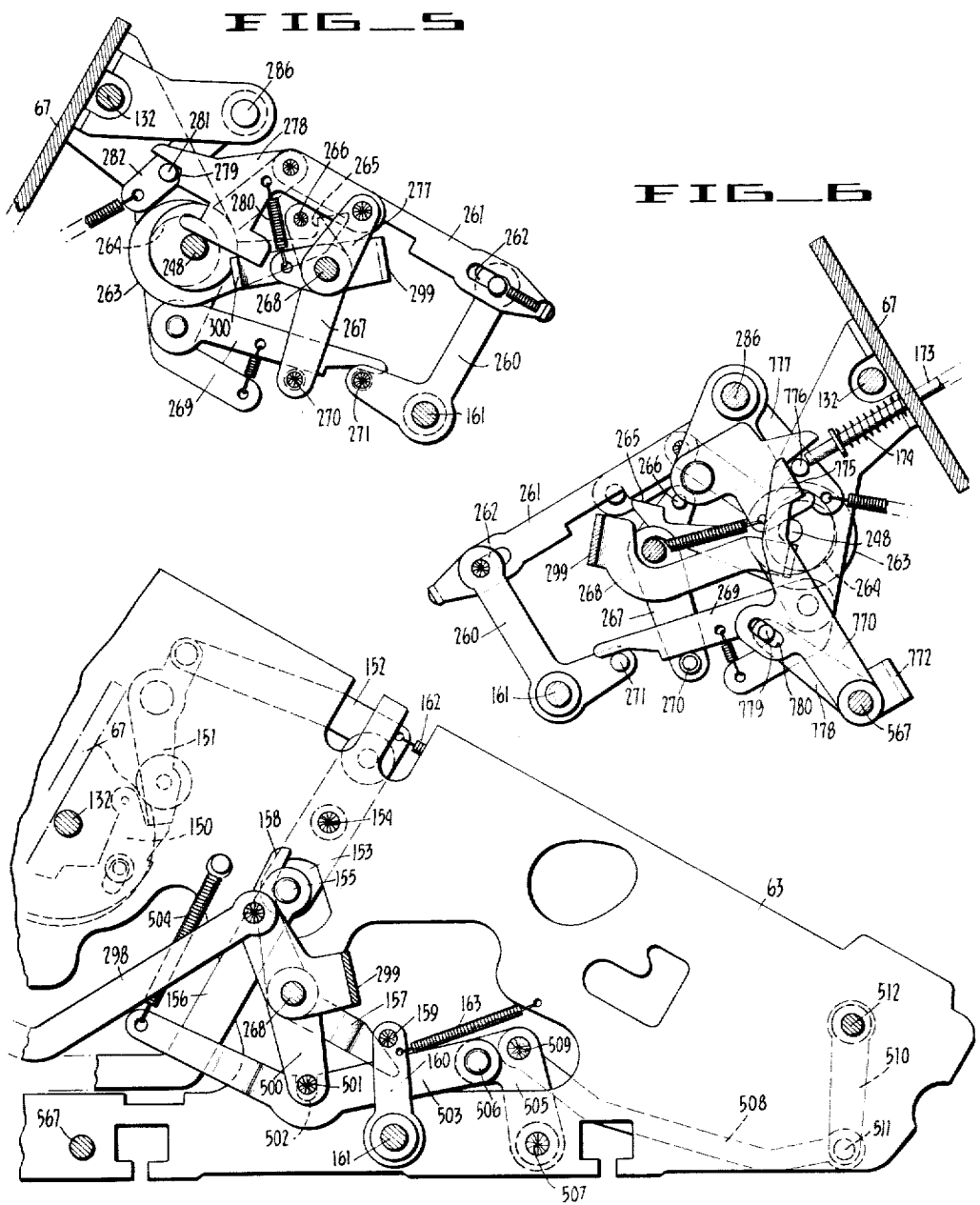

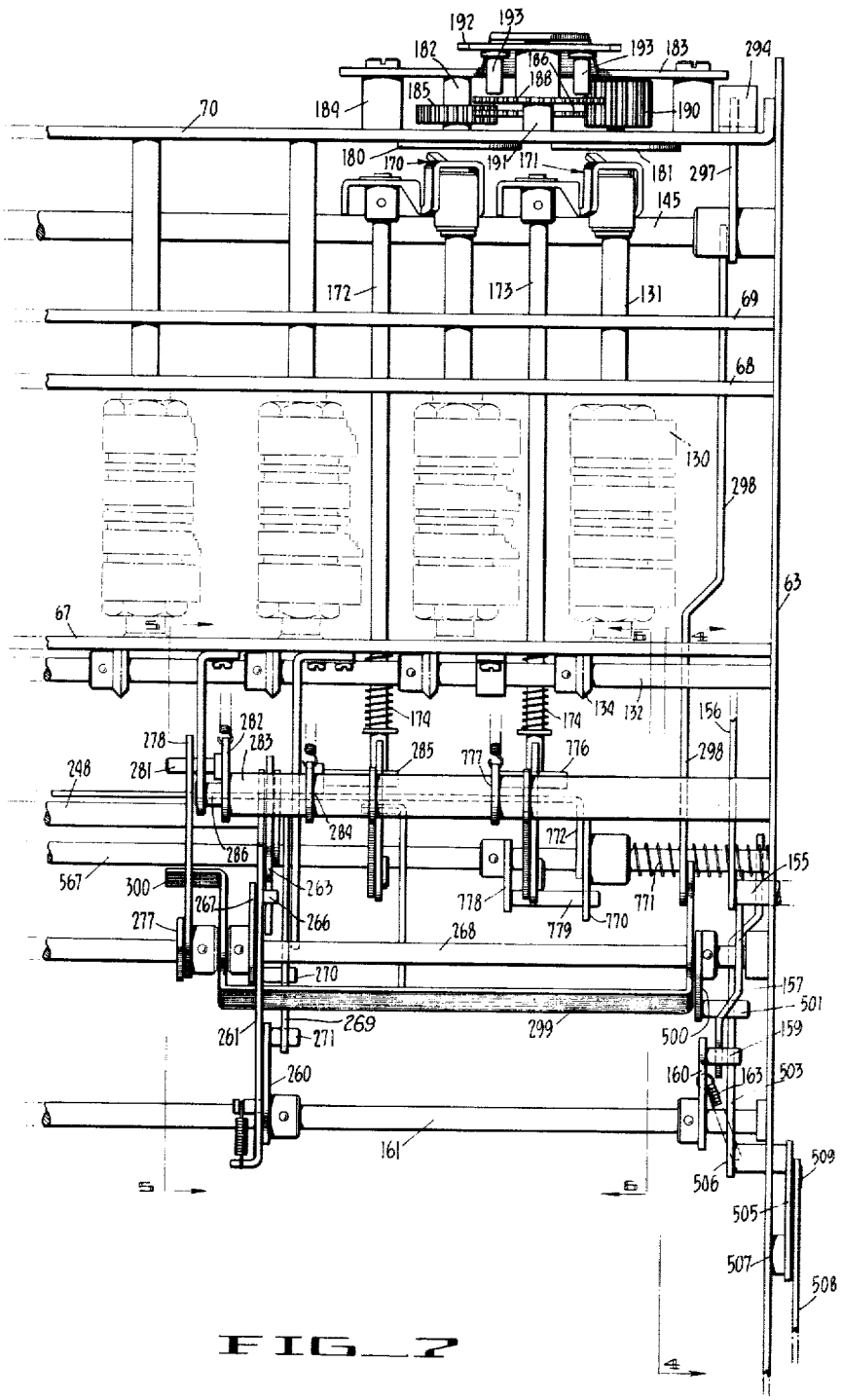
FIG_2

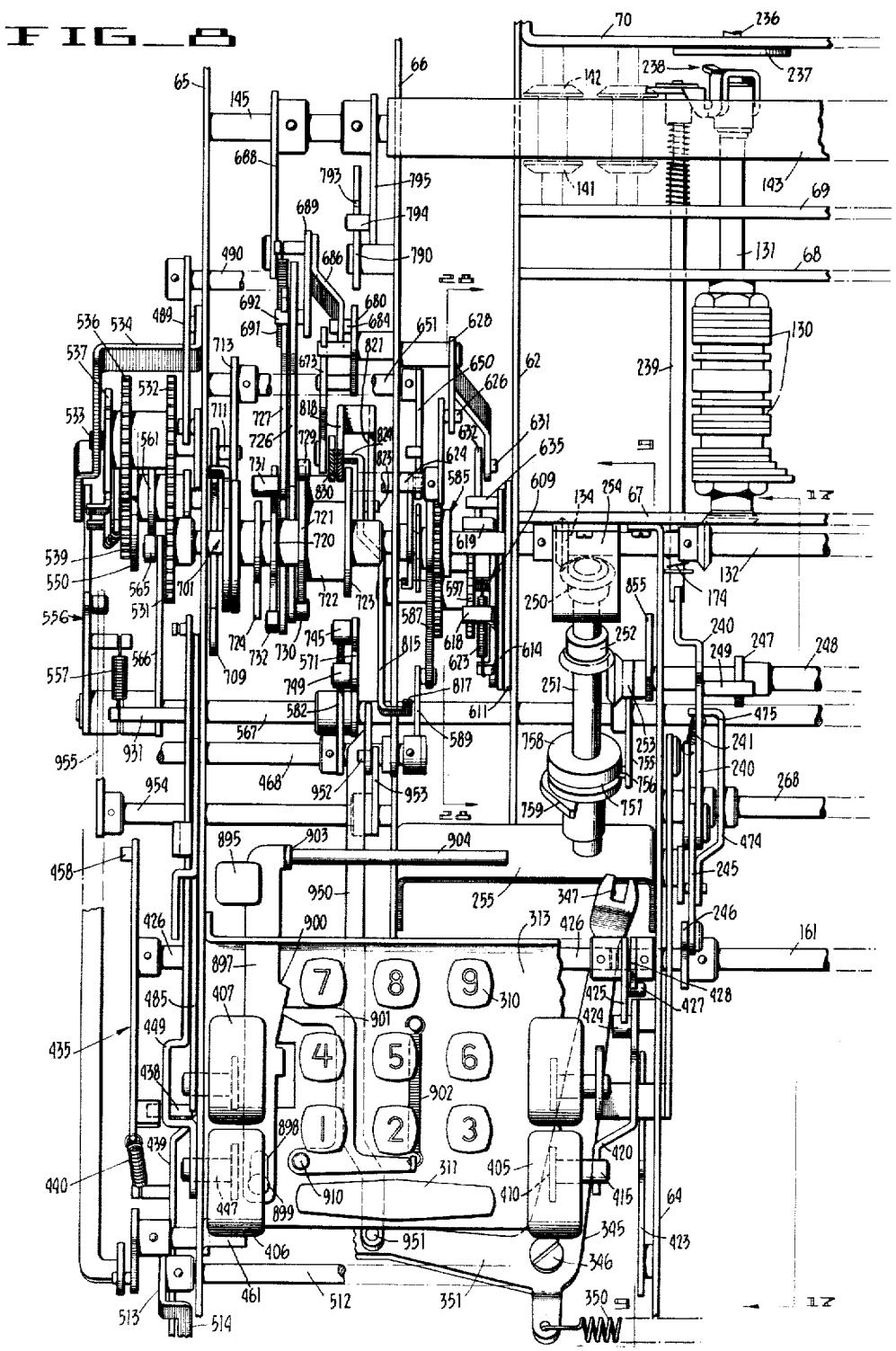

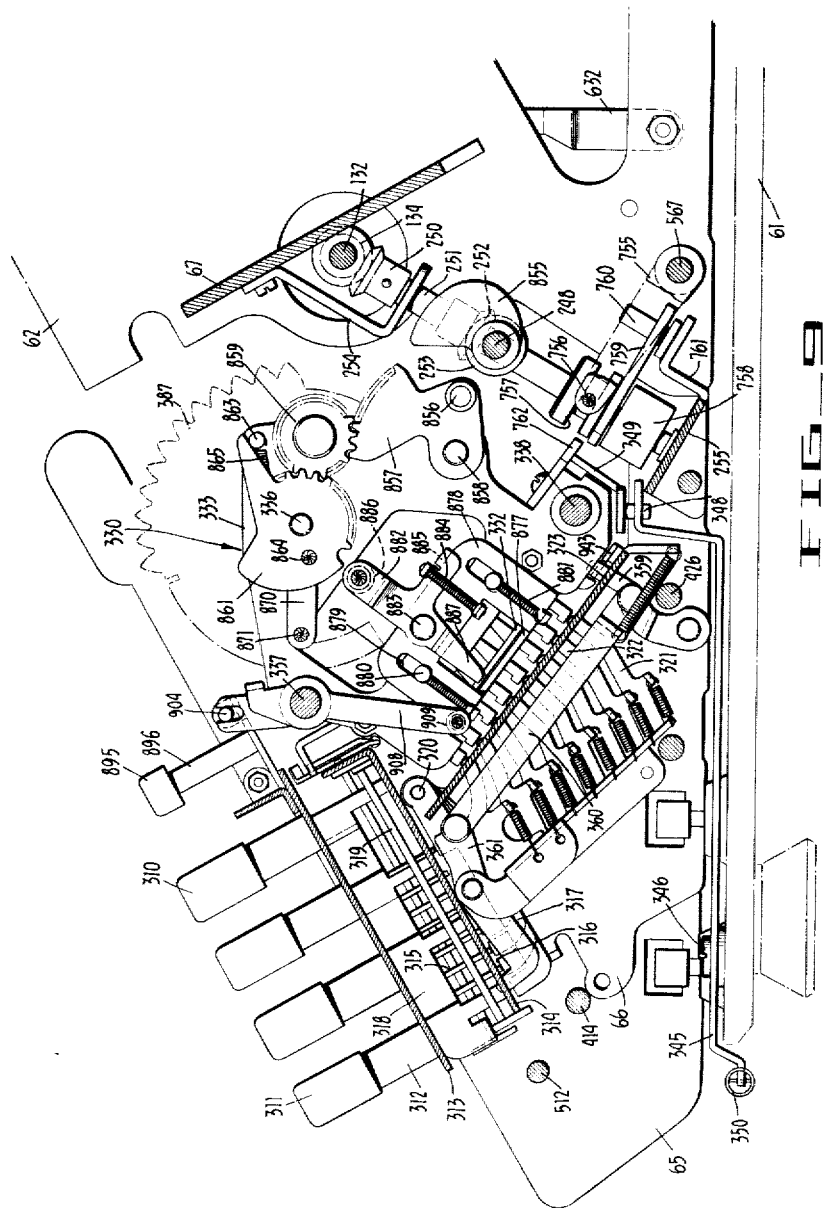

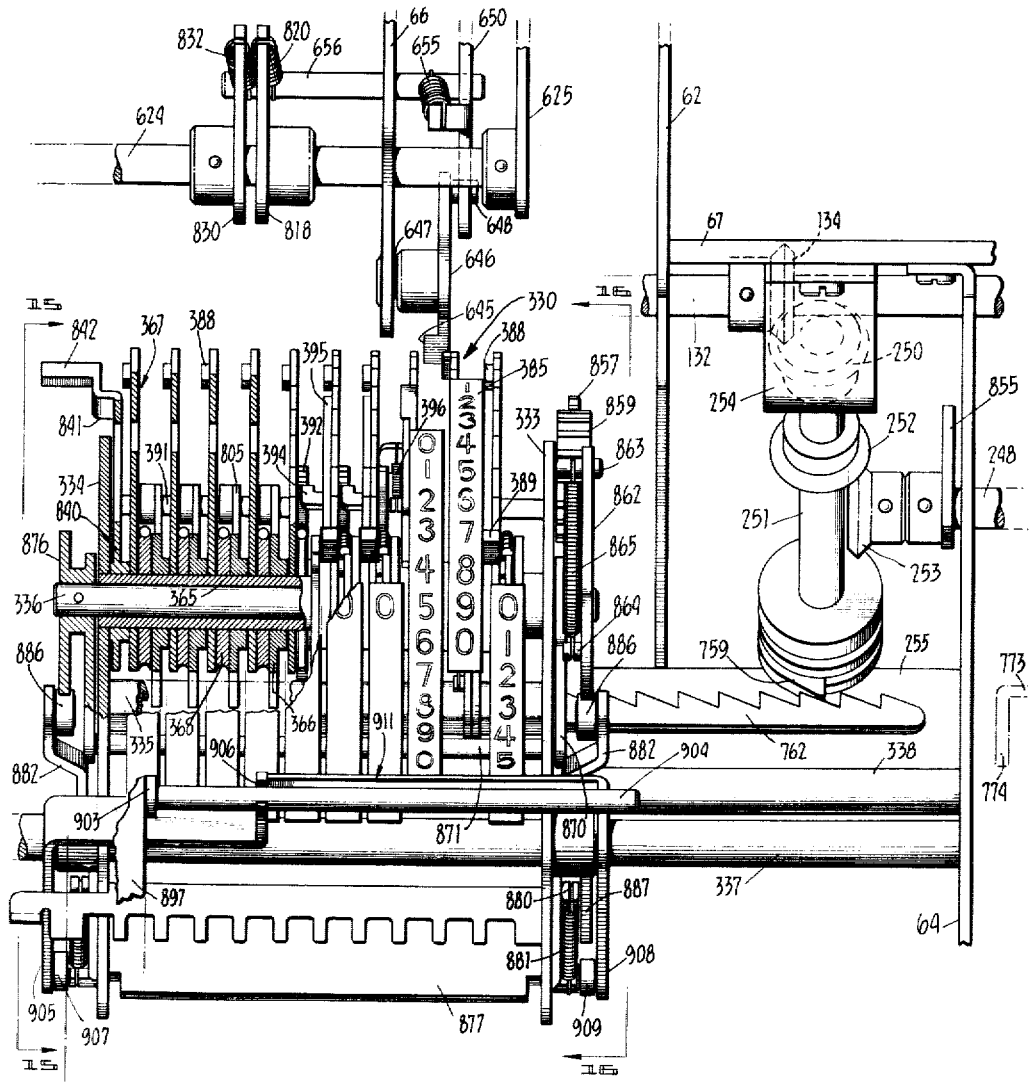
FIG_10

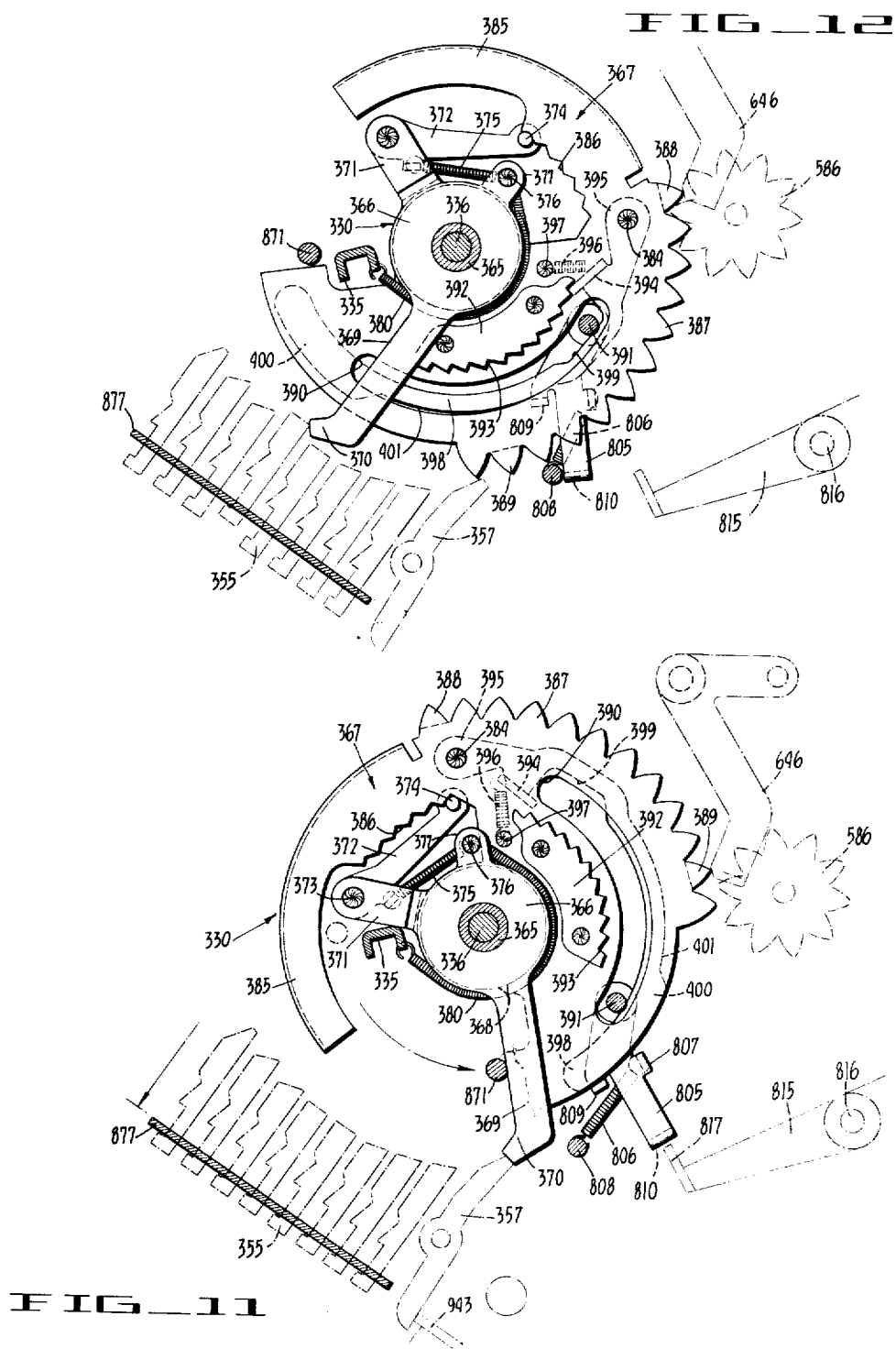

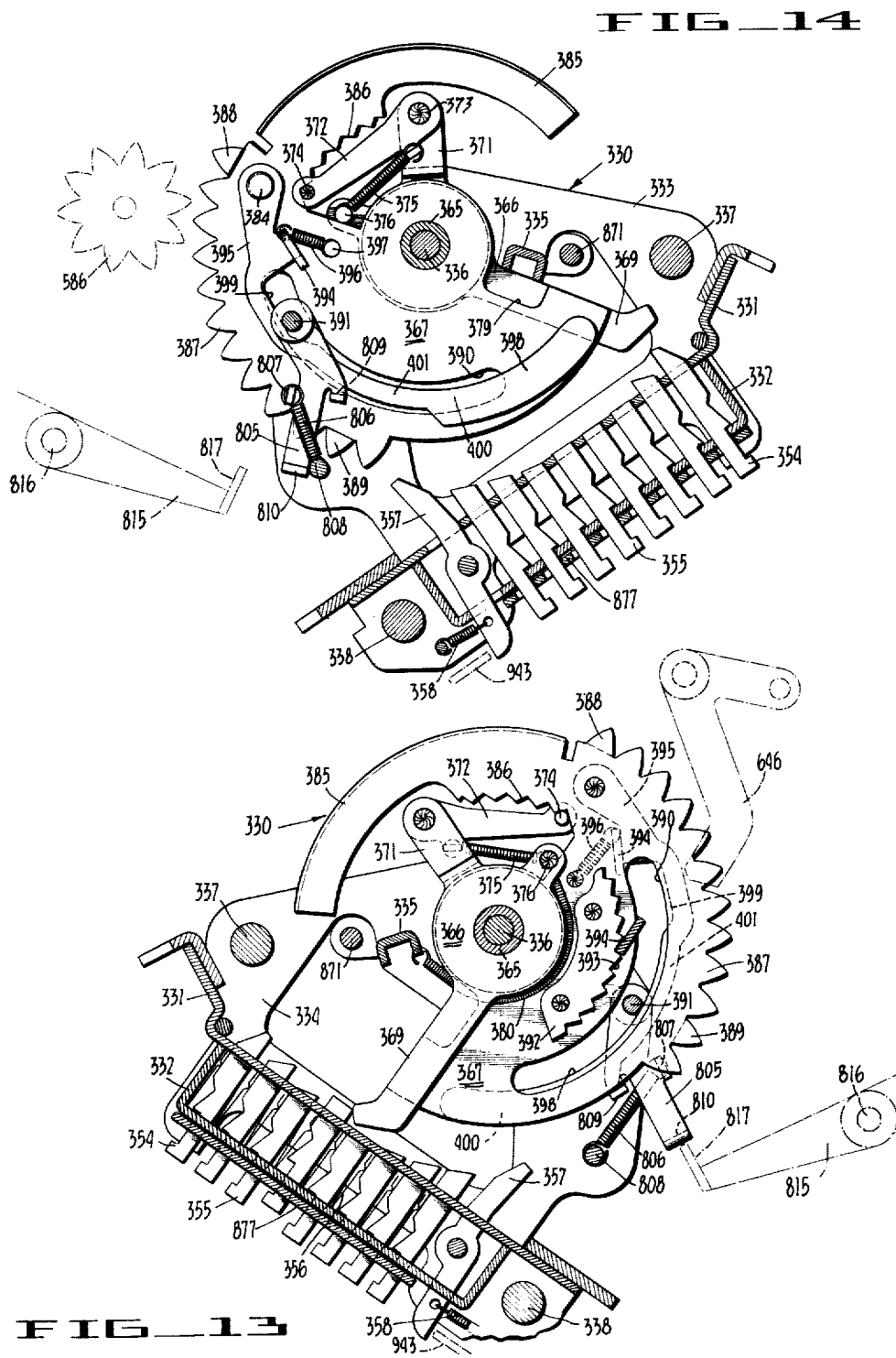

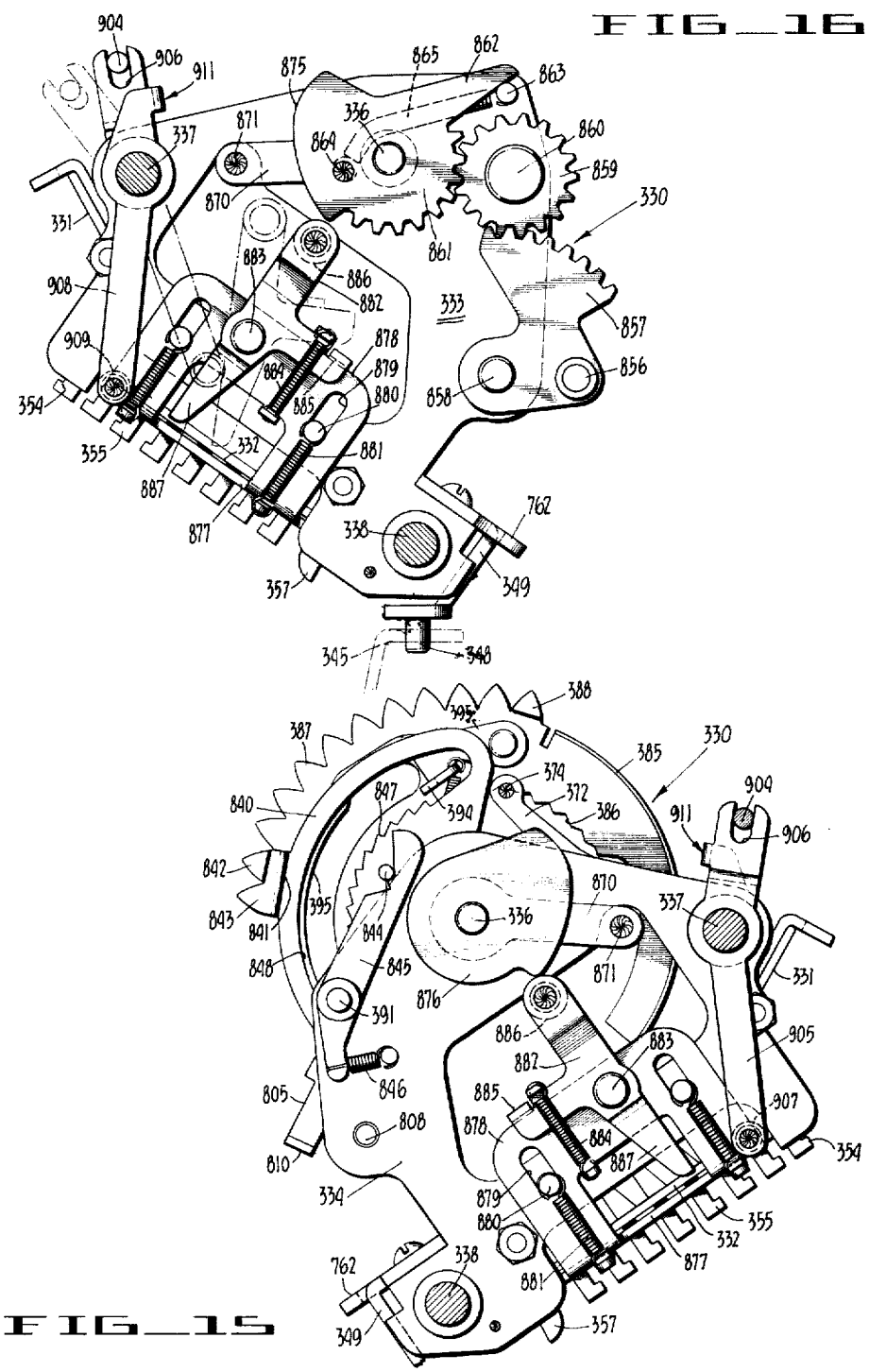

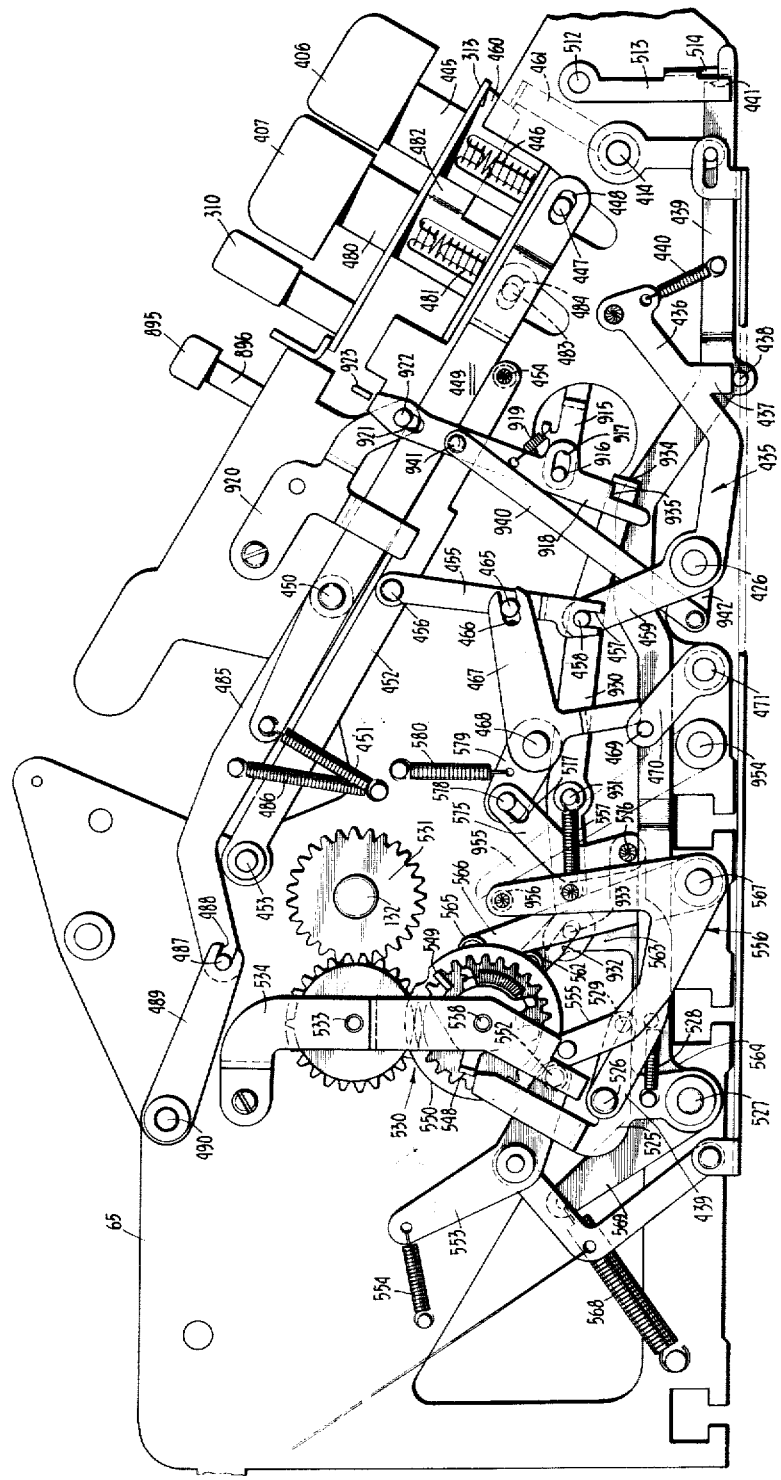

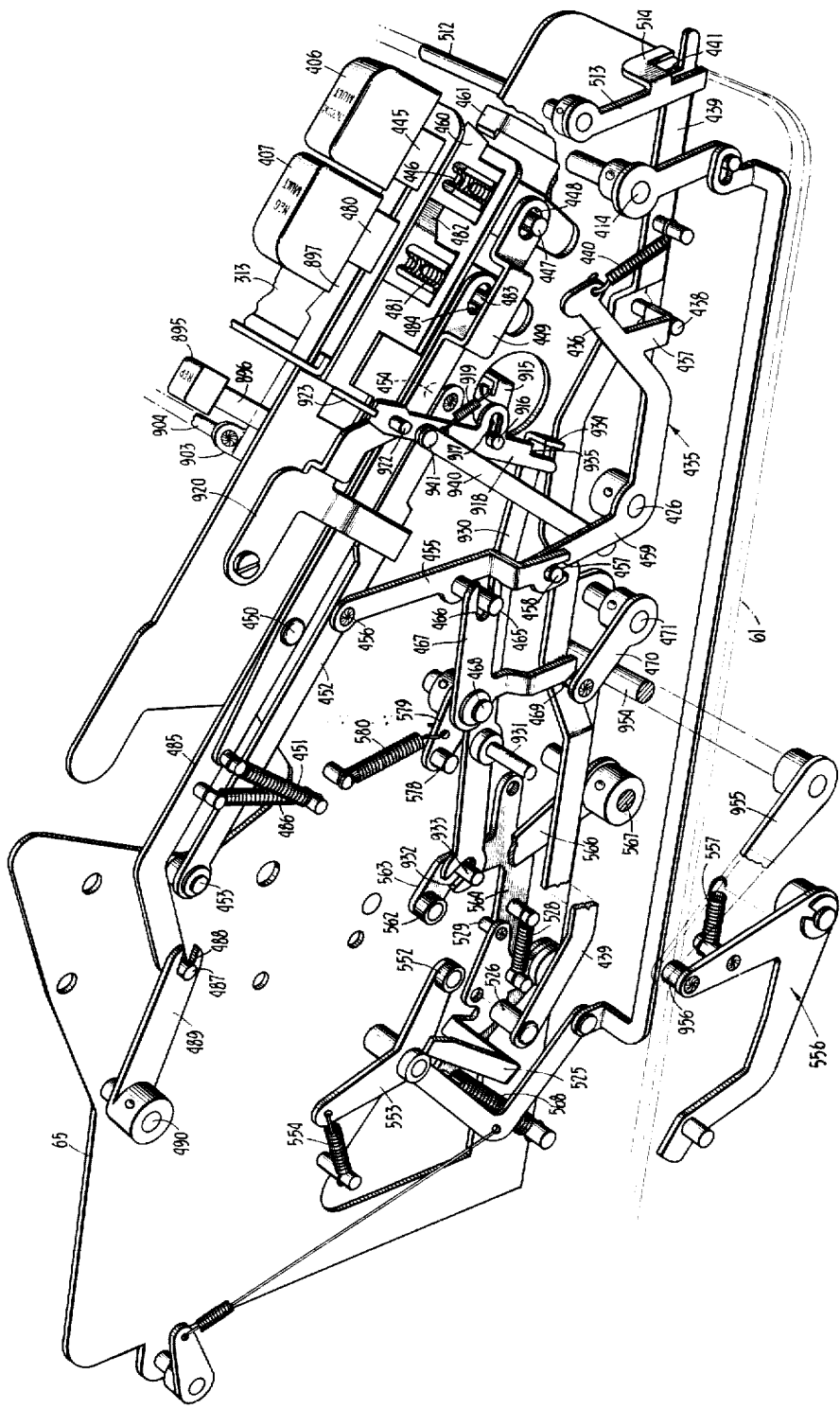

May 21, 1963  A. J. MALAVAZOS  3,090,554
CALCULATING MACHINE
Filed May 18, 1961  18 Sheets-Sheet 14
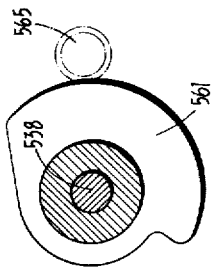
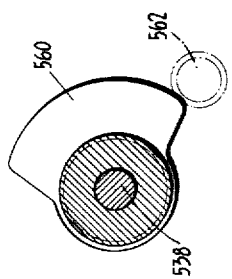
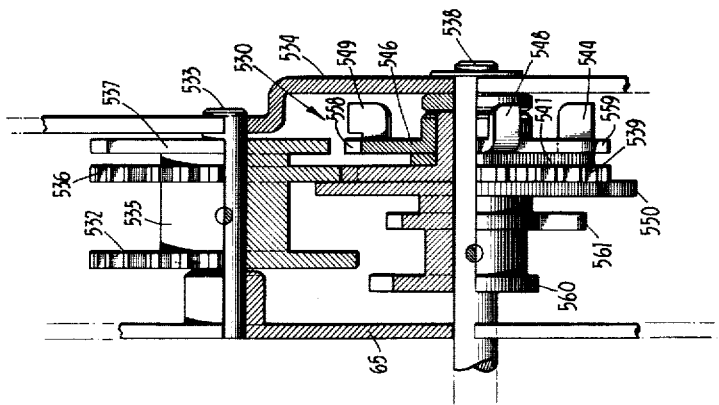
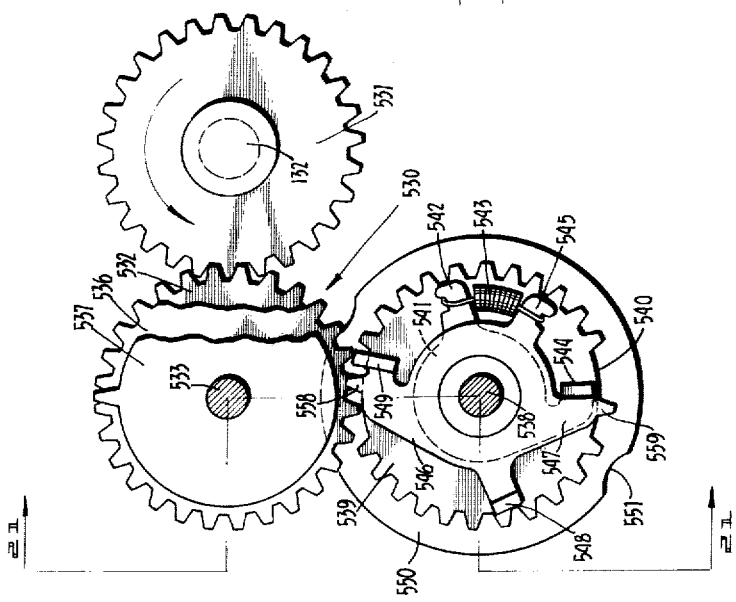

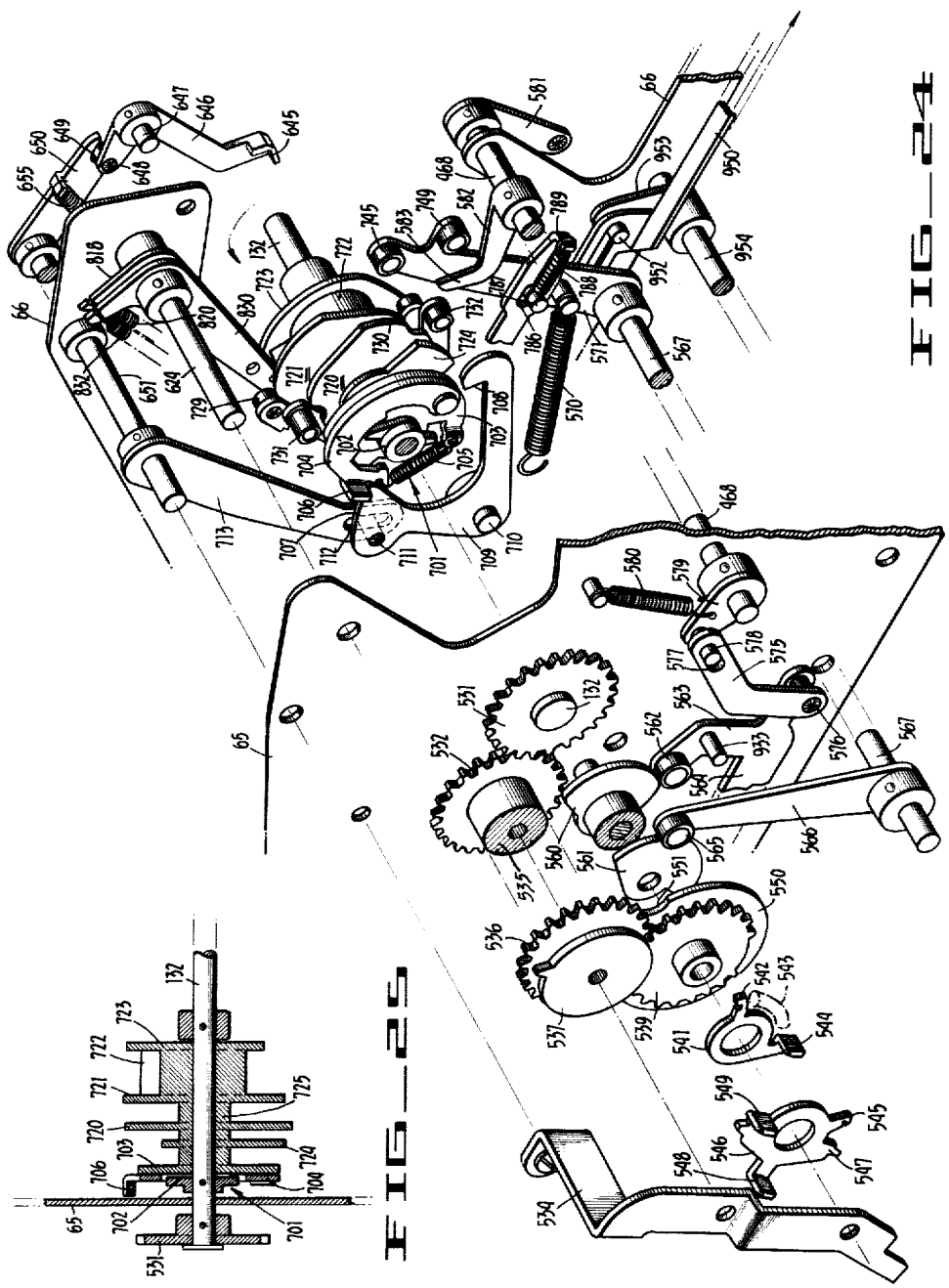

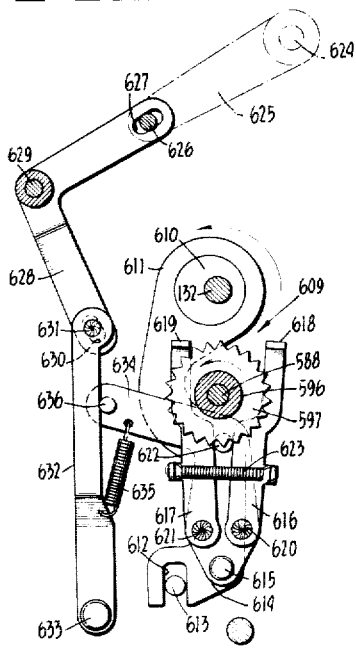
FIG_28
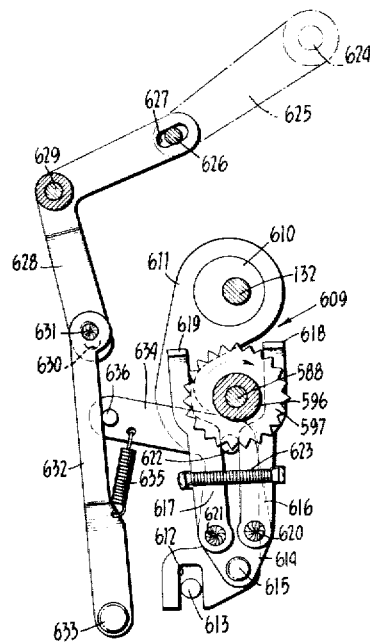
FIG_29
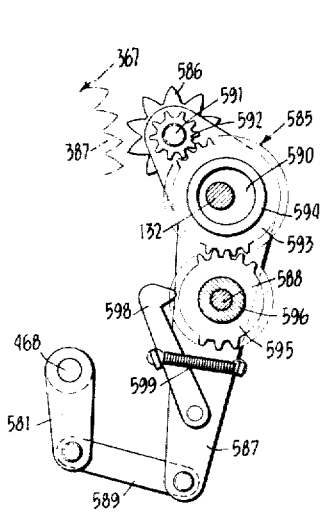
FIG_26
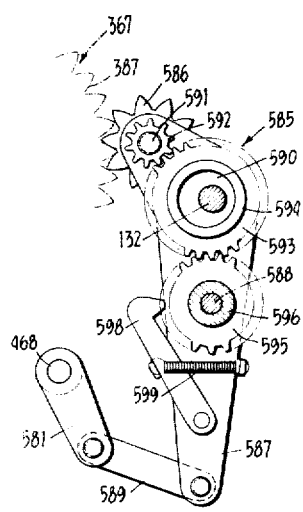
FIG_27

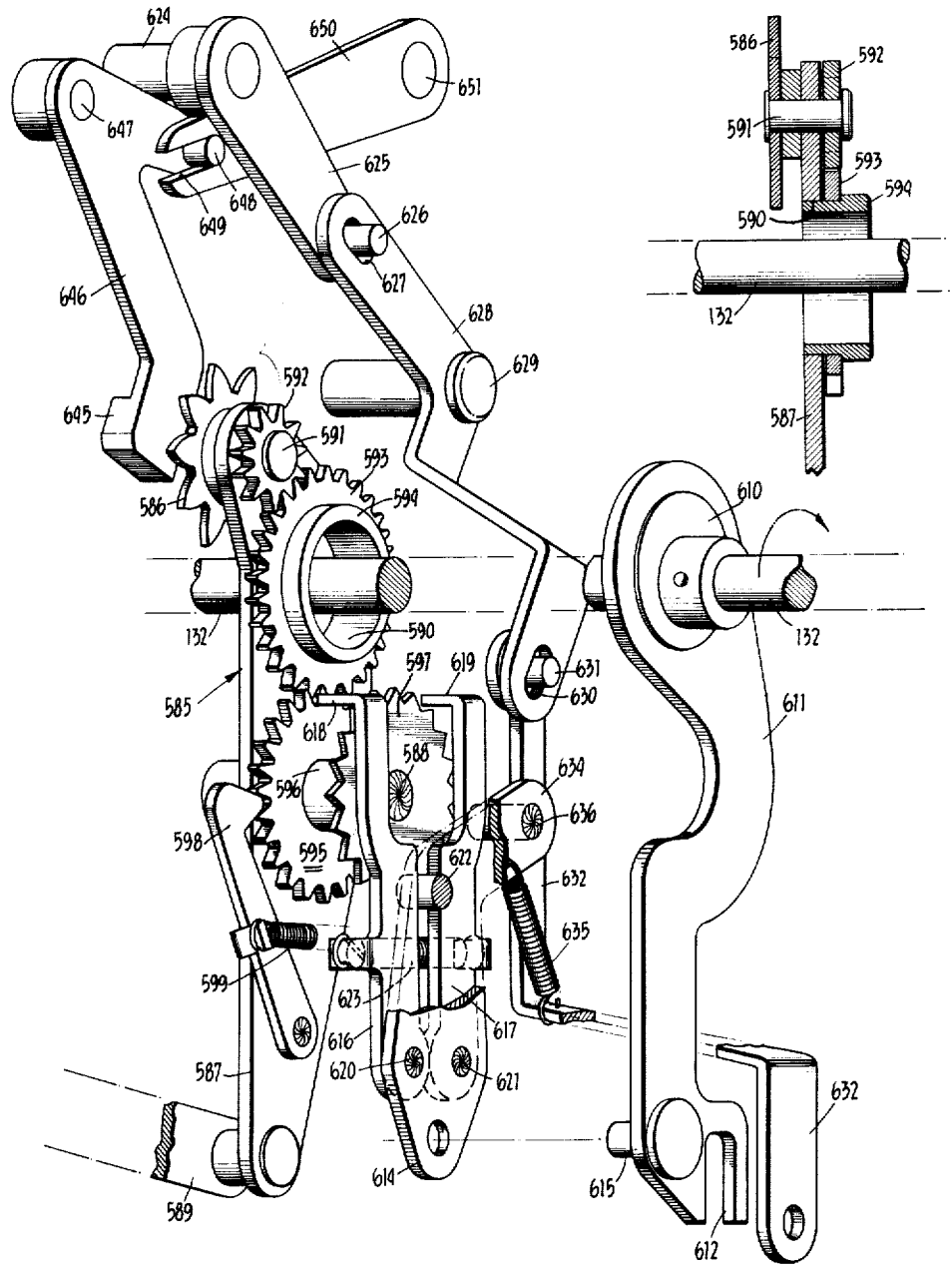

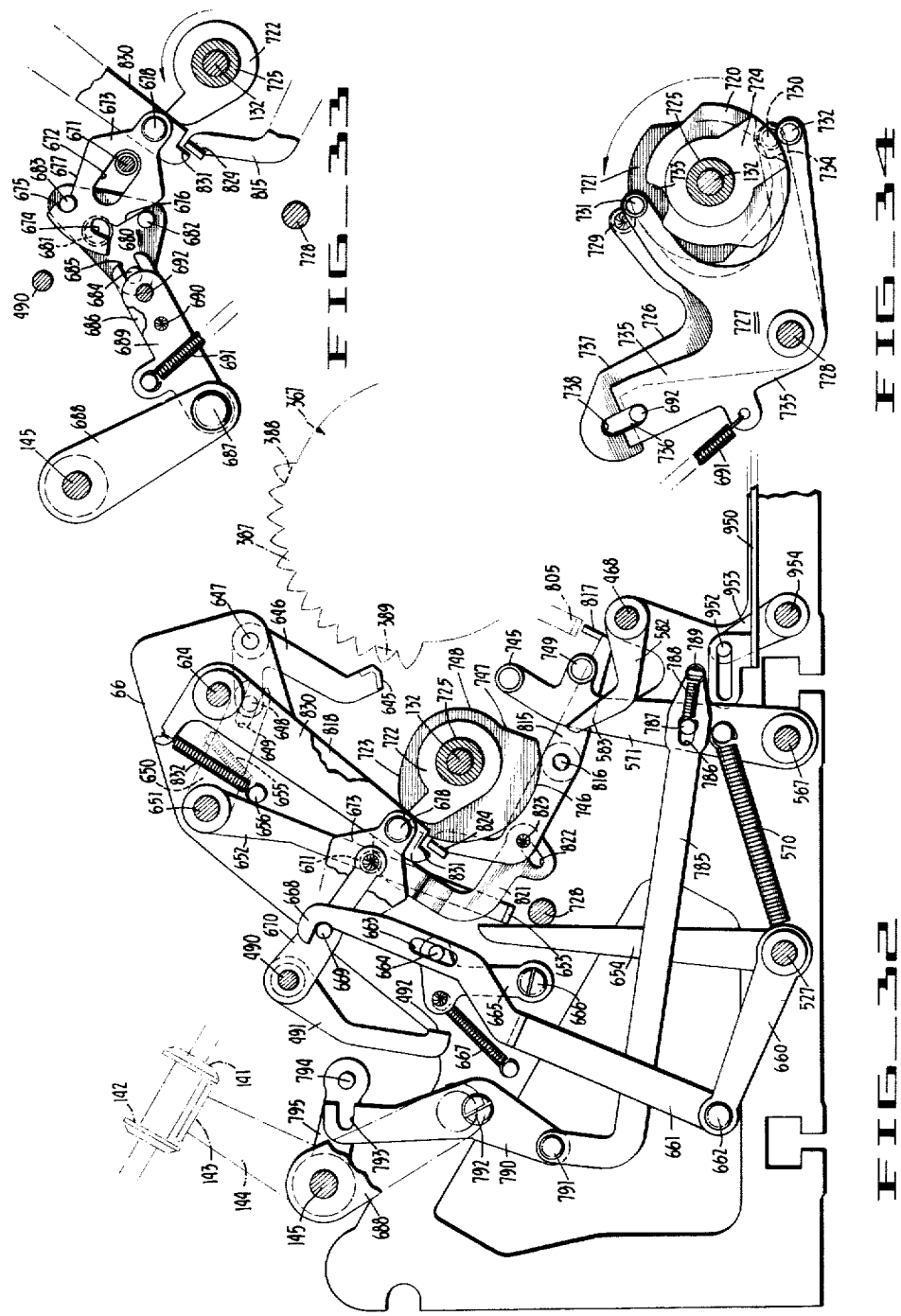

United States Patent Office 3,090,554
Patented May 21, 1963

3,090,554
CALCULATING MACHINE
Arthur J. Malavazos, Hayward, Calif., assignor to Friden, Inc., a corporation of California
Filed May 18, 1961, Ser. No. 110,960
11 Claims. (Cl. 235—63)

TABLE OF CONTENTS

| | Column |
|---|---|
| I. PRIOR ART CALCULATOR MECHANISMS | 7 |
|   A. Machine Frame | 8 |
|   B. Register Carriage | 8 |
|   C. Tens Transfer Mechanism | 9 |
|   D. Selection Mechanism | 9 |
|   E. Accumulator Drive | 10 |
|   F. Carriage Shift | 11 |
|   G. Register Clearing Mechanism | 12 |
|   H. Automatic Shifting Mechanism | 14 |
|   I. Shift Terminating Mechanism | 15 |
| II. MULTIPLICATION MECHANISM | 16 |
|   1. Multiplier Selection | 16 |
|     (a) Multiplier Keyboard | 17 |
|     (b) Shiftable Pin Carriage | 17 |
|     (c) Multiplier Control Segments | 18 |
|   2. Operation Control Keys | 20 |
|     (a) Multiplication With Clearing ("MULT" Key 405) | 21 |
|     (b) Multiplication Without Clearing (The "ACCUM MULT" Key 406) | 22 |
|     (c) Subtractive Multiplication, Without Clearing ("NEG MULT" Key 407) | 23 |
|   3. Initiation of Multiplication | 24 |
|   4. Multiplication Programming Mechanism | 25 |
|     (a) Program Clutch and Cams | 25 |
|     (b) Programming Mechanism | 28 |
|       (1) Feed Mechanism | 28 |
|       (2) Condition "O" Sensing Mechanism for Operation | 30 |
|       (3) Set Sign Character of Multiplication Operation | 31 |
|     (c) Shift Mechanism | 35 |
|       (1) Disable Segment Feed Mechanism | 36 |
|       (2) Multiplier Carriage Shift | 36 |
|       (3) Register Carriage Shift | 37 |
|   5. Short Cut Multiplication Controls | 38 |
|     (a) Normal Digitation Controls | 40 |
|       (1) Value Sensing Mechanism | 41 |
|       (2) Reversing Sign Character Control | 42 |
|     (b) Cycle Modifying Mechanism | 43 |
|     (c) Control of Direction of Feed of the Operative Segment | 44 |
|     (d) Corrective Operation After Final Cycle | 45 |
|   6. Restore Mechanism | 46 |
|     (a) Repeat Operation | 48 |
| III. OPERATION | 50 |

This invention relates to calculating machines and is concerned particularly with an improved mechanism for performing plural order multiplication operations automatically by means of what is known as the "Short Cut" system.

It is a primary object of the present invention to provide a more simple and also a more rugged automatic mechanism for performing plural order multiplication problems by the "Short Cut" method than those heretofore suggested. In the past most of the automatic calculating machines utilized the "Repeated Addition" system of multiplication in which a factor is added a number of times in each order corresponding to the multiplier digit for that order. Thus, for example, if the multiplier value were "89," the multiplicand is added nine times with the register in its home, or units order, position; the carriage shifted one order to the right; and the multiplicand then added eight times in the next ordinal position. This method of automatic multiplication had the great advantage that it was by far the most simple, and therefore provided the most trouble-free operation. It is, however, subject to the drawback that a multiplier value of "9" requires nine cycles of operation, a multiplier value of "8" requires eight cycles of operation, etc. In the days of manual multiplication, antedating the automatic multiplying machines now available, expert operators learned to multiply by what is commonly called the "Short Cut" method in which values of "6," or greater, are handled by subtracting the "tens-complement" of the value in the particular order and then adding the value of "1" in the next higher order. In this system a multiplier factor of "89" would be handled by one subtractive cycle in the home, or units, order; shifting the carriage one order; then subtracting once in the second, or tens, order; shifting the carriage to the third, or hundredths, position and finally adding once. This method of multiplication is controlled by the fact that "89" is equal to "100—11." The example given illustrates one difficulty encountered in the automatic mechanism using this approach: namely, that when two successive values require subtractive operation, the value in the higher order must be reduced by "1." In other words, while we speak of using the "tens-complement" of the higher order values, we sometimes use the "nines-complement" instead, and the machine automatically has to select whether to take the "nines-complement" or the "tens-complement." This, of course, adds further complexity to the automatic mechanism. Because of the speed involved in using "Short Cut" as against "Repeated Addition" methods of multiplication, many inventors have endeavored to adopt the "Short Cut" method to automatic multiplication. However, the resulting mechanisms have been very complicated and often required very careful adjustment, with consequent heavy manufacturing and upkeep costs. My invention is directed to a new and improved approach to the automatic "Short Cut" multiplication which avoids the use of very small parts and avoids the fine tolerances that are usually required in this type of mechanism, so that the "Short Cut" mechanism can be constructed from sturdy stampings (as is the case in the "Repeated Addition" systems of the past) and which will still complete a multiplication problem in the shorter interval incident to "Short Cut" operation.

Another important object of the present invention is to provide, in a "Short Cut" multiplier mechanism, for the additional cycle of operation in the higher order whenever the multiplier value in the adjacent lower order requires operation in the reverse direction (often sometimes loosely referred to as "subtraction" because multiplication is generally considered to be repeated addition) and the value in the higher order neccessitates operation in the selected direction (often loosely referred to as "additive"); which drops a cycle of operation in the higher order whenever the multiplier values in two adjacent orders require operation in the reverse direction in both orders; which enables the correct number of cycles in the higher order whenever the multiplier value in the adjacent lower order necessitates operation in the selected direction; and which enables the correct number of cycles, as determined by the "tens-complement" of the multiplier digit, whenever the multiplier value requires operation in the reverse direction while operation in the adjacent lower order required it in the selected direction. That is, one of the objects of the present invention is to provide a simpler and more rugged mechanism which automatically adds an additional cycle of operation in the higher order whenever the machine changes from operation in the reverse direction (generally subtraction) to operation in the selected direction (usually addition); which eliminates a cycle of operation in the higher order whenever the operation in both orders is in the reverse direction; and which neither adds nor subtracts a cycle of operation in the higher of any two orders whenever an operation in the adjacent lower order required operation in the selected direction.

Another important object of the present invention is to provide a "Short Cut" multiplication mechanism in a machine such as that disclosed in the patents to Friden, No. 2,371,752, issued March 20, 1945, and Friden et al., No. 2,399,917, of May 7, 1946, which provides for multiplication both by repeated addition or by repeated subtraction. It is obvious that a "Short Cut" multiplication mechanism for positive multiplication only would be much simpler than one which is adapted to perform both positive and negative multiplication, as in the Friden patents. In the first system it is merely necessary to set the machine for addition or subtraction according to the multiplier value of a particular order, i.e., values invariably operate additively for multiplier values of "1" to "5" and invariably operate subtractively for multiplier values of "6" to "9." On the other hand, in a machine for both positive and negative multiplication, the setting must be the result of two separate factors: (1) the sign character of operation selected by the operator, and (2) the automatic selection from the magnitude of the multiplier value. In machines of the type disclosed in the Friden patents the machine must run in an additive direction when the multiplier value is between "1" and "5" and the selected operation is additive multiplication, but must run subtractively for negative multiplication for like values; and, conversely, the machine must run in a subtractive direction when the multiplier value is "6" to "9" in additive multiplication, and additively for negative multiplication of such larger values. For this reason, and in order to avoid confusion which might arise from careless use of these terms, the terms "selected direction" and "reverse direction" will generally be used to designate operation in the direction (i.e., sign character) selected by the operator, or the reverse, respectively; and the terms "additive" and "subtractive" will only refer to the sign character of the operation of the register. With this in mind it will be obvious that "selected direction" will designate the operation of the machine for the lower multiplier values (values of "1" to "5" in my preferred embodiment), and this selected direction may be "additive" or "subtractive," depending upon the desire of the operator. and operations controlled by higher values (in my preferred form, values of "6" to "9") will be in the reverse direction.

A further object of the present invention is to provide an improved "Short Cut" multiplying mechanism for a rotary calculating machine using a plural order multiplier mechanism operative to store the multiplier value and, upon operation of the machine, to control the entry of the product into a product register either additively or subtractively at the will of the operator.

Another important aspect of the present invention is to provide an improved multiplying mechanism in which the character of the operation (in a selected or in the reverse sign character direction) is determined by the entry of the multiplier value into the multiplier mechanism (at the time the value is entered); the selected direction (positive for the entry of the true product or negative for the entry of the complement thereof) is determined by the operation of the control keys by the operator; and the adjustment of the multiplier value in any order as affected by the direction of operation in the adjacent lower order (i.e., the determination of whether an additional cycle of operation is to be performed in the particular order, or one less cycle of operation than the number determined by the value key for that order) is determined by the operation of the machine order-by-order.

Another aspect of the present invention is to provide an improved means for setting the true value or the tens-complement of that value in a multiplication mechanism automatically from depression of the selected value keys and simultaneously setting a control means to effect operation in the selected direction or in the reverse direction during operation on that order; and to provide means for automatically modifying the setting so made in an order by the operation of the machine in the next lower order when such modification is required by the nature of the multiplier digits. For example, if a multiplier value were "56," the entry of those values into the multiplier control members (the segments of a machine of the type shown in the Friden patents above-mentioned) would determine, respectively, that operation was to be in the reverse direction in the lower order and in the selected direction in the higher order. However, as the machine operates in the reverse direction in the first order (which reverse operation requires an additional cycle of operation in the higher order) the operation of the multiplier segment in the first order to a "0" position would automatically adjust the multiplier segment in the higher order (which theretofore had stood at the value of "5"), to a value of "6" in order to take care of the situation. That is, instead of six additive cycles in the higher order, it would be changed to a value of "6" and would control four cycles in the reverse direction followed by a single cycle in the selected direction in the third order. Similarly, if the multiplier value were "66," both orders would be set for operation in the reverse direction with the setting of the value keys, and then, during the first ordinal series of operations, the higher order segment would be adjusted to "7" instead of "6."

Another important object of the present invention is to provide means for modifying the operation of a multiplier control segment, such as shown in the Friden patents above-mentioned, by a single step to either reduce the number of cycles of operation in the operative order or to increase the number of cycles when required by the nature of the problem.

These and other objects of the invention will be apparent from a consideration of the following description, which will be readily understood by reference to the drawings forming a part hereof and in which:

FIG. 2 is a longitudinal, partial, cross-sectional view of the machine shown in FIG. 1, showing the selection, actuating, and register mechanisms thereof such as along the longitudinal plane indicated by the line 2—2 of FIG. 1;

FIG. 3 is a rear view of the power clearing and shifting mechanisms of the machine of the preferred form of my invention, such as along the transverse plane indicated by the line 3—3 of FIG. 1;

FIG. 4 is a left side view of the right frame plate, showing certain portions of the drive mechanisms and controls therefor, such as along the longitudinal plane indicated by the line 4—4 of FIG. 7;

FIG. 5 is a left side view of the mechanism for programming a continuous left shift of the register carriage to the home position operated in multiplication operations, such as taken along a longitudinal plane indicated by the line 5—5 of FIG. 7;

FIG. 6 is a right side view of the mechanism shown in FIG. 5, together with means for controlling a right shift of the register carriage during the multiplication program, such as taken along a longitudinal plane indicated by the line 6—6 of FIG. 7;

FIG. 7 is a plan view of the right portion of the machine with certain parts removed for simplification;

FIG. 8 is a plan view of the left portion of the machine with certain parts removed, and is, in effect, an extension of FIG. 7;

FIG. 9 is a right side view of the multiplier mechanism, such as taken along the longitudinal planes indicated by the lines 9—9 of FIG. 8, with certain parts removed for simplification;

FIG. 10 is a plan view, partly in cross-section, of the multiplier control carriage and certain mechanisms associated therewith;

FIG. 11 is a left side view of one of the multiplier segment assemblies showing the position of the parts as they are restored to their "0" position at the end of the digitation operation in the order controlled thereby;

FIG. 12 is a similar view of one of the segment assemblies showing the position of the parts when operated forwardly to its "10" position as the result of a short-cut operation, the segment having originally been set at a value of "5" and then converted to a value of "6" by operation in the adjacent lower order in the reverse sign character direction;

FIG. 13 is similar to FIG. 12 and shows the position of the parts when the operative segment was first set to a value of "5," and the adjacent lower order segment is being adjusted forwardly from its "9" to its "10" position;

FIG. 14 is a left side view of a multipler segment assembly showing the position of the parts when the segment has been set to a value of "9";

Figure 1:
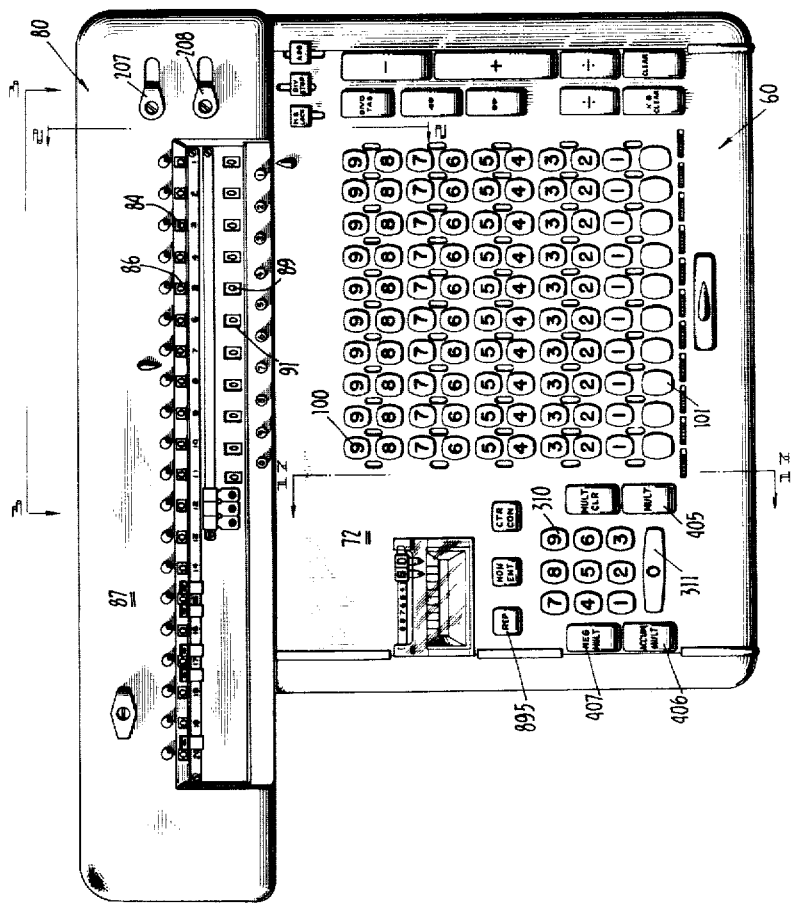
FIG. 1 is a plan view of the machine embodying the preferred form of my invention.
Figure 17:
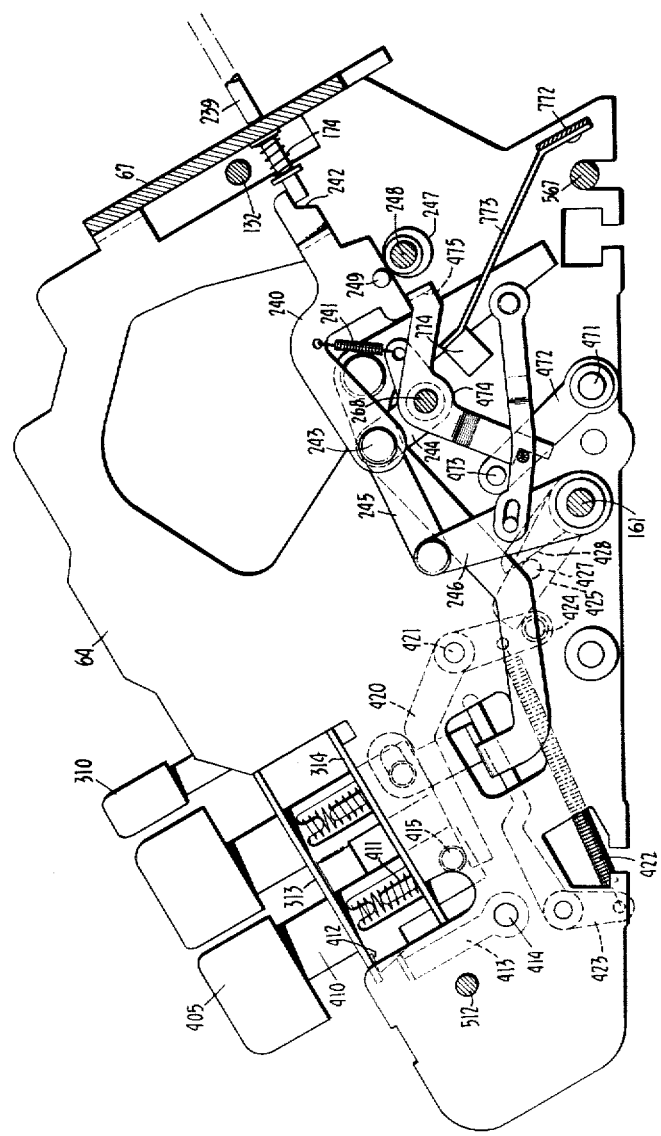

FIG. 15 is a left side view of the multipler carriage assembly, showing particularly a means for effecting a single cycle of operation in the order above that of the highest control segment, when so required by a short-cut operation, and also the means for restoring the multiplier pinboard mechanism to normal at the end of a multiplication operation, the view being taken along a longitudinal plane indicated by the line 15—15 of FIG. 10;

FIG. 16 is a right side view of the multiplier carriage assembly showing a means for restoring the various controls to their inoperative position at the end of a multiplication operation, the view being taken along a longitudinal plane indicated by the line 16—16 of FIG. 10;

FIG. 17 is a right side view of the left side intermediate frame plate and parts mounted thereon, showing particularly the means for effecting the clearing of the register and means for initiating operation of the machine in multiplication, such as along the plane indicated by the line 17—17 in FIGS. 1 and 8;

FIG. 18 is a left side view of the machine showing particularly the left side control plate and the multiplication controls mounted thereon;

FIG. 19 is a perspective view of most of the multiplication controls shown in FIG. 18;

FIG. 20 is a detail view, taken from the left, of the auxiliary clutch mechanism shown in FIG. 18 which initiates a multiplication operation;

FIG. 21 is a cross-sectional view of the auxiliary clutch assembly shown in FIG. 20, taken from the rear, such as along the planes indicated by the lines 21—21 of FIG. 20;

FIG. 22 is a left side view of the shift control cam operated by the auxiliary clutch;

FIG. 23 is a left side view of the program cam operated by the auxiliary clutch;

FIG. 24 is an exploded perspective of the auxiliary clutch shown in FIGS. 20 and 21 and the program clutch and cam cluster mechanisms which control the multiplication operation;

FIG. 25 is a cross-sectional view, taken from the front, of the program clutch and cam assembly shown in the right-hand portion of FIG. 24;

FIGS. 26 and 27 are right side views of the segment feeding, or restoring, mechanism shown in its disabled and in its enabled positions, respectively;

FIGS. 28 and 29 are left side views of the mechanism shown in FIGS. 26 and 27, showing this mechanism in its additive and its subtractive positions, respectively;

FIG. 30 is an exploded perspective of the feed mechanism shown in FIGS. 26 to 29, inclusive;

FIG. 31 is a cross-sectional detail of a portion of the mechanism shown in FIG. 30;

FIG. 32 is a left side view taken in the interior of the machine and showing particularly means for controlling the sign character of operation in a multiplication operation;

FIG. 33 is a detail of the power-operated sign character setting mechanism associated with the mechanism shown in FIG. 32; and FIG. 34 is a left side view of the power-driven cams for setting the sign character of an operation.

The machine of the present invention is adapted to work equally well in performing additive or subtractive multiplication operations. In additive operation a true product is secured, which will be added to any value previously standing in the accumulator, or product register, if that register has not first been cleared. In subtractive operations the tens-complement of the product is secured, and is most often used to subtract a product from a value previously standing in the product register, as, for example, the taking of discounts from a previous accumulation. In normal, or additive, operation, a multiplier value of "1" to "5" is handled by repeated addition from one to five times, respectively, and a value "6" to "9" is handled by repeated subtraction a number of times corresponding to the tens-complement of the multiplier value and adding once in the next higher order. For example, a multiplier value of "195" would be handled by five cycles of addition in the lower order; followed by a single subtraction in the second, or tens, order; and that, in turn, is followed by two additive cycles in the third, or hundredths, order. This corresponds to the formula: 195=200−10+5.

Conversely, in negative operations the machine operates by repeated subtraction for multiplier values of "1" to "5" and repeated addition for multiplier values of "6" to "9." Thus, if the product of "195" and any multiplicand value is to be subtracted from a previous accumulation, then the complement of the product is desired, and (in the machines described in the patents above-mentioned) the negative multiply key would be depressed. In such a subtractive multiplication, the "5" value of the multiplier is handled by repeated subtraction of the multiplicand for five cycles of operation in the lowest order, followed by a single additive cycle in the second, or tens, order; and that, in turn, is followed by two negative, or subtractive, cycles of operation in the third, or hundredths, order. This corresponds to the formula:

$$-195 = -200 + 10 - 5$$

In either event it will be noted that the values of "1" to "5" are handled by the repeated cycling of the machine with the accumulator, or product register, set for the accumulation of values in the selected sign character direction, i.e., the sign character determined by the control key depressed; and the values of "6" to "9" are handled by repeated cycling of the machine a number of times equivalent to the tens-complement of the multiplier value with the machine set for accumulation in the reverse sign character direction, followed by a corrective operation in the next higher order. In view of the fact that this machine is designed for both positive and negative multiplication, it would be confusing to refer to multiplication of values from "1" to "5" as additive cycles and those from "6" to "9" as subtractive, for those designations would be true only if positive multiplication were employed. Therefore, as indicated before, in order to avoid confusion in terms, "selected direction" will be used to indicate the operation controlled by the "1" to "5" multiplier values (which will be addition in positive multiplication and subtraction in negative multiplication); and "reverse direction" will be used to indicate the operation controlled by the multiplier values "6" to "9" (which will be subtraction in positive multiplication and addition in negative multiplication). The terms "addition" and "subtraction" will be used only to refer to the actual sign character of the accumulation in the register.

In the machine of the present invention the multiplier segments are set by the depression of the multiplier keys, as explained in the Friden patents above-mentioned. Then, at the start of each ordinal series of operation, the machine automatically senses whether the operative multiplier segment stands at a value of lesser magnitude ("5" or less) or greater magnitude ("6" or more), and controls the operation of the machine accordingly. Any short cut system of multiplication requires certain automatic controls for controlling the corrective operation in the next higher order whenever the operation in any order was in the reverse direction; and this corrective operation varies according to the various situations that may arise. Specifically, the two principal situations which require adjustment of the normal multiplier controls are: (1) an extra cycle must be taken in any order in which operation is in the selected direction when operation in the preceding order was in the reverse direction (i.e., must add "1" in positive multiplication when operation in the preceding order was in subtraction of the complement, and vice versa in negative multiplication); (2) on the other hand, the machine must take one less cycle than the true tens-complement of the multiplier value when operating in the reverse direction and operation in the preceding order was also in the reverse direction (i.e., must drop a subtractive count in substraction when the operation in the previous order was subtraction, in a positive multiplication problem, and the reverse in negative multiplication). For example, in positive operation, the multiplication of a value by "189" causes the machine to subtract once in the lowest order, then subtract once in the second order, and must add twice in the third order.

In the machine of my invention, the multiplier segment is operated, under the control of the sensing mechanism mentioned, to feed, or count, the segment back to "0" when the sensing mechanism has sensed a value of "5" or less; and to feed this segment forwardly to a "10" position (a "0" beyond "9") when sensing a value of "6" or more. In this connection, the control of the number of cycles which occurs in any order when operation in the preceding order was in the reverse direction is caused by an adjustment of the higher order segment as the adjacent lower order segment is fed from "9" to the adjacent "0," or "10," position—the feed of the segment from "9" to the adjacent "0" position being effective to adjust the multiplier segment in the adjacent higher order one step forwardly (in the higher value direction). Thus, in the example of "189" just given, the operation of the machine in the units order would cause the lowest order operative segment to be fed from the "9" to the "10" position, which would take one cycle. In this movement of the units order segment, it would engage the adjacent higher order segment then standing at a value of "8" and advance it to "9." Then, in the operation in the second order, the segment would be moved from the "9" to the "10" position, which would take one cycle; and, in so doing, would move the third segment from its "1" to its "2" position. By this means I am able to simplify the controls usually needed for short cut multiplication, and thereby permit the multiplication and control mechanisms to be made of stronger parts, and with considerably greater tolerance than heretofore has been possible.

I. PRIOR ART CALCULATOR MECHANISMS

The present invention is shown, for purposes of exemplification, as applied to the present "Friden" automatic calculating machine which is essentially constructed in accordance with the patent to Carl M. Friden, No. 2,229,889, of January 28, 1941, as modified by a multiplying mechanism shown and described in the patents to Carl M. Friden, No. 2,371,752, of March 20, 1945, and No. 2,399,917, of May 7, 1946. In this connection, reference perhaps should also be made to the patents of Gilman Plunkett, No. 2,886,238, issued May 12, 1959, and Grant C. Ellerbeck, No. 2,933,247, issued April 19, 1960, for short-cut multiplying mechanisms particularly adapted to the Friden machine—the present invention being designed as a simplification and improvement over both of these short-cut multiplication machines.

In view of the fact that many of the mechanisms involved in the short-cut operation of my invention are well-known parts of the "Friden" machine, it is deemed sufficient to describe the known elements of these prior art machines very briefly. I shall omit entirely those mechanisms that are not pertinent to a short-cut multiplication mechanism such as I propose, and will describe those known mechanisms which do relate to the operation of my invention as briefly as possible.

A. Machine Frame

It is well-known in the art that such machines are generally divided into a main body, or frame, portion 60 and a shiftable carriage 80 (FIG. 1). The main body portion customarily is supported upon a framework which comprises a base plate 61 (shown in phantom lines in FIGS. 9 and 19) upon which are rigidly mounted a left side frame plate 62 (FIGS. 2 and 8) and a right side frame plate 63 (FIGS. 4 and 7). The framework also includes an intermediate frame plate 64 (FIGS. 8 and 17) lying between the left and right side frames 62 and 63, respectively, a left side control plate 65 which lies on the extreme left; and an auxiliary left side frame plate 66 which lies between the left side frame plate 62 and the left side control plate 65. A number of cross-members or crossbars 67, 68, 69 and 70 (see FIG. 2) rigidly brace the left and right side frames 62 and 63, respectively, and also serve as bearing plates for the actuating mechanism. A carriage rail 71 also braces the frame members and likewise serves as a front rail for the carriage. The various operating mechanisms, such as the motor and drive, the actuating mechanism, the keyboard, the selection mechanism, the controls for the positive or negative operation of the accumulator register, the shifting mechanism, the multiplier mechanism, and the like, are mounted upon the frame plates and crossbars. All of the above-mentioned mechanisms, with the exception of the tops of the value and the control keys, are enclosed within a cover 72 (FIG. 1), the keys projecting upwardly through suitable apertures in the cover plate.

B. Register Carriage

Calculating machines adapted to perform division and multiplication operations usually are provided with a shiftable register carriage 80 which is shiftable longitudinally (laterally across the machine) upon the frame. In the machine with which my invention is preferably associated, the carriage is primarily constructed upon a main hollow frame bar 81 (FIG. 2) and a channel 82, which are held in spaced relationship by suitable end plates 83. The accumulator, or product register, normally comprises about twenty ordinally arranged dials 84 which are mounted upon vertical shafts 85 journalled in the frame bar 81, the dials being visible through windows, or apertures, 86 and the carriage cover 87 (FIG. 1). The several dial shafts 85 are rotated to enter the values into the register by means of a gear 88 (FIG. 2) mounted on the lower end thereof.

It is also customary to provide a counter register in the shiftable carriage, this counter register in the preferred machine comprising eleven counter dials 89 mounted upon longitudinally extending shafts 90 which are journalled in the carriage frame 81 and channel 82. The several dials 89 are visible through their respective windows 91 in the carriage cover (FIG. 1). The counter dials are separately driven by their respective counter gears 92, which may be formed as an integral part of the counter dial 89 or may be rigidly secured to the counter shaft 90. The counter dials are utilized to count the cycles of operation of the machine and thereby register a quotient in division operations or show the multiplier value at the end of a multiplication operation.

The counter dial 89 aligned with the lowest, or units, order of the keyboard is operated by a counter actuator 96 of familiar construction. This actuator is adapted to engage the gear 92 affixed to the counter dials 89 (or the shaft upon which they are mounted), and to impart to the gear and dial an angular movement equivalent to a value of "1" with each cycle of machine operation. The construction and operation of the counter actuator and the counter register are of no particular importance in the present invention and will, therefore, not be described—reference being made to Friden patent No. 2,229,889 for a full disclosure of this mechanism.

C. *Tens-Transfer Mechanism*

It will be understood that both the accumulator dials 84 and the counter dials 89 are provided with suitable tens-transfer mechanisms operative to effect a necessary tens-transfer between the various orders as required. The tens-transfer mechanisms shown in FIG. 2 are those normally found in the machines manufactured under the Friden patents above-mentioned, and are fully shown and described in the patent to Friden, No. 2,229,889.

In a machine utilizing the short-cut principle of multiplication, it is necessary to have a full capacity tens-transfer for the accumulator register dials 84, i.e., one which will carry a transfer from the lowest to the highest order regardless of carriage position. In the preferred embodiment of my invention, I utilize the full carry mechanism shown and described in my patent, No. 3,022,948, issued February 27, 1962, although that shown and described in the patent to Machado et al., No. 2,597,507, issued May 20, 1952, serves satisfactorily. It is, therefore, believed unnecessary to describe this portion of the machine, for it is that usually found in such machines and is familiar to those skilled in the art. It must be remembered, however, that it is essential to effect tens-transfers to the full width of the accumulator register, as a first cycle of a multiplication operation might be subtractive. Such a subtractive operation would, of course, register "9's" as far as the tens-transfer was effected. If this tens-transfer were effected only part way across the register, the later shifting of the carriage as the multiplication progressed might cause an error, for a value would then be entered in orders which stood at "0" instead of "9." It will be obvious to those skilled in the art that any full-carry mechanism would be operable in connection with my invention, the ones mentioned being preferable for use in the machine described in the patents heretofore mentioned.

D. *Selection Mechanism*

Values are entered into the machine by means of a keyboard which, in its preferred embodiment, consists of ten orders of value keys 100 (FIGS. 1 and 2) progressively arranged for the values of "1" to "9," inclusive—the keyboard being arranged in banks, or transverse rows, of keys of like value, as shown in FIG. 1. Aligned with each order of value keys 100 is a single "0," or ordinal clear, key 101. A number of operation control keys are arranged to the right of the main keyboard, such as the customary "plus" and "minus" bars, and the right and left-hand shift control keys. As these control keys will not directly affect the operation involved in the present invention, they will not be described.

The value keys 100 are mounted on the upper ends of identical key stems 102 (FIG. 2) which are slidably mounted in a keyboard frame 103 by the well-known means shown. These keys are individually biased to their raised position by any resilient means, such as springs 104. The keys of each order, however, can be latched in a depressed position to control the entry of values into the machine, upon cycling thereof, by a well-known ordinal latch slide 105. Each latching slide is individually biased to a forward position (to the left in FIG. 2) by resilient means, such as the leaf spring 106; and each is provided with a series of slots (not shown) embracing the respective key stems 102. These latching slides cooperate with cam noses 107 formed on the rear edge of each key stem 102, whereby the depression of the key stem cams a latching slide 105 to the rear. When a key has been depressed to its operative position, a notch 108 formed in the rear edge of the key stem immediately above the cam nose 107, will register with the ordinal latching slide, whereupon the latter is snapped into the notch 108 by its spring to hold the key stem latched in its operative position.

A key so latched in its operative position is released by any movement of the latching slide 105 to the rear (right in FIG. 2). This movement may occur from the depression of another key stem in the same order, which obviously will move the latch to a releasing position before the other key reaches a position in which it can be latched down; by the operation of the ordinal "0" key 101; by operation of a main keyboard clear key; or in certain automatic operations not here pertinent.

Each of the key stems 102 is provided with a pin 109 adjacent its lower end, each pin being adapted to engage the associated differentially angled cam face 117 formed in the upper edge of a selection, or the "V-notch," bar 115 or 116. In the preferred construction, the selection bars 115 and 116 are mounted in pairs, one pair for each order—the bar 115 serving the "1" to "4" keys, and the bar 116 serving the "5" to "9" keys. These bars are individually mounted for free longitudinal movement, as by pivotally mounting them on a pair of parallel arms 118 (only one of which is shown in FIG. 2). The rear ends of each of the selection bars is provided with a perpendicularly extending yoke 119 or 120, respectively. These yokes engage an annular slot 121 formed in the hub of a selection gear 122. Each pair of selection gears is slidably mounted on a longitudinally extending selection, or square, shaft 123 that is journalled in the crossbars 67, 68 and 70. It is well known that there is one selection shaft 123 for each order of the keyboard, and it is usual to mount the two selection gears 122 on this single shaft—one of the gears being positioned by the "1" to "4" slide 115 and the other by the "5" to "9" slide 116.

The selection gears 122, and the square shafts 123 on which they are mounted, are given differential increments of rotation determined by the longitudinal position of one or the other of the selection gears 122 on the shaft 123 by means of the well-known Thomas-type actuator 130. These actuators are mutilated drums having sections of a width corresponding to the incremental movement of the selection bars, each section having a number of teeth corresponding to its value position. Thus if the selection gear 122 associated with the "1" to "4" selection bar 115 is moved one increment, it will move into the plane of the single tooth section of the coordinal actuator, and the gears and selection shaft will be rotated one increment, etc. The actuator drums 130 are rigidly mounted on actuator shafts 131 extending longitudinally of the machine and journalled in the crossbars 67 and 68. The various shafts are driven in unison from a common transverse drive shaft 132 rotatably journalled in the machine—the various actuator shafts 131 being driven by pairs of miter gears 133, 134. Obviously, the differential translation of one or the other of the selection gears 122 along its selection shaft 123, resulting from operation of the pin 109 upon its associated V-notch 117, will place the gear in the plane of a number of teeth on the actuator drum corresponding to the value of the key 100 depressed. Thereafter, the cycling of the main drive shaft 132 will cause that value to be entered into the selection shaft 123 by an incremental rotation corresponding to the key depressed.

E. *Accumulator Drive*

The accumulator dials 84 are separately mounted on their respective shafts 85 which are journalled in the carriage frame bar 81. Each shaft 85, and consequently the respective dial 84, is driven by increments of rotation imparted thereto by means of their respective accumulator gears 88. These gears 88 are adapted to be engaged by a digitation control spool 140 that is slidably mounted on the rear end of each of the square selection shafts 123. This digitation control spool carries a plus, or additive, gear 141 and a minus, or subtraction, gear 142. Normally the digitation control spool 140 is in a centralized, or neutral, position shown in FIG. 2, but can be moved either forwardly or rearwardly on the square shaft 123. When so moved, either the additive gear 141 or the subtractive gear 142 will mesh with the accumulator gear 88, whereupon rotation of the drive shaft 132 will cause an incremental rotation of the accumulator shaft and dial corresponding to the value position of the selection gears 122. Such movement is readily secured by means of a well-known control gate 143 that is mounted by suitable arms 144 on a digitation control shaft 145. It is well known that the computation control gate 143 extends transversely of the machine in operative relationship to all of the computation control spools 140, and that the control shaft 145 can be rocked in either direction by various control means, such as the addition and subtraction control keys. As such controls are not important to the present invention, they will not be described, but the operation of the shaft 145 in multiplication operation will be described in Section II, 5, hereafter.

The machine is preferably driven by a motor (not shown) through a conventional clutch 150 (FIG. 4). Operation of the clutch 150 is controlled by a clutch control lever 151 pivotally mounted on the right side frame 63; and it, in turn, is controlled by a link 152 that is pivotally mounted on the control lever 151 and on a second control lever 153. This second lever is also mounted on the right side frame 63 by any suitable means, such as pivot stud 154. At its lower end the lever 153 carries a long pin 155 extending through an aperture in the frame plate, which pin is utilized to support the forward end of a switch control link 156. The operation of the clutch and the motor are so well-known that it is believed unnecessary to describe them or to refer to their operation other than in multiplication, other than to mention that they are resiliently held in an inoperative position by a suitable spring 162.

It can be noted at this point, however, that the clutch 150 and the switch (not shown) are operated in multiplication by means of a lever 157 pivotally mounted on a transverse shaft 268 (as also shown in FIG. 7). The rear end of this lever is provided with a hook, or shoulder, 158 which engages the pin 155, so that when the lever 157 is rocked (clockwise in FIG. 4) it moves the pin 155 forwardly. Such operation pulls the switch link 156 forwardly to close the switch, and rocks levers 153 and 151 (counter-clockwise in this figure) to cause engagement of the clutch. The forward end of the lever 157 is angled to provide a cam face which is engaged by a pin 159 mounted on the free end of an arm 160 that is rigidly mounted on a transverse operation initiating shaft 161. Thus the rocking of shaft 161 (counter-clockwise in this figure), rocks the intermediate lever 157 (clockwise) and thus operates the clutch and switch to initiate machine operation. It should further be noted that this operation will continue so long as the shaft 161 is held in its rocked position, but that as soon as the shaft is released, it will be returned to its normal, inoperative, position by means of its spring 163.

F. *Carriage Shift*

The carriage 80 can be shifted in either direction, either automatically in certain operations or under control of manually operated shift keys. Any shifting mechanism could be used, but I prefer to use that described in the patents above-mentioned. Since the shifting mechanism is essential to machine operation in problems of multiplication, it will be briefly described. This mechanism, which is shown in FIGS. 2, 3 and 7, includes a left shift clutch 170 and a right shift clutch 171, the driving portions of which are mounted on the two right-hand actuator shafts 131—which two shafts are extended to a point adjacent to the rear crossbar, or bearing plate, 70.

Preferably these clutches are of the type described in the patents to Matthew, No. 2,636,678, issued April 28, 1953, and No. 2,679,916, issued June 1, 1954. The operation of each of these clutches is controlled by means of clutch control rods 172 and 173, respectively. These rods are biased to their forward, or inoperative, position by means of compression springs 174 which encompass the forward end of the rods and are compressed between the forward bearing plate, or crossbar, 67 and collars on the respective rods. The left shift control rod 172 can be moved rearwardly to place the left shift clutch driver 170 in its operative position by several means, one of which will be described in Section H relating to the automatic shifting mechanism. Similarly, the right shift control rod can be translated rearwardly to cause engagement of the right shift clutch driver 171 with its associated driven member by various means, one of which will be described in connection with the multiplication operation. For the moment, however, I will direct my attention only to the operation of these clutches and shifting mechanism which is operated thereby.

Associated with the clutch drivers 170 and 171 are notched clutch disks 180 and 181, respectively, the notches of which are adapted to be engaged by tongues on the driving members when the latter are rocked from the inoperative position shown in FIGS. 2 and 7. The disk 180 is rigidly mounted on a sleeve shaft 182 journalled in the rear frame plate 70 and a supporting bracket 183 mounted on the rear bearing plate, or crossbar, 70, as by suitable spacing studs 184. This sleeve carries a pinion 185 (see also FIG. 3) that constantly meshes with the larger gear 186 of a compound idler, the smaller gear 187 of which is constantly meshed with a shift gear 188. The right shift clutch disk 181 is mounted on the forward end of a similar sleeve (not shown in the drawings) which carries a gear 189 constantly meshing with a wide idler 190 (see FIGS. 2, 3 and 4). The wide idler 190 also meshes with gear 186, so that the compound gear 186, 187 will be driven in one direction when driven through the left shift clutch 170, 180 and in the other direction when driven through the right shift clutch 171, 181.

The shift gear 188 is rigidly mounted on a short shaft 191 which is journalled in the rear bearing plate 70 and the bracket 183. This shaft also carries a shift disk 192 rigidly mounted thereon. Preferably four equiangularly placed drive pins 193 are affixed to the disk 192. These pins engage in notches 194 ordinally spaced in a shift rack 195, so that the rotation of the shifting disk 192 is effective to shift the carriage 80 in the selected direction. Thus, operation of the shift control rod 172 (FIG. 7) results in rotation of the shift plate 192 in a counter-clockwise direction when viewed from the front of the machine (clockwise in FIG. 3), while the operation of the right shift control rod 173 results in rotation in the opposite direction; and this rotation of disk 192, in turn, shifts the carriage 80 in the necessary direction.

It can be mentioned that in its preferred form the gear trains for the shift mechanism have a gear ratio of 4:1, so that the gear 188 and disk 192 are rotated through an angle of 90° for each full cycle of operation of the actuator shafts 121 (which have a 1:1 gear ratio with the drive shaft 132). Thus a single cycle of operation of the machine will cause a shifting of the carriage an amount equal to the space between the successive notches 194, the spacing being such as to cause a shift of one ordinal position of the carriage, or the distance between successive dials 84.

G. *Register Clearing Mechanism*

The well-known means for clearing the accumulator dials 84 and the counter dials 89, in the patents mentioned, is illustrated in FIG. 2. Such mechanisms comprise a mutilated clearing gear 93 rigidly mounted on each of the accumulator shafts 85, and a similar mutilated clearing gear 94 mounted on each counter shaft 90. Preferably these mutilated gears are staggered on their respective shafts, as shown, in order to keep the ordinal spacing of the machine at the smallest possible distance. Associated with the clearing, or mutilated, gears 93 and 94 are clearing racks 205 and 206, respectively. The respective dials are returned to their "0," or clear, positions by longitudinal translation of the racks 205 or 206, respectively, as shown and described in detail in the patent to Friden, No. 2,229,889 already mentioned. These racks can be actuated manually by means of knobs 207 or 208, respectively (FIG. 1); or they (both or either) can be operated by power, automatically, in certain operations (one of which is multiplication as will be described hereafter) by a mechanism which will now be described.

The power-operated clearing mechanism comprises a bar 215 slidably mounted on the rear carriage frame bar (see FIG. 3). Preferably the power clearing bar 215 is mounted by the usual pin-and-slot mounting, which includes slots 216 in the power bar embracing pins 217 mounted in the carriage frame bar 81. It is usual to bias the power clearing bar to its left-hand (to the right in FIG. 3), or inoperative, position by a suitable tension spring (not shown). The right end of the power bar 215 carries an integral bracket (not shown) upon which is riveted, or otherwise rigidly secured, a pair of pins that respectively engage interponents rigidly connected to the clearing knobs 207 and 208.

The power clearing bar 215 is operated, i.e., translated to the right (to the left in FIG. 3), against the tension of its spring by means of an interponent rack 218 that is rigidly secured thereto. Preferably this rack is provided with ordinally spaced shoulders 219 as shown. These shoulders 219 are adapted to be engaged by an ear 220 formed on the right end of a link 221. This link 221 is guided by a pin 222 on the rear bearing plate 70 which is embraced by a cam slot 223, shown in FIG. 3; and its right end is supported by a pivotal mounting on a cam follower arm 224. The follower arm 224 is pivotally mounted on a stub shaft 225 that is mounted between the rear frame plate 70 and a bearing bracket 226 mounted on the rear thereof by any suitable means, such as spacer studs 227. The follower arm is usually biased to the left (to the right in FIG. 3) to an inoperative position by a suitable spring 228 and is provided with a follower roller 229 that engages the periphery of a clear cam 235. The clear cam 235 is rigidly mounted on a short shaft 236 journalled in the rear frame plate 70 and the bearing bracket 226. The forward end of this shaft carries a clutch disk 237 (see FIG. 8) which is adapted to co-operate with a well-known clutch driver 238, preferably of the type shown in the patent to Matthew, No. 2,679,-916 previously mentioned. In my preferred form of the present invention, I mount the clutch driver 238 on the leftmost actuator shaft 131 and control its operation by means of a control rod 239 immediately adjacent thereto. This clutch control rod, as was true of the shift control rods 172 and 173, is biased to a forward, inoperative position by means of a suitable spring 174 which may be similar in all respects to those associated with the shift clutch control rods. It is customary in the machine with which my invention is preferably associated, to form the control rod 239 of two telescoping members biased to an open position, as shown in FIG. 8, so that normal operation of the forward portion of the bar can be prevented from operating the clear clutch in certain operations not here pertinent. Insofar as the present invention is concerned, operation of the clutch control rod 239 is secured by a pusher link 240 having a shoulder 242 (see FIG. 17) normally engaging the forward end of the rod 239, the pusher link being biased downwardly into engagement with the rod by a suitable spring 241. The forward end of the pusher link (as shown in FIG. 17) is pivotally connected, as by pin 243, to a supporting arm 244 that is rotatably mounted on shaft 268 and to a link 245, as shown. The link 245, in turn, is pivotally mounted on an arm 246 by any suitable means. The arm 246 is rigidly mounted on the initiating shaft 161 that has already been mentioned. Thus, the rocking of the shaft 161 to initiate a multiplying program operation directly, through links 245 and 240 and clutch control rod 239, causes engagement of the clearing clutch even before the shaft has turned sufficiently to engage the clutch 150 and close the motor switch. Hence the clearing mechanism is operated during the first machine cycle of operation.

Obviously it is necessary to clear the registers once and immediately disable the clearing mechanism, as continued operation of the clearing mechanism would cause considerable trouble. Such disabling of the clearing mechanism is readily secured by well-known means comprising a cam 247 (FIGS. 8 and 17) that is rigidly mounted on an auxiliary drive shaft 248. The periphery of the cam engages a pin 249 riveted on the pusher link 240, whereby the rotation of the shaft 248, at approximately the mid-point of the cycle, will lift the pusher link 240 to disengage it from the forward end of the clutch control rod 239. Thereupon the spring 174 snaps the rod forwardly and, as the link 240 is lowered, it comes to rest on the upper surface of the rod 239, forwardly of the shoulder and thereafter will have no effect upon the operation of the clearing mechanism. The auxiliary drive shaft 248 is, as shown in FIG. 8, connected to the main drive shaft 132 by a 1:1 gearing which may comprise a miter gear 250 meshing with the leftmost miter gear 134 on the drive shaft 132. The gear 250 is mounted on the upper end of a drive shaft 251 suitably journalled in a pair of bearing brackets 254 and 255. A pair of co-operating miter gears 252 and 253, the former affixed to the shaft 251 and the latter to the shaft 248, completes the gear train to the shaft 248. Thus the shaft 248 rotates a full revolution synchronously with the operation of the main drive shaft 132. This construction enables the operation of the clearing mechanism early in the clearing cycle of operation (in which condition it is locked by an interlock not pertinent to the present invention and, therefore, not shown); and the control is automatically disabled at about the mid-point of the cycle, so that only one clearing cycle can take place.

H. *Automatic Shifting Mechanism*

It is convenient, at least in the machine herein shown for purposes of exemplification, to initiate all operations which include an initial left shift of the register carriage 80 to the extreme left-hand position by a single power-operated mechanism. For this purpose I prefer to use the mechanism shown and described in the patent to Machado, No. 2,650,761, issued September 1, 1953, side views of which are illustrated in FIGS. 5 and 6. The operation of this mechanism is controlled by the rocking of the shaft 161 (see also FIGS. 4 and 7) suitably journalled in the machine, such as by bearings (not shown), the intermediate frame plate 64, and the right frame plate 63. This shaft is rocked (clockwise in FIGS. 6 and 17, and counter-clockwise in FIGS. 4 and 5) by any one of the multiplier control keys, as will hereinafter be explained, as well as other control keys not here pertinent. It has already been explained that the rocking of the shaft (counter-clockwise in FIG. 4) is effective to close the motor control switch through the forward translation of the switch control link 156, and cause the engagement of the clutch 150 through levers 151 and 153 and link 152. The rocking of this shaft is also effective to operate the programming mechanism here under discussion by means of the mechanism shown in FIGS. 5 and 6.

The preferred form of mechanism comprises bellcrank 260 rigidly mounted on the shaft 161 in a plane about midway between the left and right side frames 62 and 63 (see FIG. 7). A control link 261 is customarily mounted on the upper end of the bellcrank 260 by a pin-and-slot connection 262. The rear end of the link 261 is pivotally connected to one arm of a bellcrank 263 that forms a closed cam follower mounted on an eccentric disk 264 rigidly mounted on the auxiliary drive shaft 248. The other arm of the bellcrank is formed as a hook, or shoulder, 265 adapted to engage a pin 266 riveted to, or otherwise rigidly mounted on, a control lever 267. This lever is rigidly mounted on the transverse shaft 268 journalled in the right side frame 63 and intermediate frame plate 64 (FIGS. 7 and 8). It will be evident that the eccentrically mounted bellcrank 263 will be operated at all times that the machine is in operation. However, the bellcrank 263 is so positioned angularly in ordinary conditions that the hook 265 reciprocates in a path in which it does not come into engagement with pin 266. However, when the bellcrank 263 is rocked from the rocking of shaft 161 (both of which rock clockwise in FIG. 6 and counter-clockwise in FIG. 5), the hook 265 engages pin 266 at the extremity of its forward stroke, which occurs about the mid-point of a cycle. Thereupon the eccentric rocks the arm 267 and shaft 268 (clockwise in FIG. 6 and counter-clockwise in FIG. 5). At this time the arm 267 is latched by a latch arm 269, a shoulder of which engages a pin 270 on the arm 267. This latch remains effective until it is released by the return of the first-mentioned bellcrank 260 to the normal position shown in these figures, at which time a pin 271 on bellcrank 260 lifts the free end of the latch to unlatch the control lever 267.

The shaft 268, the rocking of which has just been described, has an arm 277 rigidly secured thereon (see particularly FIGS. 5 and 7). The upper and free end of this arm pivotally supports the forward end of a pusher link 278, the rear end of which is biased downwardly by a spring 280 and is formed with a shoulder 279. The shoulder 279 engages a pin 281 that is riveted on an arm 282 formed on the left end of a sleeve 283 which is pivotally mounted on a cross-shaft 286. The right end of the sleeve 283 carries an arm 284 (see FIG. 7) on which is secured a long pin 285 that engages the forward end of the left shift control rod 172. Thus, the rocking of the arm 267 and shaft 268 is effective, in the latter half of the first cycle of operation and during the operation of the clearing mechanism, to set the left shift control clutch driver 170 to operative position. It can be mentioned that this clutch is ineffective to initiate a shifting operation until the nose of the driver can engage the slot in the driven disk, which occurs at the start of the succeeding cycle of operation. The clutch will be held in its operative position so long as the shaft 268 is rocked and the pusher link 278 is held downwardly by the bias of its spring 280. The shaft 268 will be released only at the end of a multiplication operation as far as the present invention is concerned, but a means is provided for lifting the pusher link 278 as soon as the carriage reaches the extreme left-hand position (shown in FIG. 1), as will now be described.

I. Shift Terminating Mechanism

It is customary in the machine described to provide a means for terminating an automatic shift in either extreme position, but as only the left shifting mechanism is involved in the pre-multiplication programming, it only need be described herein. It is conventional in most automatic multiplication mechanisms to shift the carriage to an extreme left-hand position as a preliminary program to multiplication, so multiplication can begin with the lowest order of the multiplier. The termination of such a continuous left shift is controlled by an attempted overshifting of the carriage beyond the terminal position shown in FIG. 1, preferably by the mechanism which is best shown in FIGS. 3 and 7. It is seen in FIG. 3 that the extreme right-hand notch 194 (to the extreme left in this figure) of the shift rack 195 is formed in an override pawl 291 which is pivotally mounted on the rack 195, as by means of a stud 292, and is biased into an operative position by a spring 293. A nose on the right end of the pawl (to the left in FIG. 3) overlies an ear 294 (see also FIG. 7) formed at the upper end of a slide 295. The slide is mounted on the rear bearing plate, or crossbar, 70 by suitable means, such as pin-and-slot connections 296. The lower end of the slide overlies the rearwardly extending and horizontal arm of a bellcrank 297 that is pivotally mounted on the computation control shaft 145. The lower arm of this bellcrank is connected to a forwardly extending link 298 (FIG. 7), the forward end of which is connected to the upwardly extending right leg of a bail 299 (see also FIGS. 4, 5, and 6). The left leg of the bail (as best shown in FIGS. 5 and 7) has a laterally extending ear 300 that underlies the pusher link 278, so that the rocking of the bail is effective to lift the link away from its cooperating pin 281. When this happens, the sleeve 283 is released from control by the link 278; and the spring 174 on the left shift control rod is thereupon effective to return the parts to their normal and inoperative position. The operation of the bail 299, therefore, disables the effectiveness of the shift programming mechanism, for the pusher link 278 will be riding upon pin 281 instead of engaging it. Thus, even though the automatic left shift mechanism is locked in its effective position, it can no longer control a shifting operation. It can be mentioned at this point that the rocking of the bail 299 is also effective to initiate operation of the multiplier mechanism, as will be described hereafter.

II. MULTIPLICATION MECHANISM

It has already been indicated that the multiplier keyboard and control keys, and the shiftable multiplier selection carriage and the pinboard carried thereby, are substantially the same as those disclosed in the Friden multiplier patents Nos. 2,371,752 and 2,399,917 already mentioned. At this point, the similarity between those mechanisms and that of the present invention ceases, for I utilize a multiplier control segment which can be cyclically adjusted, or fed, either forwardly or backwardly to control the number of cycles of operation in any order. Upon the segment's return to the "0" position or its feeding forward to a "10" position, it intitiates the usual interordinal program comprising: (a) termination of digitation in the order; (b) shifting the register carriage 60 one order to the right and simultaneously returning the multiplier carriage one order to the right; and (c) thereupon initiating a new sequence of digitation operations under the control of the immediately higher segment. Incidentally, the mechanism of the present invention senses whether the operative multiplier segment stands at a value of "5" or less, or "6" or more; and, as a result of that sensing, determines whether the digitation operation is to proceed in the selected or in the reverse direction and whether the segment will be returned backwardly to "0" or fed forwardly to "10." If the sensing mechanism senses a lower value of "1" to "5," it is operative to control the following digitation operation to the selected direction, during which the multiplier control segment is fed back to its "0" position; if, on the other hand, it senses that the value is "6" or more, it becomes effective to cause digitation in the reverse direction, and feed the multiplier segment forwardly to the "10" (or "0" beyond "9") position. Also in connection with this mechanism, means is provided for adjusting the segment in the adjacent higher order when operation in any order is in the reverse direction. This is accomplished by engaging the adjacent higher order segment and moving it forwardly one increment as the operative segment is fed from its "9" to its "10" position. The mechanisms will now be described in detail.

1. Multiplier Selection

It is customary, as shown in FIG. 1, in the machines with which my invention is preferably associated, to place the multiplier selection unit in the lower, or front left-hand corner of the machine. Such a selection mechanism ordinarily comprises three main sections: (a) the keyboard; (b) the shiftable pinboard; (c) the multiplication control segments. In my present invention the first two of these elements are those described in the patents to Friden, No. 2,371,752, or No. 2,399,917.

Hence these two elements will be very briefly described, reference being made to these patents for full and complete disclosure of the mechanisms involved. However, the third portion, i.e., the multiplication control segments, are quite different from that of the prior art and will, therefore, be described more fully.

(a) Multiplier Keyboard

The multiplier value keyboard comprises the nine digital value keys 310 (see particularly FIGS. 1, 8 and 9) and a "0" key 311. The value keys 310 are arranged in usual 3 x 3 square, with the "0" key 311 placed in front of them. All of these keys are mounted on stems 312 which are slidably mounted in a keyboard frame comprised in part by the upper frame plate 313 and lower frame plate 314 (FIG. 9). These keys are all urged to their upper, or inoperative, position by the usual springs (not shown). The stems of the value keys, with the exception of the "0" and "9" keys, are divided: having one guide stem 315 protruding downwardly through a registering slot in the lower frame plate 314 and engaging the nose 316 of a respective value setting lever 317; and a laterally extending bracket 318, a portion of which overlies an escapement operating bar 319. The "0" key 311 and the "9" key 310 have the bracket portions which overlie the escapement bar 319, but do not have the co-operating lever 317 as they do not set values—the "0" key 311 being operative only to escape the multiplier control carriage one order to the left, and the "9" value key being operable to release a "0" latch, shortly to be described, and to operate the escapement mechanism, for it does not set a pin as do the "1" to "8" keys.

The various levers 317 are in the form of bellcranks, closely mounted on a common shaft 320 and having a downwardly extending arm 321, the respective noses 322 of which lie in an ordinally arranged guide slot in a guide plate 323. This ordinal slot lies one ordinal spacing of the multiplier carriage to the right of the operative position, as is well-known in the art.

(b) Shiftable Pin Carriage

The pinboard mechanism is located in an ordinally shiftable carriage 330 (FIGS. 9 to 15, inclusive). The carriage proper is formed of a pair of interlocking lower frame plates 331 and 332 (see particularly FIGS. 13 and 14), a right-hand plate 333 and a left-hand plate 334, both of which are interlocked with the upper and lower frame plates 331 and 332, respectively. These members are held in rigidly spaced relationship by means of their interlocking ears and by a transverse stop bar 335 and a transverse quill shaft 365. This assembly is shiftable laterally on a pair of guide rails 337 and 338 (see particularly FIGS. 13 and 14). The carriage 330 is biased to the left by means of a bellcrank 345 (see FIGS. 8 and 9) which is pivotally mounted on the base plate 61 of the machine by any suitable means, such as a pivot stud 346. The rear end of the longtiudinally extending arm of the bellcrank 345 is bent upwardly and bifurcated as by a slot 347 (FIG. 8). The slot 347 embraces a pin 348 (see FIGS. 9 and 16) mounted on a bracket 349 formed on the top frame plate 331. A strong spring 350 (FIG. 8) is tensioned between the forwardly extending arm of the bellcrank and the right side of the machine, thereby strongly biasing the bellcrank (counter-clockwise in FIG. 8) and the multiplier carriage 330 to the left.

An escapement mechanism, such as that shown and described in the three Friden multiplier patents above-mentioned, locks the multiplier carriage 330 against leftward movement. This escapement mechanism is operated by the escapement operating bar 319 (see FIG. 9), which is operated by the depression of any one of the value keys 310 or the "0" key 311. When so operated the escapement mechanism permits a single ordinal escapement of the multiplier carriage 330 to the left. Thus the entry of a value into the pinboard, to be described in the next paragraph, is also effective to permit a single ordinal movement, or escapement, of the carriage 330 to the left—thereby bringing the newly adjusted multiplier selection mechanism into an operative position.

It is customary, in the machine of the multiplier patents above-mentioned, to provide a pinboard comprising ten orders of eight banks of slidable value pins 355 (FIGS. 12 to 15) which are slidably mounted in the frame plates 331 and 332. These pins 355 are detented in either the retracted or projected position shown by spring detents 356 (FIG. 13). A pin is projected from its retracted position by operation of the respective bellcrank 321 (FIG. 9) and all are restored to the retracted position shown in FIGS. 11 and 14 by a restore plate 877 which will be described hereafter under the heading "Restore Mechanism." However, in any order one of the pins corresponding to the value of the key depressed will be projected upwardly for values of "1" to "8," as is shown in FIGS. 12 and 13, for the "5" value pin (the fifth such pin from the right). These pins represent values of "1" to "8," and are projected upwardly by depression of the corresponding value key. When so projected they serve as stops for the multiplier storage segment which will be described in Section (c) immediately hereafter. For a value of "0," the segment is retained in the position shown in FIG. 11 by a "0" latch 357, and when a value of "9" is inserted by depression of the "9" key 310, the corresponding segment is stopped by its engagement with the stop bar 335.

The "0" latch 357 just mentioned is resiliently biased to a blocking position, such as that shown in FIG. 11, by a suitable spring 358 (FIGS. 13 and 14). It is rocked (clockwise in FIG. 13 and counter-clockwise in FIG. 14) by means of a lever 359 (FIG. 9) which is pivotally mounted on frame plate 66. This lever is connected by means of a link 360 to a second lever 361, the forwardly extending nose of which protrudes through a slot in the lower frame plate 314 and underlies the escapement operating bar 319. Thus, the operation of any of the value keys 310 or "0" key 311, at the extreme depression of such keys, rocks the lever 361 and hence the lever 359 (counter-clockwise in FIG. 9), and thereby rocks the "0" latch 357 to its segment-releasing position.

(c) Multiplier Control Segments

The third element of the multiplier storage mechanism, as disclosed in the Friden multiplier patents above-mentioned, is a series of ordinally arranged multiplier segments, or storage members, which are normally latched in a "0" position by the respective "0" latches 357 and are permitted to assume an angular position corresponding to the value key depressed by the projection of one of the pins 355 into their path of travel. In the patents mentioned these segments are single members, but in my invention it is desirable to construct them in two portions, as shown particularly in FIGS. 10 to 14, inclusive. Preferably, these segments are rotatably mounted on the quill shaft 365 which is rigidly mounted in the carriage end plates 333 and 334, as shown particularly in FIG. 10. The segments themselves are formed in two sections: a bellcrank setting member 366 and a substantially circular storage segment 367. These two members, as shown in FIG. 10, are separated by a spacing hub 368, which can either be loosely mounted on the shaft as a separate member, or can be attached to either the first or second sections of the segment, as desired. This hub serves the purpose of a spacer between the two sections and also as a channel for holding a biasing spring 380 which forms part of the segment assembly. The first section of the ordinal segment assembly, i.e., the bellcrank 366 (as shown in FIGS. 11 to 14, inclusive) has a downwardly projecting leg 369 on the extreme end of which is formed a nose 370 adapted to be engaged by the coordinal "0" latch 357 when the segment is in its "0," or normal, position shown in FIG. 11. The second, or forwardly extending, arm 371 of the member 366 carries a detent arm 372 pivotally mounted thereon by any suitable pivot stud, such as a rivet 373. The detent arm carries a pin 374 at its free end which is adapted to engage the interdental spaces between a series of detenting teeth 386—carried by the second member 367. The detent arm 372 is resiliently biased upwardly into engagement with the detent teeth 386 by any suitable means, such as a tension spring 375 tensioned between an offset ear on the detent arm 372 and a stud 376 carried by a projection 377 on the member 366. The member 366 is biased to an extreme operative position (clockwise in FIGS. 11 to 13) by the suitable spring 380 tensioned between the stud 376 and a spring seat formed in the stop bar 335, which spring lies in a groove forming the periphery of the spacing hub 368. Needless to say, this member is latched in a "0," or inoperative, position by the "0" latch 357 when the mechanism is in its normal position. It will assume an incremental angular position when released by the "0" latch 357 determined by the projection of one of the "1" to '8" value pins 355 or the stop bar 335.

The second member 367 of each ordinal assembly comprises a substantially solid semicircular disk, as shown in these figures, with a forwardly projecting arcuate dial sector 385. The inner edge of this dial sector 385 carries the series of detent teeth 386 which engage the pin 374 carried by the detent arm 372 to resiliently latch the second member 367 to the first member 366. The upper portion of the segment is provided with a series of twelve gear teeth 387 corresponding to the values (reading counter-clockwise in FIGS. 11, 12, and 13, and clockwise in FIG. 14) of '0,' "1" to "9," and a "10," or second "0," and a twelfth tooth to mesh with the feed gear when the member is in its "0" position shown in FIG. 11. Of these teeth, the two "0" teeth 388 and 389 are of double thickness, so that they can also operate the shift initiating lever 646 to be described hereafter. It can be mentioned at this point that the gear teeth are engaged by a feed gear 586 and are either fed forwardly or backwardly until one of the "0" teeth 388 or 389 engages the end of the shift control lever 646 and moves it from the position shown in FIG. 13 to that shown in FIGS. 11 or 12. The operation of this shift control lever is effective to stop digitation in the particular order and to initiate a shifting operation in which register carriage 80 and the multiplier carriage 330 are shifted one order to the right, and thereafter initiates a subsequent series of digitation cycles in the adjacent order.

The second segment 367 is also provided with an arcuate slot 390, of constant radius, which is necessary to permit rotation of the segment with relation to a tie rod 391, which preferably is located to project through these members. This tie rod is necessary to support a plurality of value indicating interponents 805 which indicate whether the value standing in the segment is of the lower magnitude, preferably "1" to "5," or the higher magnitude, preferably "6" to "9," as will be explained shortly. On the right side of each member 367 and inside the slot 390 is rigidly secured an arcuate rack member 392 provided with a series of ten ratchet shoulders 393 which are spaced one angular value increment from one another. The ratchet teeth, or shoulders, 393 are adapted to be engaged by an ear 394 formed on a setting arm 395 that is pivotally mounted on the left side of the adjacent lower order segment 367. The setting arms 395 are pivotally mounted on their respective segments 367 by any suitable means, such as a pivot stud 384 that is located above the slot 390 (counter-clockwise therefrom in FIGS. 11 to 13 or clockwise in FIG. 14).

The setting arms are biased toward the center of the segment by a suitable tension spring 396 tensioned between the ear and a stud 397 on the member 367. The arm 395 has a long, arcuately extending tail 398 which extends downwardly and around the solt 390. The inner edge of this tail 398 is adapted to engage the tie rod 391 previously mentioned. The major portion of the tail 398 has a lesser radius from the center shaft 336, thereby holding the tail outwardly, as shown in FIGS. 11 and 13. In this position the ear 394 thereon is held away from the ratchet teeth 393 on the adjacent higher order member 367. Closer to the pivot 384 of the arm, the tail is bent outwardly to provide an offset portion 399 of greater radius from the center 336. This offset section 399 corresponds to the angular position of the segment with respect to tie bar 391, representative of a value of "9." Hence, when the segment 367 registers a value of "9," the spring 396 can move the arm 395 inwardly, whereupon the ear 394 thereon will engage one of the ratchet teeth 393 on the adjacent higher order segment. Then, as the segment is fed from its "9" position to its "10" position by the feed mechanism to be later described, such movement pushes the adjacent higher order segment one additional value increment. However, in all value positions other than "9," the tail 398 of the arm 395, from its engagement with tie rod 391, holds the ear 394 away from engagement with the adjacent rack teeth 393. It is only when the tie rod 391 registers with the offset section 399 that the arm 395 is enabled to rock inwardly and the ear 394 engages the teeth 393 of the adjacent higher order. It is apparent that only as the segment is fed from its "9" to its upper "0," or "10," position that the adjacent higher order segment 367 is carried along therewith. In this situation the spring 374 permits the detent arm 372 to yield, moving the pin 374 to the adjacent notch, after which the higher order segment is latched in the adjusted position through the detent mechanism.

2. Operation Control Keys

Preferably the machine with which my invention is associated, as shown and described in the two Friden multiplier patents above-mentioned, is equipped with three multiplication control keys, which are arranged around the multiplier value keyboard keys 310, as shown in FIG. 1. These three keys control three separate programs involving multiplication: (a) the "MULT" key 405 (FIGS. 1, 8 and 17) initiates a multiplication program which, in its overall operation, multiplies positively following the clearing of the register dials 84 and 89 and a shifting of the carriage to the extreme left-hand position shown in FIG. 1; (b) the "ACCUM MULT" key 406 (FIGS. 1, 8, 18 and 19) initiates a multiplication program that, in its overall aspects, is positive in nature following the initial positioning of the register carriage 87 but without clearing the registers, as this key is used to add one product to another; and (c) the "NEG MULT" key 407 (FIGS. 1, 8, 18 and 19) initiates a multiplication program that, in its overall operation, is negative in character and is used to subtract one product from a previously accumulated value. Each of these three keys, in my invention, perform the same overall functions that they do in the patents above-referred to, although the mechanisms by which they accomplish these purposes is much different from those described in those patents. However, it should be noted that each of these three keys performs three functions: initiates operation of the drive mechanism by closing the motor switch and engaging the clutch; conditions the multiplier mechanism for operation upon the operation of the shift override pawl; and initiates operation of the automatic shifting and clearing program heretofore described. In connection with the "ACCUM MULT" key 406 and "NEG MULT" key 407, it can be mentioned that they operate an auxiliary mechanism which disables the automatic clearing mechanism previously mentioned, so that these keys initiate a program in which the carriage is first shifted to the extreme left-hand position shown in FIG. 1, and then initiates multiplication without clearing the register.

It should be mentioned at this point that in my preferred embodiment, the multiplication mechanism is biased for a subtractive operation (a negative multiplication) but that this operation is normally prevented by a normally operative link which pulls the control mechanism to its positive position. This control link normally engages the control mechanism and is operated at the start of each multiplication operation unless the subtractive key 407 is used, so that the machine normally will operate additively. In a negative, or subtractive, multiplication operation, the link is disabled so that the normal bias of the mechanism toward a subtractive operation is permitted to control. Thus the operation of the "MULT" key 405 and the "ACCUM MULT" key 406 need only to initiate a multiplication operation, for the control link will normally affect an additive operation.

The operation of these three control keys will now be described, leaving the description of the automatic controls required for reversing the sign character of an operation when multiplying by the values of greater magnitude until Section 5 hereafter.

*(a) Multiplication With Clearing ("MULT" Key 405)*

The multiply key 405 is mounted on a key stem 410 (FIG. 17) that is slidably mounted in the multiplier frame plates 313 and 314 and is biased to a raised, or inoperative, position by the usual compression spring 411 seated on the lower frame plate 314 and against a seat formed in the key stem. This key is latched in a depressed position by the engagement of a shoulder 412 thereon with a latch 413. The latch 413 is rigidly mounted on a shaft 414 which is operated at the end of a multiplication operation to release the key, as will be explained in Section 6 hereafter.

The key stem 410 carries a roller 415 (FIGS. 8 and 17) which engages the forward end of a bellcrank 420 that is pivotally mounted on the intermediate frame plate 64 by any suitable means, such as a pivot stud 421. This bellcrank is resiliently biased by a spring 422 (see FIG. 17) which is tensioned between a seat in the lower arm of the bellcrank 421 and a second bellcrank 423, not pertinent in this connection. A roller 424 (see also FIG. 8) on the lower end of the lower arm of the bellcrank 420 bears against the forward edge of an arm 425 that is pinned to, or otherwise secured on, the right end of a shaft 426 (FIG. 8). The shaft 426 is axially aligned with, and in one sense constitutes an extension of, the initiating shaft 161. The two shafts 161 and 426 can be mounted in axial alignment by any suitable means, such as rotatably mounting the hub of arm 425 on the left end of the shaft 161 while pinning the arm to the shaft 426. The arm 425 carries a pin 427 that abuts the forward edge of an arm 428 that is pinned on, or otherwise rigidly secured to, the shaft 161. By this means the rocking of shaft 426 or arm 425 (counter-clockwise in FIG. 17) is operative to rock the shaft 161 in the same direction; and the rocking of this shaft, as shown in connection with FIG. 4, is effective to rock the rocker arm 157 to close the motor switch and cause engagement of the clutch 150. It is interesting to note, even though it isn't important in this case, that the shaft 161 may be operated by other keys which initiate a similar program, so some form of one-way connection is desirable. That is, the rocking of arm 425 and shaft 426 is always effective to rock arm 428 and hence shaft 161, but the reverse must not be true, for the rocking of shaft 161 when it is caused by other than multiplication operations, must not rock shaft 426, for shaft 426 conditions the machine for multiplication.

The second function of the rocking of shaft 426 is to condition the machine for a multiplication operation, for actual multiplication must be held in abeyance until shifting is completed. In the machine with which my invention is preferably associated, the actual initiation of multiplication is caused by the operation of the override pawl heretofore described. A preferred mechanism for accomplishing this purpose is shown in FIGS. 18 and 19 and comprises a bellcrank 435 which is pinned to, or otherwise rigidly mounted on, the extreme left end of shaft 426. This bellcrank is normally in the position shown in FIGS. 18 and 19. It will be remembered that the spring 163 (FIG. 4) is tensioned between the arm 160 and the frame plate 63. This spring rocks the shaft 161, and hence shaft 426, to their inoperative positions (clockwise in FIGS. 4, 18 and 19), as the cooperating arms 425 and 428 (FIG. 17) cause such rocking of shaft 161 to also rock shaft 426. The bellcrank 435 has a forwardly extending arm 436 which is provided with a downwardly facing shoulder 437 adapted to engage a pin 438 on a multiplication initiating link 439. A spring 440, tensioned between a seat in the forward end of the arm 436 and a stud on the link 439, resiliently biases the link to follow any rocking movement of the bellcrank. The operation of the link 439 will be discussed more fully in Section 3 hereafter, but for the moment it can be noted that when the link 439 is in the lower position shown in FIGS. 18 and 19, the rocking of the override pawl is ineffective to initiate a multiplication operation but when the link 439 is lifted as the shaft 426 and bellcrank 435 are rocked (counter-clockwise in these figures), the link is conditioned for operation by the override pawl and a multiplication operation will be initiated thereby.

The third function of the multiplication key is to clear the registers in the first machine cycle and condition the shifting mechanism for a series of left shift operations. Both of these operations follow the rocking of shaft 161. In view of the fact that these mechanisms have already been described, it need only be mentioned here that the depression of the multiply key 405, through its rocking of the shaft 161, is effective to initiate a series of machine operations by closing the motor switch and engaging the clutch through the mechanisms shown in FIG. 4; and, in the first cycle of operation, to clear the registers and to set the shift programming mechanisms of FIGS. 5 and 6 for operation beginning in the second machine cycle. It can also be noted that as the multiply key 405 is latched down, it maintains cycling of the machine and, therefore, the carriage is continuously shifted to the extreme left-hand position. In this machine the override mechanism, which includes the override pawl 291 (FIG. 3), slide 295 and the bail 299 (FIGS. 5 and 6), disables the shifting clutch and will operate the link 439 just mentioned. As the multiplier key is still latched down, the machine continues to cycle, but now the multiplication mechanism is in control and the shifting mechanism is disabled until the multiplication operation is completed. At the end of that operation, the key is released and the machine operation ceases.

*(b) Multiplication Without Clearing (the "ACCUM MULT" Key 406)*

The accumulative multiply key 406 is also effective to rock shaft 426 to initiate the program above-described, and in addition, disables the register clearing mechanism. This key is mounted on a key stem 445 (FIGS. 18 and 19) that is slidably mounted in the multiplier frame plates 313 and 314 and is biased to a raised, or inoperative, position by a suitable compression spring 446. A pin 447 in the lower end of the key stem is embraced within a slot 448 in the forward end of a control lever 449. The lever 449 is pivotally mounted on the left side control plate 65 by any suitable means, such as a pivot stud 450. Preferably a light spring 451, tensioned between the rear end of the lever and a stud on the frame plate, helps to maintain the lever 449 in its inoperative position shown.

An interponent lever 452 is mounted immediately below lever 449 and slightly to the left thereof, being pivoted on a long pivot stud 453 secured to the rear portion of the control plate 65. This interponent, at its forward end, carries a pin 454 which engages the lower edge of the lever 449. The interponent lever 452, at an intermediate point, supports a hanging link 455 which is pivotally mounted thereon, as by a pivot stud 456. This link is formed with a slot 457 at its lower end, which slot embraces a pin 458 riveted on, or otherwise rigidly secured to, the second arm 459 of the bellcrank 435. Thus the rocking of the interponent lever 452, which can be secured by the depression of the key 406, is effective to rock the bellcrank 435 and hence shaft 426. Such rocking of the bellcrank 435 will, of course, condition the control link 439 for operation and will also rock shafts 426, 161 to initiate machine operation and the left shifting of the carriage 80 described in connection with the operation of key 405. However, the rocking of lever 452 is effective to disable the clear clutch operating mechanism, so that the registers will not be cleared from depression of the key 406.

The mechanism for disabling the clear clutch operating mechanism is operated by the depending link 455 (FIGS. 18 and 19). This link carries a pin 465 which is embraced within a slot 466 formed in the substantially horizontal and forwardly extending arm of a bellcrank 467. This bellcrank is pivotally mounted on the extreme left end of a feed control shaft 468. The downwardly extending arm of the bellcrank 467 has a slightly beveled corner which engages a pin 469 on the free end of an arm 470. This arm is pinned to, or otherwise rigidly secured on a short transverse shaft 471 that is journalled in, and extends between, the left side control plate 65 and the intermediate frame plate 64 (see also FIG. 17). An arm 472 is rigidly secured on the inner (right-hand) end of this shaft 471 (FIG. 17), which arm carries a pin 473 lying closely adjacent the upper edge of the forward extending arm of a bellcrank 474. This bellcrank is pivotally mounted on the shaft 268, and its rearwardly extending leg carries an ear 475 which underlies the rear end of the pusher link 240. Thus, the rocking of shaft 471 (counter-clockwise in FIGS. 18 and 19 and clockwise in FIG. 17) rocks the bellcrank 474 to lift the pusher link 240 upwardly and away from engagement with the forward end of the clear clutch control rod 239. Obviously the rocking of the interponent lever 452, from depression of the key 406, will rock the bellcrank 467 (clockwise in FIGS. 18 and 19), whereupon the beveled lower corner of the downwardly extending arm will cam the pin 469 and its arm 470 downwardly to rock the shaft 471. By this means, depression of the key 406 is effective to disable the register clearing mechanism, while simultaneously rocking shaft 426, 161 to initiate machine operation.

Incidentally, it can be noted that the key stem 445 carries a forwardly extending nose 460 which is adapted to be engaged by a latch 461 that is also rigidly mounted on the transverse shaft 414. It is, therefore, obvious that the key 406 is latched in its depressed position, and the clear clutch is disabled throughout the multiplication operation initiated by depression of this key.

(c) *Subtractive Multiplication, Without Clearing ("NEG MULT" Key 407)*

The subtractive, or negative, multiplying key 407 is usually placed immediately behind the accumulate multiplying key 406. This key is mounted on a key stem 480 (FIGS. 18 and 19) which is slidably mounted in the upper and lower frame plates 313 and 314 and is biased to a raised, or inoperative, position by a suitable compression spring 481. This key stem has a long, forwardly extending nose 482 which lies immediately adjacent the nose 460 on accumulate multiplier key stem 445, both terminating in the same transverse plane and both adapted to be engaged by the latch member 461. A pin 483 is riveted on, or otherwise rigidly secured to, the lower end of the key stem 480. This pin is embraced within a slot 484 formed in the forward end of a negative, or subtractive, multiplying control lever, or arm, 485. This control lever 485 is also pivoted on the stud 450, and extends toward the rear of the machine considerably beyond the rear end of the accumulate multiplying control arm 449, as shown in these figures. This arm is held in its inoperative position by a suitable spring 486 tensioned between a stud on the arm and a stud on the control plate 65. This subtractive control lever 485, as shown in FIGS. 18 and 19, lies to the right of, or inboard of, the accumulate multiply control lever 449, and its lower edge also engages the pin 454 on the front end of the interponent lever 452. Thus, the depression of the negative multiply key 407 and the consequent rocking of the subtractive control lever 485 (clockwise in these figures) also operates lever 452 to initiate operation of the machine and the programming of the left shift of the carriage 80 to the extreme left-hand, or home, position and simultaneously disables the clearing mechanism.

In addition, the depression of the key 407 reverses the sign character of the operations to be performed in a multiplication operation. This is accomplished by extending the lever 485 rearwardly, as shown in these figures. At its extreme rear end the lever carries a pin 487 which is embraced within a slot 488 formed in the forward end of an arm 489. The arm 489 is pinned to, or otherwise rigidly secured on, a shaft 490, the rocking of which (counter-clockwise in these figures) is effective to adjust the machine for operations in the reverse sign character from that normally used. The mechanism for this purpose will be described in Section 5 hereafter. For the moment, it can be noted that the rocking of shaft 490 will cause the machine to operate subtractively in multiplying values of lower magnitude, such as numbers of "1" to "5," and to operate additively for the higher values, i.e., "6" to "9."

3. *Initiation of Multiplication*

It has already been mentioned that the depression of one of the multiply control keys 405, 406 or 407 initiates machine operation and the left shift program which has been heretofore described. When the carriage 80 reaches its extreme left-hand, or home, position shown in FIG. 1, the override pawl 291 (FIG. 3) is rocked by the attempted overshifting of the carriage. The rocking of the override pawl 291 depresses the slide 295, which rocks bellcrank 297 (and pushes the link 298 (see FIGS. 4 and 7) forwardly. Such movement of the link 298 rocks the disabling bail 299 (clockwise in FIG. 4) to disable the left shift clutch and thereby terminate the shifting operation. The rocking of the bail 299 also is utilized to initiate the multiplication operation by a mechanism shown principally in FIGS. 4 and 7.

An arm 500 is associated with the bail 299 so as to be operated therewith. This can be secured either by forming the arm 500 integrally with the right-hand leg of the bail 299, or by pinning the arm 500 on, or otherwise rigidly securing it to, the shaft 268, on which the bail 299 is also rigidly mounted. In either event the arm 500 rocks with the bail 299 (clockwise in FIG. 4). A pin 501 riveted to, or otherwise rigidly secured on, the lower end of this arm, is embraced within a slot 502 formed in the upper edge of a link 503. This link is resiliently biased upwardly by a suitable spring 504 tensioned between a seat in the rear end of the link and a stud on the right-hand frame plate 63, thereby resiliently holding the slot 502 in engagement with the pin 501. The forward end of the link 503 is pivotally mounted on an arm 505 by any suitable means, such as a long pin 506. The arm 505 is pivotally mounted on the outside (right side) of the frame plate 63, as by a pivot stud 507. This arm also supports the rear end of a forwardly extending link 508 which is pivotally mounted thereon by any suitable means, such as a pivot pin 509. The forward end of this link is pivotally supported upon an arm 510 by any suitable means, such as a pin 511. The arm 510 is rigidly mounted on the right end of a transverse shaft 512, the right end of which is journalled in the right side frame plate 63 and the left end of which is journalled in the left side control plate 65 (as shown in FIGS. 8, 18 and 19).

An arm 513 is pinned to, or otherwise rigidly mounted on, the extreme left end of the shaft 512. This arm is formed with a laterally extending ear 514 which is adapted to engage a forwardly extending shoulder 441 formed on the forward end of the initiating link 439. When the link is in its lower, or inoperative, position shown in FIGS. 18 and 19, the shoulder 441 lies below the lower edge of the ear 514, so that the rocking of the arm 513 has no effect upon the initiating link 439. However, when the initiating link 439 is lifted by the rocking of bellcrank 435, the shoulder 441 rises to the position in which it will be engaged by the ear 514 when the arm 513 is rocked. It is obvious that the operation of the override pawl and the rocking of bail 299, by means of links 503 and 508, will rock the shaft 512 (clockwise in FIGS. 4, 18 and 19), and that the rocking of this shaft will, if the shoulder 441 engages arm 514, move the link 439 rearwardly. Such movement of the link is, of course, prevented if the forward end of the link is in the lower position shown—but is enabled when the forward end is permitted to rise from the rocking of the bellcrank 435. It can be mentioned here that the rearward translation of the initiating link 439 is effective to initiate the multiplication operation that will be described in the next section.

4. *Multiplication Programming Mechanism*

A multiplication programming mechanism controls the enabling and disabling of the feed mechanism for moving the operative multiplier segment to one of its "0" positions during continuous cycles of operation (in each of which cycles the keyboard value is entered into the accumulator dials); at the end of an ordinal series of operations (i.e., upon feeding of the segment to one of its "0" positions), disabling the feeding mechanism and simultaneously enabling the right shift of the register carriage 80 and the multiplier pin carriage 330; and, finally, reinitiating a continuous series of operations in the adjacent ordinal positions of the two carriages. The operation of this program mechanism is initiated by the rearward translation of the control link 439 by the means just described.

It is seen by reference to FIGS. 18 and 19 that the rear end of the link 439 is pivotally connected to a clutch bellcrank 525 by any suitable connection, such as the pivot pin 526. The bellcrank 525 is pivotally mounted on the frame plate 65 by any suitable means, such as a pivot stud 527, and is biased to its latching position (the clockwise position shown in FIG. 18) by a suitable spring 528 tensioned between a stud on the bellcrank and another carried by a program bellcrank 564 to be described shortly. A pin 529 on the forward end of the bellcrank 526 engages the upper edge of the program bellcrank 564 to prevent overrocking by the bellcrank 525 and to hold the bellcrank in a clutch-engaging position when the program bellcrank 564 is rocked from the position shown in FIG. 18.

(a) *Program Clutch and Cams*

The rocking of the bellcrank 525 controls what can be loosely called a "half-cycle clutch" assembly 530 shown in considerable detail in FIGS. 20, 21 and 24. This "clutch," as it may be loosely called, rotates approximately 180° to a half-cycle position to initiate the multiplication program; and is then latched in that position until the multiplication operation is completed and the multiplying mechanism is restored to its normal ineffective position—at which time the clutch is released from its half-cycle position and allowed to return to the full-cycle position shown. The driving side of the clutch rotates constantly, being driven by a driving gear 531 mounted on the extreme left end of the main drive shaft 132. This gear is constantly in mesh with a driven gear 532 which forms a part of a compound gear assembly. The driven gear 532 is secured to a stub shaft 533 that is journalled in bearings in the left frame plate 65 and a bracket 534 mounted thereon. The compound gear comprises a hub 535, a second gear 536 (which is a full gear of the same size and pitch as the gears 531 and 532), and a single tooth gear 537. The driven side of the so-called "clutch" is mounted on the left end of a short shaft 538 journalled in the bracket 534 and frame plate 65, as shown in FIG. 21, and extends inwardly therefrom for other purposes not here pertinent. The driven portion comprises a gear 539 adapted to mesh with a gear 536, which gear 539 has two teeth removed at diametrically spaced points, one of which mutilated sections 540 registers with the gear 536 when the parts are in their full-cycle position shown in FIGS. 18 and 20, and the other oof which will register with the gear 536 at the half-cycle position of the driven section. It is obvious that the gear 539 will rotate through half a revolution, or an arc of 180° in the last half-cycle of operation of the main drive shaft 132 and the compound gear assembly 532 and 536, and will then come to rest. This gear is, of course, affixed to the shaft 538. It also carries a spring seat disk 541, which is likewise rigidly secured to the gear 539 or the shaft so that it will rotate with the gear. This disk has two arms: one arm 542 of which forms a spring seat for a tension spring 543; and the other arm of which carries a laterally extending ear 544 which forms a stop for a disk member 546. The disk 546 is rotatably mounted on the shaft 538 and is provided with four arms: an arm 545 which forms a seat for the spring 543; an arm 547 which forms a stop adapted to abut against the ear 544 and also carries a single gear tooth 559; an arm which carries a laterally extending ear 548 which normally is engaged by the end of the bellcrank 525; and an arm which carries an ear 549 and a single tooth 558 which is adapted to be engaged by the single tooth of the gear 537 when the disk 546 is permitted to rock (counter-clockwise in FIGS. 18 and 20) when released from the normal position in which it is held by the rear arm of the bellcrank 525. Normally the assembly lies in the angular position shown in FIG. 20, in which one of the mutilated sections 540 of gear 539 registers with the gear 536, whereby the gear 536 can rotate freely without rotating gear 539. The assembly is held in this position by means of a detent which comprises a disk 550 with diametrically opposed notches 551 which are engaged by a roller 552 (FIG. 18) carried by the forward arm of a detent lever 553 which is biased into engagement with the disk by any suitable means, such as a spring 554. When the disk 546 is held by the control bellcrank 525 (as shown in FIG. 18), its tooth 558 is rocked so far away from the path of the single tooth on gear 537, that it cannot be engaged thereby. However, when the control bellcrank is rocked, as it is by the translation of control link 439 upon the attempted overshifting of the carriage, it releases the disk 546 and thereupon the spring 543 rotates it (counterclockwise from the position shown in FIG. 18 to the position shown in FIG. 20). At that time the tooth 558 will be engaged by the single tooth of gear 537, and hence will rotate the assembly as the arm 547 is then abutting the ear 544. Upon the slight rotation so provided, the teeth of gear 539 will be brought into engagement with the teeth of gear 536, and thereafter the two will rotate together until the ear 549 is engaged by the rearwardly extending arm 555 of the V-shaped lever 556 that is pivotally mounted on a shift control shaft 567. The V-lever 556 is resiliently biased to such engaging position by a suitable spring 557.

When the ear 549 is so engaged by the end of arm 555, the disk 546 is rocked clockwise with respect to the gear 539 and the first-mentioned disk 541, again tensioning spring 543. At this point the second mutilated section 540 of gear 539 is registering with the gear 536, so the one no longer drives the other. It can be mentioned here that when, at the end of the multiplication operation, the lever 556 is rocked (counter-clockwise in FIG. 18), the arm 555 releases ear 549, whereupon the spring 543 again rocks the starting disk 546. When this occurs, a second tooth 559 thereon rocks into the position in which it can be engaged by the single tooth of gear 537, and the assembly rotated another half-cycle back to the original position shown in FIG. 18.

The shaft 538 carries two control cams: a program control cam 560 adjacent the left side control plate 65 (to the left in FIG. 21, which is a rear view of this assembly); and a shift control cam 561, which is located on the outside, or to the left, of the cam 560 (to the right in FIG. 21). The profiles of these two cams are shown in FIGS. 23 and 22, respectively, in which figures they are shown in their normal, or full-cycle, position. These cams are engaged, respectively, by a follower roller 562 carried by the forwardly extending arm 563 of a program bellcrank 564 that is pinned on, or otherwise rigidly secured to, the shaft 527; and a follower roller 565 (see particularly FIG. 24) mounted on the upper end of a shift control arm 566 that is pinned to, or otherwise rigidly secured on, the shift control shaft 567.

The program control bellcrank 564 is strongly biased to an operative position (counter-clockwise from that shown in FIGS. 18 and 19) by a strong spring 568 tensioned between a stud on the frame plate 65 and a seat on the rearwardly extending arm 569 of the bellcrank 564. It will be seen by reference to FIG. 23 that, immediately after the driven assembly of the so-called "clutch" 530 starts to rotate, the lobe of the cam 560 passes out from under the roller 562 (the shaft 538 and consequently the cam 560 rotating in a counter-clockwise direction in FIG. 23). Thus, the program control bellcrank 564 is enabled to rock immediately after the driven portion of the clutch 530 starts to rotate. It can be mentioned at this point that the override mechanism is effective to translate the link 439 rearwardly, and hence cause the control bellcrank 525 to release the disk 546 at approximately the 90° position of the main drive shaft 132. Then the single tooth gear 537 will pick up the tooth 558 of disk 546 and start the rotation of the driven assembly and shaft 538 at approximately the 180° position of the main drive shaft. Almost immediately the program bellcrank 564 rocks to its operative position under the force of its spring 568. The rocking of the bellcrank 564, and consequently of the shaft 527 on which it is rigidly secured, is effective to operate a programming mechanism that will be described in subsection "b" below.

It is seen by reference to FIGS. 22 and 24 that the angular position of cam 561, which begins to rotate at about the 180° position of the main drive shaft, will not permit the roller 565 to pass from the lobe thereof until after about 120° of rotation (or approximately the 300° position of the main drive shaft). This roller 565 is mounted on the free end of the shift arm 566, as previously mentioned. This arm is pinned to, or otherwise rigidly mounted on, the shift control shaft 567 which extends entirely across the machine from the left-hand control plate 65 to the right-hand frame plate 63 (see also FIGS. 4, 7 and 8). The shaft 567, and consequently the arm 566 and roller 565, are resiliently biased to a shift-initiating position (counter-clockwise in FIGS. 18 and 24) by a strong spring 570 tensioned between any suitable seat, such as shaft 527, and a stud on an arm 571 pinned to, or otherwise rigidly secured on, the shaft 567 immediately adjacent thereto. However, it will be obvious that this shaft is not permitted to rock under the bias of spring 570 until approximately the 300° position of the main drive shaft, in the cycle in which the override mechanism has initiated operation in multiplication, and some 120° after the rocking of the program bellcrank 564.

(b) Programming Mechanism

The rocking of the spring-powered bellcrank 564 by its spring in the first few degrees of rotation of the cam 560, conditions the multiplication programming mechanism for operation. This mechanism, in common with the Friden multiplier patents mentioned above, performs three functions in each ordinal series of operations: (1) it enables the feed mechanism by means of which the multiplier segment 367 in the operative order is incrementally moved from its adjusted to one of its "0" positions; (2) it enables operation of the shift sensing member which senses the feeding of the operative segment to one of its "0" positions and thereupon initiates a shift of the register carriage 80 and the multiplier carriage 330 one order to the right; and (3) sets the sign character control mechanism for the overall operation as determined by the depression of the multiplier control keys. The first of these mechanisms is controlled by the rocking of the bellcrank 564, and the latter two are controlled by the rocking of the shaft 527 on which the bellcrank 564 is rigidly mounted.

(1) *Feed mechanism.*—The bellcrank 564 is connected to a link 575 (FIGS. 18 and 24) by any suitable pivotal connection, such as a pin 576. The other end of the link 575 is provided with a slot 577 which embraces a pin 578 on the free end of an arm 579. The arm is pinned to, or otherwise rigidly secured on, the shaft 468, the left end of which extends through, and is journalled in, the left side control plate 65 and the auxiliary frame plate 66, as shown in these figures. The arm 579 is resiliently biased to a raised position, and consequently the shaft 468 is biased in a clockwise direction when viewed from the left (as in FIGS. 18 and 24), by a suitable spring 580 tensioned between a seat in the arm 579 and a stud on the frame plate 65. It is obvious that as the bellcrank 564 is permitted to rock (counter-clockwise in FIGS. 18 and 24), the lifting of link 575 enables the spring 580 to rock arm 579, and consequently shaft 468, to what can be called its "operative" position. Normally, however, the arm and shaft are held in an inoperative position by the rocking of the bellcrank 564 to its inoperative (clockwise position in these figures) position. The pin-and-slot connection 577, 578 is necessary in order to enable the shift control means to rock the shaft 468 counter-clockwise from its operative position at the end of each ordinal series of multiplication operations, so that digitation can be blocked while the two carriages are shifted one order to the right.

The right end of the shaft 468 carries an arm 581 (FIGS. 24, 26 and 27). The rocking of this arm 581 (clockwise in FIG. 24 and counter-clockwise from the position shown in FIG. 26 to that shown in FIG. 27) engages a segment feed mechanism 585, which includes a segment driving gear 586, with the teeth 387 of the operative multiplier segment 367.

The feed mechanism 585, in its preferred form, comprises a rocker 587 (FIGS. 26, 27 and 30) which is journalled on a stub shaft 588 extending to the right from the left side frame plate 66. A link 589, connecting the lower end of arm 581 and rocker 587, controls the positioning of the arm 587 in either the position shown in FIG. 26 or that shown in FIG. 27—in the first of which the multiplier feed mechanism is inoperative as the feed gear is disengaged from the gear teeth 387 of the control segment, while in FIG. 27 the two gears engaged. The arm 587, as shown in FIGS. 26, 27 and 30, and the gear train mounted thereon and to be described in the next paragraph, can be most simply arranged by providing the arm with a relatively large aperture 590 which surrounds the main drive shaft 132 and is sufficiently large to permits rocking of the arm 587 to either extreme position without touching the drive shaft 132.

The gear train which drives the gear 586 is best shown in FIGS. 26, 27 and 30. In its preferred form, the gear 586 is rigidly secured to a short shaft 591 (best shown in FIG. 31) journalled in the upper end of the rocker 587. This shaft also carries a pinion 592, also rigidly secured thereon. The pinion 592 is constantly in mesh with a large idler 593 which is rotatably mounted on an enlarged hub 594 secured in the walls of the aperture 590. The idler, in turn, meshes with a feed gear 595 which is rigidly mounted on a sleeve 596 that is rotatably mounted on the shaft 588. The right end of the sleeve 596 (as best shown in FIG. 30, but as is also shown in FIGS. 28 and 29) carries a star wheel, or feed plate, 597. This star wheel will be operated as explained in the next paragraph, but at the moment it should be noted that the gear train running from the star wheel 597 to the feed gear 586 is normally detented in any position by means of a detent arm 598, the nose of which engages the interdental spaces of the teeth of the feed gear 595. As is common in the art, the detent 598 is resiliently biased into engagement with the gear 595 by any suitable spring means, such as a tension spring 599 tensioned between ears on the detent arm 598 and the rocker 587.

The operating mechanism 609 for giving the star wheel 597 increments of rotation in successive cycles of operation, is shown in FIGS. 28 to 30, inclusive. The mechanism preferably is actuated by an eccentric 610 mounted on the main drive shaft 132 immediately to the left of the left side frame plate 62. The feed assembly, indicated generally at 609, includes an enclosed cam follower arm 611 enclosing and rotatably mounted on the eccentric 610 and hanging therefrom. The lower end of the follower arm 611 is slotted, as at 612, to embrace a pin 613 riveted to, or otherwise rigidly secured on, the left side of the frame plate 62, thereby limiting the follower arm 611 to a substantially vertical reciprocation as the shaft 132 and eccentric 610 rotate. An interponent 614 is pivotally mounted on the lower end of the follower arm 611 by any suitable means, such as a stud 615. This interponent pivotally supports a pair of feed arms 616 and 617, each of which is provided with a laterally extending ear 618 and 619, respectively, which ears are adapted to engage the teeth of the star wheel 597. Both arms are pivotally mounted on the interponent 614 by any suitable means, such as their respective studs, or rivets, 620 and 621. A pin 622 is secured to the interponent 614 at an intermediate point thereof, in a position to hold the two arms slightly parted against the tension of a spring 623 which resiliently biases the diverging links 616 and 617 toward each other and both toward engagement with the teeth of the star wheel 597—the spring being tensioned between ears on the respective links. The links are so shaped as to diverge slightly at their upper ends, and the ends are bent over to form the ears 618 and 619, respectively. These ears are so located that only one ear at a time can engage the star wheel. Thus, for example, FIG. 28 shows the additive link 617 adapted to engage the teeth of the star wheel, while FIG. 29 shows the subtractive link 618 adapted to engage the teeth of the wheel, both views being left side views of the feed assembly 609. Thus, the reciprocation of the cam follower 611 will be adapted to rotate the star wheel 597 in either direction (counterclockwise in FIG. 28 or clockwise in FIG. 29), depending upon the angular position of the interponent 614.

The interponent 614 is positioned by the rocking of a digitation control shaft 624 which will be rocked by the shortcut control mechanism described in Section 5 below. For the moment it can be noted that an arm 625 is pinned to, or otherwise rigidly secured on, the right end of the shaft. This arm, at its outer end, carries a pin 626 which is embraced within a slot 627 formed in the forwardly extending arm of a bellcrank member 628. The bellcrank is pivotally mounted on the intermediate left side frame 66 by any suitable means, such as a pivot stud 629. The depending arm of the bellcrank 628 also is formed with a slot 630 (see FIG. 30 particularly) which embraces a pin 631 secured to the upper end of an offset arm 632. This arm is pinned to the left side frame plate 62 by any suitable means, such as a pivot stud 633. It will be obvious, from the linkage shown, that the arm 632 will assume the position shown in FIG. 28 or that shown in FIG. 29 from the rocking of the shaft 624. This rocking of the arm 632 is utilized to position the interponent 614 which, as shown in FIGS. 28 to 30, has a rearwardly extending tail 634, the outer end of which carries a pin 636 which engages the forward face, or edge, of the arm 632. A spring 635, tensioned between the tail 634 and the offset portion of the arm, causes the interponent 614 to rock between the position shown in FIGS. 28 and 29 in accordance with the rocking of the arm 632. By this means the rocking of shaft 624 is operative to control the positioning of the two interponents 616 and 617, and thus determines the direction of rotation of the star wheel 597 and consequently the feed gear 586. This determination regulates the direction of feed of the operative segment 367 and so controls whether it will be fed backwardly toward "0" (clockwise in FIGS. 26 and 27) or forwardly to a "10" position (counter-clockwise in these figures).

Before leaving the subject of the incremental feed of the multiplier control segments by means of the feed gear 586, it should be noted that the feed mechanism is disabled at the end of each ordinal series of operations by the operation of the shift-initiating member. The mechanism for this purpose is shown in FIGS. 24 and 32, and includes a cam arm 582 pinned to, or otherwise rigidly secured on, the shaft 468. The rearward, or outer, end of this arm extends obliquely upwardly, and is adapted to be engaged by a roller 749 carried by the shift-initiating arm 571. The operation of this arm will be explained in subsection (c) below. For the moment, however, it can be noted that as the shift-initiating arm 571 rocks to its disengaging position (counter-clockwise in FIGS. 24 and 32), the roller 749 engages the oblique tail 583 of arm 582 and, consequently, rocks the arm 581 and shaft 468 (counter-clockwise in FIGS. 24 and 32, or clockwise in FIGS. 26 and 27). Such rocking of the arm 581 rocks the drive gear train 585, including the rocker 587 (clockwise from the engaged position shown in FIG. 27 to the disengaged position shown in FIG. 26). This disabling of the feed continues until the shift control arm 571 is rocked back to the inoperative position shown in these figures by its cam 723.

(2) *Condition "0" sensing mechanism for operation.*— It has already been mentioned that the multiplier segments are each provided with a wide "10" tooth and a wide "0" tooth 389 (see FIGS. 11 to 14). These wide teeth are adapted to engage a widened face 645 (FIGS. 10, 24 and 32) formed on the lower, or free, end of a "0" sensing arm 646. In most operations of the machine the arm 646 is held in an inoperative position (shown in FIG. 32). When the machine is conditioned for multiplication the sensing arm 646 is released, so that the face 645 thereof will be resiliently biased (counter-clockwise in FIG. 32) and the ear 645 will lie inside of the periphery of the operative segment 367. When the operative segment moves to its "0" or its "10" position, the wide tooth 388 or 389 engages the face 645 to rock the arm 646. This rocking, as is true in the Friden multiplication machines above-mentioned, is utilized to terminate the segment feed in that order and to initiate a shifting operation.

For the moment we are concerned with the fact that the "0" sensing arm 646 is normally held in the inoperative position shown in FIG. 32, and is released for operation by the rocking of the control bellcrank 564 (FIGS. 18 and 24). The mechanism for this purpose is shown in FIG. 32. It will be noted by reference to this figure that the arm 646 is pivotally mounted in the machine by any suitable means, such as a pivot stud 647 carried by the auxiliary side frame plate 66. The sensing lever 646 is formed as a bellcrank, with a rearwardly extending arm which carries a pin 648. This pin 648 is embraced within a slot 649 formed in the forward end of an arm 650 that is pinned to, or otherwise rigidly secured on, a shaft 651. The shaft 651 is journalled in the left side control plate 65 and the auxiliary side frame plate 66, extending sufficiently to the right of the latter to carry the arm 650 on the right-hand side thereof. Somewhat to the left of the auxiliary frame plate 66, the shaft 651 carries a depending arm 652 which is pinned to, or otherwise rigidly secured on, the shaft 651. The lower end of this arm is formed with a laterally extending ear 653 which is engaged by an arm 654 that is rigidly mounted on the shaft 527. When the machine is not operating in multiplication, the arm 654 engages the ear 653 and rocks the arm 652 (counter-clockwise in FIG. 32), and that, in turn, rocks the "0" sensing arm 646 (clockwise in this figure) to its inoperative position. When, however, the shaft 527 is rocked (counter-clockwise in FIGS. 18 and 32), the arm 654 releases the arm 652, whereupon the assembly of the sensing arm 646 and shaft 651 are rocked to their operative positions by any suitable means, such as a spring 655, tensioned between an ear on the arm 650 and a stud 656 on the auxiliary frame plate 66. By the means just described the rocking of the control bellcrank 564, and the shaft 527 on which it is secured, is effective to release the "0" sensing mechanism for operation.

(3) *Set sign character of multiplication operation.*—The third effect of the rocking of the shaft 527 at the start of the multiplication program, i.e., at approximately the 180° position in the override cycle, is to set the sign character control mechanism for an additive or subtractive overall operation. This setting must not be confused with additive and subtractive entry of values into the register dials 84, or, as it is sometimes called, the "plus" or "minus" digitation. That (the "plus" or "minus" digitation) is controlled by the "short cut" mechanism to be described later in Section 5. Here we are considering the overall aspects of operation in which the product is to be entered additively or subtractively into the register. In one sense this does, in part, control the plus or minus operation of the machine, for the overall sign character of the multiplication operation remains the same as that set at the outset of the program. The sign character of digitation in any order is set more directly by the "short cut" mechanism so that when the multiplier value is of lower magnitude ("1" to "5" in the present machine), digitation is in the selected sign character, and in the reverse sign character when of a higher magnitude ("6" to "9" in the present machine).

It will be seen by reference to FIG. 32 that the shaft 527 carries a second arm 660 rigidly mounted thereon. The rear end of this arm pivotally supports a link 661 by any suitable means, such as pivot stud 662. The upper end of the link is supported for rocking movement about the pivot 662 by a suitable pin-and-slot connection comprising a slot 663 in the upper end of the link, which embraces a pin 664 carried by the right arm of a T-shaped lever 665. This lever is pivoted on the auxiliary frame plate 66 by any suitable means, such as a screw stud 666, and is biased rearwardly (counter-clockwise in FIG. 32) by any suitable resilient means, such as a spring 667, tensioned between a stud on the other arm of lever 665 and a stud on the frame plate, as shown. When the parts are in the position shown, the machine is set for additive multiplication. In this event, a hook, or shoulder, 668 engages a pin 669 on a control lever 670. However, if the T-shaped positioning arm 665 is rocked forwardly (clockwise in this figure), the shoulder will be disengaged from the pin 669. Obviously, when the shaft 527 is rocked (counter-clockwise in this figure) at the start of the multiplication program, which occurs approximately at the 180° position of the override cycle, the link 661 will be pulled downwardly. At this time the link will pull the arm 670 downwardly if the link 661 is in the additive position shown, but will have no effect on this arm if the positioning lever 665 has been rocked forwardly to disengage the shoulder 668 from the pin 669.

It can be mentioned at this point that the forward end of the lever 670 carries a roller 671 (see also FIG. 33) which lies within a slot 672 formed in a sign character control link 673. This link is pivotally mounted on a cam follower bellcrank 830 which is best described in Section 5 below. For the moment, however, it can be noted that the digitation control mechanism, including the arm 670 and control link 673, are normally held in their positions shown in FIGS. 32 and 33 in which the machine is conditioned for subtractive operation. However, if the link 661, when operated, engages the pin 669 and rocks the arm 670 and its roller 671 downwardly from the position shown in FIG. 33, the control link 673 is set for additive overall operation.

The position of the positioning arm 665 is controlled by an arm 491 (FIG. 32) which is pinned to, or otherwise rigidly mounted on, the subtractive control shaft 490. It will be recalled that this shaft is rocked by the depression of the negative multiply key 407, but not by the other multiplication control keys. The depression of the negative multiply key 407 rocks the shaft 490 (counter-clockwise in FIGS. 18 and 32), whereupon a nose 492 on the lower end of arm 491 engages a stud on the rear arm of the positioning lever 665, thereby rocking the lever 665 forwardly (clockwise in FIG. 32) to disengage the shoulder 668 from pin 669. Thus, in most multiplication operations (those initiated by the depression of the multiply key 405 or the accumulative multiply key 406), the arm 670 is pulled down by link 661 to set mechanism for an additive multiplication.

Associated with the control link 673 is a rocking plate 680 (FIG. 33) that is pivotally mounted on the adjacent frame plate 66 by any suitable means, such as a pivot stud 681. This plate 680 carries two pins 682 and 683 which are adapted to engage slots 674 and 675 formed in the rear end of the control link 673. A third pin 684, at the other corner of the triangular rocking plate 680, engages a slot 685 formed in the forward end of an offset arm 686 (best shown in FIG. 8) that is pivotally mounted, as by a stud 687, on a digitation control arm 688. This arm is rigidly mounted on the left end of the digitation control shaft 145, so that the rocking of the arm 688 will control the operation of that shaft to cause either additive or subtractive operation of the machine. Associated with the arm 686 is a second arm 689, also mounted on the stud 687, and riveted to the arm 686 by some suitable means, such as rivet 690. A spring 691 tensioned between a stud on the arm 689 biases the arms 689, 686 downwardly (clockwise in FIG. 33) and the triangular rocking plate 680 in the opposite direction. This is the subtractive position for this mechanism.

It is seen by reference to FIG. 33 that the control link 673 is provided with a cam surface 676 leading into the additive slot 674 and a corresponding cam face 677 leading into the minus slot 675. These cam faces are so formed that the rocking of the control link 673 will cause the cam faces 676 or 677 to engage the pins 682 or 683, and thereby rock the rocking plate in one direction or the other as the control link 673 is rocked about its pivot 678. Thus, as the control link 673 is rocked (counterclockwise in FIG. 33), as it is when the machine is conditioned for additive operation, the triangular rocker 680 is rocked in a clockwise direction. Similarly, if the machine is in the position for an additive operation, the rocking of the control link 673 in the opposite direction (clockwise in this figure), will rock the triangular control plate 680 in the counterclockwise direction.

It can be mentioned at this point that the rocking of this triangular control plate 680 does not, in itself, position the digitation control shaft 145 from its normal neutral position. It also can be mentioned that normally this shaft is held in its neutral position shown in FIGS. 2 and 33 by a spring centralizer, which is old in the art and is shown in some of the Friden patents above-mentioned. The rocking of the plate 680 rocks the link which connects this plate to the arm 688 on digitation control shaft 145, raising it from the position shown in FIG. 33 for additive operation, or bringing it to the position shown for subtracting. However, such rocking of the link does not directly position the arm 688 or shaft 145—it merely conditions a power-setting mechanism, which will shortly be described, for operation.

The rocking of the combined link 686, 689, which actually is two links riveted together, does not, in itself, position the digitation control shaft 145. This is accomplished by longitudinal translation of the link 686, 689 by the power means now to be described. In the preferred form of my invention I have a separate power means for pulling the link 686, 689 forwardly (or to the right in FIG. 33) and a separate means for pushing the link rearwardly (or to the left), both of which means are operated by a respective setting cam driven by a shift control clutch 701 (FIG. 24). This clutch comprises a driving member 702 which is pinned to, or otherwise rigidly mounted on, the main drive shaft 132 (see also FIG. 25). The driven member preferably is a disk 703 loosely journalled on the shaft, and carrying a clutch dog 704. The dog, as is customary in this art, is resiliently biased into engagement with the driver 702 by any suitable means, such as a spring 705. This clutch is what is commonly known as a "half-cycle" clutch, i.e., is one which rotates approximately 180° to a half-cycle position and is then disengaged, after which, upon the happening of some other condition, it will be re-engaged and allowed to return to its original position. For this purpose the clutch dog 704 carries a laterally extending ear 706 which is adapted to engage a shoulder 707 or a hook 708 of a bellcrank control lever 709 that is mounted on the frame plate 65 by any suitable means, such as a stud 710. The control lever 709 carries a pin 711 that is embraced within a slot 712 formed in the lower end of an arm 713 that is pinned to, or otherwise rigidly mounted on, the shaft 651. Thus, the rocking of shaft 651 (clockwise in FIG. 24), upon the operation of the shaft 527 and the conditioning of the "0" sensing arm 646 for operation, rocks the clutch control bellcrank 709 (counterclockwise in FIG. 24). This operation of the clutch control arm 709 occurs shortly after the mid-point of the cycle in which the multiplication operation is initiated. At this time the shoulder 709 releases ear 706, permitting the spring 705 to pull the dog 704 into a position in which it will be engaged by the driver 702. However, the driver 702 will not engage the cooperating shoulder on dog 704 until approximately the 260° position of the main drive shaft. This first step of rotation of the clutch extends over an arc of approximately 130°, while the second phase will be 230°. Thus, approximately 100° of rotation of this clutch will be accomplished in the override cycle, thereby moving the cam assembly driven thereby through an arc of equal magnitude; and the partial rotation will be completed in the early part of the next cycle.

As seen in FIGS. 24 and 25, clutch 701 drives a cam assembly comprising four cams as follows: a subtractive control cam 720; an additive control cam 721; a "short-cut" cam 722, which is designed to control the changing from additive to subtractive operations, or vice versa, as required by a short-cut multiplication operation; and a shift control cam 723. Also, as part of this assembly, is a blocking member 724. All of these cam members, together with the driven plate 703, are mounted on a common quill shaft 725 (shown in FIG. 25) which is rotatably mounted on the main drive shaft 132.

The profiles of the subtractive control cam 720 and the additive control cam 721, together with the profile of the blocking arm 724, are shown in FIG. 34. It should be recalled that the cams in this figure are shown in their full-cycle, or "0°," position, and will consequently be rotated approximately 105° from this position (in a counter-clockwise direction in this figure) by the end of the override cycle. It should also be kept in mind that it is customary in the Friden machines to provide an interlock which prevents operation of the digitation control shaft 145 except in the "0°," or full-cycle, position of the main drive shaft in order to prevent digitation from being attempted while some other machine operation is in process. As the machine was conditioned for a left shifting operation at the start of this cycle, it follows that the digitation control mechanism cannot become effective until the end of that cycle.

The add cam 721 and the subtract cam 720 cooperate with a pair of follower yokes 726 and 727, respectively, both of which are pivotally mounted on a stud 728, actually extending to the right from the control plate 65. Each of these yokes has a pair of divergently extending arms, the extreme ends of which are provided with rollers adapted to engage the periphery of their respective cams. Thus the yoke 726 carries a roller 729 on its upper arm and a roller 730 on its lower arm, while the subtractive control arm 727 carries a long roller 731 on its upper arm and a short roller 732 on its lower arm. In the full-cycle, or "0°," position of the main drive shaft, the additive control yoke 726 is rocked to the neutral (in FIG. 34, the counter-clockwise) position shown, but by the time the cam has rotated 90° it (the yoke 726) will be moving clockwise toward the additive control position. It should be remembered that in the machine with which my mechanism is preferably associated, digitation does not begin in a cycle until approximately the 15° position, or slightly thereafter. By the time that position is reached, even though the cam is still rotating, the yoke 726 will have reached its extreme clockwise position.

The subtractive cam 720 is provided with a lobe that is substantially oppositely located with respect to that of the additive cam 721, as shown in FIG. 34. This cam is provided with two notches: a notch 733 in the restricted section of the cam, which in the home position of the cam, is registering with the roller 731, and a notch 734 in the lobe which registers with the roller 732. In this connection it can be noted that the spring 691 which connects this yoke to the link 689 is quite weak, and is overcome by the force of the centralizing spring which holds the shaft 145 in its neutral position. As this cam 720 is rotated (counter-clockwise in FIG. 34) the follower yoke will first be rocked clockwise as the roller 732 rides on the lobe of the cam 720. At about the 90° position the yoke will be rocked sharply counter-clockwise as the roller 732 passes from the lobe of the cam and roller 731 starts to ride upon it.

Both of the yokes 726 and 727 are shaped as bellcranks, as shown in FIG. 34, and both are pivoted on the stud 728. The upper arm 735 of yoke 727 is provided with an upwardly opening notch 736 adapted to engage a pin 692 carried by the link 689 (FIG. 33), while the upwardly extending arm 737 of yoke 726 carries a downwardly extending notch 738, also adapted to engage the pin 692. In the home position of the parts, these notches will lie opposite each other, as shown in FIG. 34. As the cams rock to the 90° position, the two yokes will be moved in opposite directions, the additive yoke 726 clockwise and the negative yoke 727 counter-clockwise in this figure. Depending upon whether the pin 692 is seated in the notch 736 or notch 738, it will be moved in one direction or the other, thereby translating the links 686, 689 in the like direction, and thereby rocking the arm 688 to either an additive or a subtractive position. By this means the digitation control shaft 145 is set by the multiplication mechanism at the start of each ordinal series of operations, and will be held in the adjusted position as the clutch 701 opens and holds the cams in their half-cycle positions.

(c) *Shift Mechanism*

It will be recalled that the first auxiliary clutch 530 (FIG. 18) is tripped at approximately the 180° position, and that it immediately becomes engaged and rotates through an angle of approximately 180° before being disabled. It will also be recalled that the lobe of cam 560 (FIG. 23) rotates away from its associated follower 562 (see also FIG. 24) immediately, thereby rocking the shaft 527 to condition the programming mechanism for operation, as explaineed in Subsection (*b*) above. Insofar as the shift control mechanism is concerned, it is important to keep in mind that while the secondary clutch 701 was tripped (its dog 704 was released) at approximately the 180° position, the clutch did not become engaged until the main drive shaft had reached an angle of roughly 270°. Thus the cam assembly driven by the clutch 701, and specifically the shift control cam 723 (FIGS. 24 and 32), does not begin to revolve until approximately the 270° position.

The shift control mechanism is controlled by the shaft 567 (FIGS. 18, 19, 24 and 32). It has already been mentioned that the cam follower lever 566 is pinned to, or otherwise rigidly mounted on, the shaft 567, and that this arm carries a roller 565 at its upper, or free, end, and that this roller engages the periphery of a shift control cam 561 (FIG. 22) which is rigidly secured on the shaft 538. It is seen by reference to FIG. 22 that the roller 565 engages the periphery of the lobe of the cam 561 in the home position, and will continue to ride upon the lobe for approximately 120°, or to about the 300° position of the main drive shaft. This is approximately 30° after the secondary clutch 701 has begun to rotate the cluster of cams driven thereby, including the shift control cam 723. The control shaft 567, and the arms 566 and 571 mounted thereon, is biased rearwardly (counter-clockwise in FIGS. 18, 19, 24 and 32) by the relatively strong spring 570 that is tensioned between the shaft 527 and a stud on the arm 571 (as shown in FIGS. 24 and 32). The upper, or free end, of the arm 571 carries a roller 745 adapted to engage the periphery of the shift control cam 723. The profile of the cam is best shown in FIG. 32, and provides a low 747 at its home, or "0°" position; followed immediately by a sharp rise that will be substantially completed within an angle of about 30°; followed by a long lobe, or high, 746 that reaches to slightly beyond the 180° position. Normally the arm 571 is held away from the periphery of the cam 723 by the engagement of the roller 565 on arm 566 engaging cam 561. Thus arm 571 is not free to rock to follow the contour of the cam 723 until the first auxiliary clutch 530 has become engaged and enables the shaft 538 to be rotated through the major part of its first half-cycle (actually about 120°). Before the expiration of this 120° rotation, the secondary auxiliary clutch 701 has become engaged, and the cam cluster, including cam 723, is being rotated thereby. That is, the arm 571 is held away from the cam 723 until after that cam has rotated through an angle of about 30°, whereupon the roller 745 will engage the lobe 746 of the cam 723 and not the depression 747 that is located in the "0°" position of that cam, shown in FIG. 32. At the end of the first half-cycle of the secondary auxiliary cam, the roller 745 will still be riding upon the lobe, but will be immediately adjacent the terminal end of that lobe, and shortly ahead of the leading end of the gradually reducing, or snail-shaped, cam section 748 that leads to the low of the cam. Thus the shaft 567 is held in its inoperative, or clockwise, position as shown in these figures, throughout the half-cycle of operation of the first auxiliary clutch 701: first, by the engagement of roller 565 (FIG. 22) with its cam 561; and, after that has been released, by the engagement of roller 745 with the lobe 746 of cam 723.

It has already been mentioned that the secondary clutch 701 is operated by the "0" sensing arm 646 when this arm is rocked by the engagement of its ears 645 with one or the other of the "0" teeth 388 or 389 of the operative multiplier segment 367. The operation of the feed mechanism shown in FIGS. 26 to 31, inclusive, takes place within the first 150° of a cycle, so that the rocking of the "0" sensing arm 646 occurs at this time. Rocking of arm 646 obviously rocks the bellcrank 709 (FIG. 24) so that its hook 708 releases the ear 706 of the clutch. The clutch 701 becomes engaged, and the cams driven thereby begin to rotate, at approximately the 210° position of that cycle. The usual interlock between digitation and shifting prevents a release of the digitation mechanism before the end of the cycle, or the operation of the shifting mechanism before that time. It is important to notice, however, that the cam 723 will have rotated roughly 150° before the end of the cycle, and during this rotation the arm 571 has been rocking accordingly. Such rocking of the shaft 567 is effective to: (1) disable the segment feed mechanism; (2) enable the multiplier carriage shift mechanism; and (3) enable the register carriage shift mechanism. Actually, the rocking of the arm 571 will disable the segment feed mechanism in the latter part of that cycle of operation, but this is immaterial, as such feeding has already been completed for that cycle. The two shifting operations will be initiated at the start of the next cycle. These three mechanisms will now be described in sequence.

(1) *Disable segment feed mechanism.*—The shift follower arm 571 carries a second roller 749, as shown in FIGS. 24 and 32. This second roller is adapted to engage and ride along the oblique tail 583 of arm 582 that is pinned to the feed control shaft 468. The parts in FIG. 32 are shown in their home, or inoperative, position. When the feed mechanism is first enabled, the shaft 468 is rocked (clockwise in this figure), so that the tail 583 engages the roller 749. Then, when the "0" condition is reached, and the "0" sensing arm 646 is rocked to release clutch 701 and cam 723, the rocking of the arm 571 (counter-clockwise in this figure), by means of engagement of the roller 749 with the tail 583 of arm 582, rocks the arm and feed control shaft 468 to the angular position shown in FIG. 26. Such rocking of shaft 468 disables the feed mechanism for the next cycle of operation. It can be noted that in the latter half of the shifting cycle, the clutch 701 is again operated and cam 723 is rotated to the 180° position. This rocks the arm 571 to the position shown, and again releases arm 582 and shaft 468 to enable the segment feed mechanism (FIG. 27).

(2) *Multiplier carriage shift.*—The shift control shaft 567 extends across the machine, its right end being journalled in a bearing in the right frame plate 63 (FIG. 7) and also being journalled at an intermediate location in the left side control plate 62 (FIG. 9). Adjacent the left side control plate 62 the shaft 567 carries an arm 755 (FIGS. 8 and 9). The forward, or free end, of this arm 755 carries a pin 756 which is embraced within a peripheral slot 757 formed in a collar 758 that is slidably but nonrotatably mounted on the shaft 251. It will be recalled that the shaft 251 is driven synchronously with the main drive shaft 132 by means of the leftmost miter gear 134 and its meshing miter gear 250. Hence, the rocking of arm 755, resulting from the rocking of shaft 567, will raise or lower the collar 758 on the shaft 251.

A feed pawl 759 is pivotally and slidably mounted on a stud 760 mounted on an offset bracket 761 extending rearwardly from bearing bracket 255. At its forward end, the pawl embraces an eccentric cam section (not shown in the drawings) of the collar 758, so that the rotation of the collar imparts an eccentric oscillation to the feed pawl 759. The nose of the feed pawl 759 is adapted to engage the teeth of the shift rack 762 (as shown in FIG. 10) mounted on the rear edge of the upper plate 331 of the multiplier control carriage 330. Normally, with the collar 758 in a lower position, the feed pawl 759 oscillates in a plane below the rack 762. However, rocking of the shaft 567 elevates the collar 758 on shaft 251 and places the feed pawl 759 in the plane of the rack 762. Thereafter, the rotation of the shaft 251 will impart a one-step shifting movement to the multiplier carriage 330 and hence shift the multiplier carriage one order to the right.

(3) *Register carriage shift.*—A one-order shifting of the register carriage 80 is also enabled by the rocking of the shaft 567. It will be recalled that this shaft extends to the right side of the machine, its right end being journalled in the right side frame plate 63, as shown in FIG. 7. Adjacent the longitudinal plane of the right shift control rod 173, the shaft carries an arm 770 (see also FIG. 6) that is loosely mounted thereon—being shiftable axially along the shaft and rotatable relative to it. This arm is resiliently biased toward the left by a suitable compression spring 771 that embraces the shaft 567 and is seated upon the hub of the arm 770 and the right side frame plate. Normally, however, the arm 770 is held to the right, against the compressive force of spring 771 by a bail 772, the right leg of which is loosely mounted on shaft 567 and engages the arm 770, and the left end of which is supported against rotation by a suitable slot (not shown) in the intermediate frame plate 64. This bail carries an arm 773 (see FIGS. 10 and 17) which is shaped to form an ear 774 adapted to engage the right end of the feed rack 762 when the carriage 330 is in its home, or right-hand, position (FIG. 10 being a view illustrating the carriage after it has been stepped two orders to the left from the home position). Whenever the multiplier carriage 330 is in its home, or extreme right-hand, position, the engagement of the ear 774 with the end of the rack 762 holds the bail 772 in its right-hand position. In this position of the bail, it positions the arm 770 in an inoperative and ineffective position, so the rocking of the shaft 567 at this time cannot effect a right shift of the register carriage 80. However, as the multiplier carriage 330 is stepped to the left, the spring 771 pushes the arm 770 to the left, and, after the first such step, it is in an operative position in which a nose 775 at the upper end thereof lies in front of a pin 776 carried by an arm 777 rotatably mounted on the shift control shaft 286 (see FIG. 6). In this position, any rocking of the arm 770 will be effective to translate the right shift control rod 172 rearwardly to effect engagement of the right shift clutch 171 and thereby shift the register carriage 80 one order to the right for each cycle of machine operation.

It is customary in the machine of the patents above-mentioned to cause rocking of the arm 770 by means of an arm 778 (see FIGS. 6 and 7) that is pinned to, or otherwise rigidly mounted on, the shaft 567. This arm carries a long pin 779 that engages a slot 780 formed in the arm 770. Thus, the arm 770, which is loosely mounted on the shaft 567, is enabled to rock with it at all times—but normally is in a plane to the right of the pin 776 and thus is not able to effect a control of the right shift clutch. It is only when the multiplier carriage 330 is displaced one order from its right-hand position that the arm 770 can become effective to cause shifting of the carriage.

In the return of the carriage to the right during a multiplication operation, the multiplier carriage shift rack 762 will engage the arm 773 of bail 771 and force it to the right as the multiplier carriage 330 shifts from its second adjusted position to its first adjusted position. However, as the multiplier carriage 330 and the register carriage 80 are shifted simultaneously, and the mechanisms controlling that shift are engaged at the very start of the shift cycle and are interlocked to prevent a disengagement before the end of the cycle, the pushing of the arm 770 to the right to a disabled position does not effect the last shift of the register carriage to the right. Thus, the shift mechanism just described is effective to control right shifting of the carriage at the end of each series of ordinal operations until the multiplier carriage is returned to its ordinal, or home, position. It will be remembered that normally the carriage, in its extreme "home" position, lies with its highest order segment 367 one ordinal space to the right of the feed gear 586 and the "0" sensing arm 646. Thus, the shifting mechanism just described is enabled to control shifting of the register carriage 80 until the shift from the last operative order of the multiplier to the home position thereof, after which it is disabled, so that the register carriage 80 does not shift after the multiplication is completed. This point should be kept in mind in connection with the shifting of the multiplier carriage 330, in the restore operation, for at that time the multiplier carriage is moved one further step to the right and is immediately released to return to its home position.

It should be mentioned here that it is highly desirable to centralize the digitation control gate 143 and shaft 145 during the carriage shifting operation. This can readily be accomplished by means of a centralizing mechanism shown in FIG. 32. This mechanism preferably comprises a link 785, the front end of which is provided with a slot 786 which embraces a pin 787 on the arm 571. A spring 788 tensioned between the pin 787 and an ear 789 on the front end of the link, strongly biases the link 785 to follow the rocking of arm 571. The rear end of the link 785 is pivotally supported on a rocker 790 by any suitable means, such as a pivot pin 791. The rocker 790 is pivotally mounted on the auxiliary left side frame plate 66 by any suitable means, such as a screw stud 792. The upper end of the rocker is provided with a notch 793 adapted to engage a pin 794 carried by an arm 795 which is rigidly mounted on the shaft 145. Thus, when the arm 571 rocks to its shift-initiating position (counter-clockwise from that shown in FIG. 32), the link 785 rocks rocker 790 (clockwise in this figure). Thereupon the notch 793 engages pin 794 and holds the digitation control mechanism locked in a neutral, or disabled, position until such time as the arm 571 is rocked to the position shown in this figure.

5. *Short Cut Multiplication Controls*

In most of the former machines for short cut multiplication the controls were relatively simple, as most of those machines performed additive multiplication only. Thus, they invariably used repeated addition for values of lower magnitude and repeated subtraction for values of higher magnitude, and no further controls were necessary. However, as the present invention is designed to control multiplication operations in a machine which performs both additive and subtractive multiplication, it is necessary to provide for digitation control from two sources: first, the selected direction determined by the operator in depressing an additive or a subtractive multiply key (which controls the operation of the machine when the multiplier value is of lower magnitude); and, second, a means for reversing this sign character control when the multiplier digit is of a higher magnitude. Thus, four possible sign character conditions can arise in a multiplication operation:

(*a*) the overall operation is additive, caused by depression of the multiplier key 405 or accumulate multiply key 406, and the multiplier digit is of a lesser magnitude—in which case the operation is additive;
(*b*) the overall operation is additive from depression of the multiply key 405 or the accumulate multiplier key 406, but the multiplier digit is of higher magnitude—in which event the operation is subtractive;
(*c*) the overall operation is subtractive, resulting from depression of the negative multiply key 407, and the multiplier digit is of lower magnitude—in which event the operation is subtractive;

(d) an overall subtractive operation is caused by depression of the negative multiply key 407, but the submultiplier digit is of higher magnitude—in which event the operation is additive.

In the present invention the mechanism for controlling the sign character operation in these four situations is relatively simple and will be described in Subsection (a) below.

Another control problem that arises in short cut multiplication is that caused when operation in any order is in the reverse sign character direction (for a value of a higher magnitude), as in that event the number of cycles of operation in the adjacent higher order must be modified. If operation in the adjacent higher order is in the selected sign character direction, the number of cycles must be increased by "1." For example, when multiplying by a value of "19," the first order of operation is subtractive but in the second, or tens, order it is necessary to add the multiplicand value twice (in other words multiplication by 20—1). On the other hand, if multiplication in the adjacent higher order is in the reverse sign character direction, the number of cycles of operation in that higher order must be reduced by "1." For example, if the multiplier is "189," there will be a single cycle of subtractive operation in the lowest order, a single cycle of operation in the second order, and two cycles of operation in the highest order (equivalent to multiplication by 200—10—1). In the past, mechanisms for controlling the adjustment of the number of cycles in the adjacent higher order tended to be rather complicated, for in some instances they added a cycle of operation and in other instances they subtracted a cycle of operation in the higher order. In the present invention this adjustment of the number of cycles in the higher order is rather easily accomplished, and is effective to add a cycle if the operation in the higher order is in the selected sign character direction and to reduce the number of cycles of operation if the sign character of the operation is in the reverse sign character direction. This is accomplished by adjusting the higher order segment in a direction to increase the value standing therein by "1." It has already been mentioned that in my invention I feed the segments back to "0" for values of lower magnitude and feed them forwardly to "10" for values of higher magnitude. Preferably this adjustment takes place as the operative segment goes from its "9" to its "10" position, and is the reason for forming the multiplier control segments in two sections, one of which is locked by the value pin 355 and the other of which can be adjusted relative thereto by this change just mentioned. It is obvious that the feeding of one of these segments to the next higher value position will increase the number of cycles to return the segment to "0" if it falls within the lower magnitude values, or to reduce the number of cycles to which it must be fed forwardly to "10" for the higher magnitude values.

This method of operation also has the advantage that if the adjacent higher order segment stands at a value of "5," which normally would cause five cycles of operation in a selected direction, and the adjacent lower order of higher magnitude, the higher order segment is shifted from "5" to "6," which shortens the multiplication problem. For example, assume a multiplier value of "156." In the past, many methods of short-cut operation would subtract four cycles for the value of "6;" then add five cycles for the "5," plus a sixth cycle to correct the subtractive operation in the lower order; and then add a single cycle to the higher order. This gives multiplication equivalent to 100+60—4. In the present invention, the value of "5" is shifted to a value of "6," so the operation proceeds: four subtractive cycles in the units order, four subtractive cycles in the tens order, and two cycles of operation in the hundredths order. This is equivalent to multiplication by 200—40—4. This sequence of operation is secured by a simplification of the mechanism, as will be described hereafter in Subsection (b).

In many previous methods of short cut multiplication successive "0's" created a problem when the order below the lower of the "0's" was of higher magnitude. For example, if multiplication is by a multiplier value of "1009," operation in the lowest order was in the reverse sign character direction. Then in the tens order, which stood at "0," a single additive cycle was necessary to correct for the subtractive operation in the lower order. However, in the hundredths order, which also stood at "0," no such modification was required. In the present invention this situation is readily handled by the adjustment of the multiplier control segments as just described. In this instance the segment in the tens order standing at "0" is adjusted to its "1" position, but it is unnecessary and impossible to adjust the hundredths order segment unless the tens order segment stands at a value of higher magnitude (in the preferred form of my invention a value of "6" to "9"). Thus, the problem of successive "0's" creates no problem in the present invention.

A third control situation which arises in short cut multiplication problems is that which occurs when the highest order of the multiplier is a value of greater magnitude. In some of the old forms of short cut mechanisms, this was handled by operating in the highest order in the selected sign character direction regardless of the value. In the present invention, operation in the highest order is controlled by the sensing mechanism which determines whether operation is to be in the selected sign character direction or the reverse, and then providing a simple means adjacent the highest order segment which cannot be controlled by the operator but which is automatically controlled by the highest order multiplier segment. That is, the auxiliary segment in the form shown is in the eleventh order, and cannot be set by the machine operator, and is automatically adjusted if the highest order value is of greater magnitude. This creates no problem in the machine with which my invention is preferably associated, as the multiplier carriage is shifted one order beyond its home position in order to effect a restoration of the multiplier mechanism. Thus, after operation is completed in the highest order of the settable multiplier control segments, the multiplier carriage is shifted one order to the right by its shifting mechanism to return the carriage to its home position (which shift of the multiplier carriage is not accompanied by a shift of the register carriage). Then the multiplier carriage is shifted an additional order to the right, in which position it cannot be detented, so that as soon as the parts have been restored to their normal condition, the carriage falls back to its home position in which the highest order segment lies one ordinal spacing to the right of the feed gear and the "0" sensing arm. In this position the operation of one of the multiplier value keys first inserts the value in the pinboard and releases the multiplier segment to assume the corresponding value and then enables the escapement of the carriage one order to the left so that the segment now lies in the operative ordinal position. This final corrective cycle will be described in Section 6 below.

(a) *Normal Digitation Controls*

It will be recalled that in connection with FIG. 33 it was explained that the digitation control member 673 is normally in a subtractive position, and is adjusted to its additive position by the hook link 661 (FIG. 32) in operations in which the selected sign character was additive. This is accomplished by the rocking of the triangular control plate 680 (clockwise in FIG. 33) from the normal position shown, and the later operation of the follower yokes 726 and 727 (FIG. 34) and their effect upon the pin 692 of link 689. This setting controls when the multiplier digit is of lower magnitude, preferably "1" to "5," inclusive. This setting is reversed whenever the value in the operative order multiplier segment is of higher magnitude, preferably "6" to "9." Such a reversing mechanism comprises basically two sections: (1) means for sensing whether the operative order multiplier segment stands in a value position of lower magnitude or higher magnitude—which can be called a "value sensing" mechanism; and (2) means operated by the value sensing mechanism for reversing the setting of the control plate 680. These will now be discussed in sequence.

(1) *Value sensing mechanism.*—It has already been mentioned that the various control segments 367 (FIGS. 11 to 16) are positioned in the first instance by the respective L-shaped crank member 366 abutting a value pin 355—the two members being coupled together by means of the spring-biased pawl 372. It was also mentioned that each segment 367 is formed with an arcuate slot 390 extending through an arc substantially the length of the arc between the "0" and "10" positions of the segment, but extending from approximately the "6" tooth for an appropriate distance beyond the "0" tooth. The shaft 391 extends across the carriage 330, being firmly seated in the end plates 333 and 334 thereof, and lying within the slot 390. It was also mentioned in the description of the multiplier segments that each segment carries, on its left face, an arcuate setting arm 395 which is formed as a long arcuate tail 398 normally lying along the slot 390, as shown in FIGS. 11 to 14, inclusive. This tail has a short section 399 of greater radius, which, in the "9" position of the segment, engages the shaft 391—thereby enabling the arm 395 to rock inwardly from the force of its spring 396. It was not previously mentioned, but it is evident from viewing these figures, that the arm 395 is formed with a section 400 at the extremity thereof—which section has an arcuate length equivalent to that of the "0" to "5" teeth, inclusive, of the segment and a narrow section 401 of an angular length equivalent to the "6" to "10" length of the teeth. These two sections 400 and 401 are utilized to angularly position the magnitude sensing arm 805 associated with each segment. There is one such arm adjacent each segment 367, all of the arms being rotatably mounted on the common shaft 391. Each of these arms is biased forwardly (clockwise in FIGS. 11 to 13 and counter-clockwise in FIG. 14) by individual springs 806 tensioned between an ear 807 on the arm and a tie rod 808. Each arm is formed with an ear 809 which engages the outer edge of the associated, or coordinal, arm 395. This ear 809 rides upon the wide section 400 of its coordinal arm 395 so long as the coordinal segment registers a value between "0" and "5," and rides on the narrow section 401 when the coordinal segment is set to values of "6" to "10." The arms 805 are thus enabled to rock under the bias of their springs when registering a value of higher magnitude, rocking from the position shown in FIGS. 11 or 13 to that shown in FIGS. 12 or 14. Thus each of the arms 805 assumes an angular position, as shown in FIGS. 11 and 12, corresponding to whether a smaller or larger magnitude is registered in the corresponding multiplier segment 367.

The position of the arm 805 in the operative ordinal position is sensed by a sensing arm 815 (see especially FIG. 32) which is pivotally mounted on the auxiliary left side frame 66 by any suitable means, such as pivot stud 816. This arm has a laterally bent ear 817 extending through an aperture in the frame plate 66 (as shown in FIG. 8). This ear 817 is adapted to engage an ear 810 on the arm 805 associated with the operative one of the multiplier segments 367. The ear 817 engages the ear 810 when the arm 805 lies in the position shown in FIGS. 11 and 13 (when the segment registers a value of lesser magnitude), thereby preventing rocking of the sensing arm 815. However, when the value segment 367 is set for a value of greater magnitude and the indicating member 805 is enabled to rock to its other position (see FIGS. 12 and 14), the ear 810 no longer blocks the rocking of the arm 815. The rocking of the arm 815 is utilized to reverse the setting of the triangular control plate 680 (FIG. 33), which reversal is necessary when values of higher magnitude are registered in the operative segment 367, as will be explained in Subsection (2) below.

The sensing lever 815 is operated by a bellcrank member 818 which is pivotally mounted on the short shaft 624 extending between the auxiliary left side frame plate 66 and the left side control plate 65 (FIGS. 24 and 32). The upper part of the bellcrank has a profile identical with that of the reversing lever 830 (FIG. 32), having a short rearwardly extending arm formed as a spring seat. A spring 820 (FIG. 24 and lying immediately behind a spring 832 in FIG. 32) biases the arm 818 to an operative position (counter-clockwise in FIGS. 24 and 32). In normal conditions the arm 818 is held in an inoperative position by the wide digitation control cam 722, which is driven through the auxiliary clutch 701. The vertical leg of the lever 818 has a forwardly extending and offset tail 821 (see FIGS. 8 and 32). A diagonal cam slot 822 is formed in the forward end of the tail, which slot embraces a pin 823 riveted to, or otherwise rigidly secured on, the rear end of sensing lever 815. The slot 822 is so shaped that when the arm 818 is in its normal, latched position (the clockwise position shown in FIG. 32), the camming effect upon pin 823 rocks the arm 815 to a disabled position (the clockwise position shown in this figure). However, when the arm 818 is enabled to rock, as it is when the cam 722 is rotated to its half-cycle position and the sensing member 805 of the operative disk 367 indicates a value of higher magnitude, it cams the sensing lever 815 into what can be called a "short-cut" position (counter-clockwise from that shown in FIG. 32).

It will be recalled that the auxiliary clutch 701, in all operations except multiplication, lies in the position shown in FIG. 24 and the cam 722 lies in the position shown in FIG. 32. At the start of the operation the clutch 701 rotates through a portion of a cycle and the cam 722 consequently is rotated (counter-clockwise in these figures) through an angle of approximately 150° to 180°. It is evident that at this time the arm 818 is free to rock under the bias of its spring 820, and will do so if the arm 815 is free to rock, as it is when the operative segment registers a value of higher magnitude.

(2) *Reversing sign character control.*—The rear end of the sensing lever 815 carries an ear 824 which normally engages a shoulder 831 formed in the lower end of the control bellcrank 830 (FIGS. 32 and 33). The bellcrank 830 is rigidly mounted on the shaft 624 (FIGS. 24 and 32), and has a shape the same as that of the upper portion of the bellcrank 818, and is also biased to an operative direction (counter-clockwise in these figures) by a spring 832. The control, or reversing, arm 830 is held against the bias of its spring 832 by either the cam 722 or by the latching of ear 824 against shoulder 831—the latter of which occurs so long as the magnitude sensing arm 815 senses a lower magnitude value.

Before proceeding to the effect of the rocking of the reversing arm 830, it might be well to briefly consider the timing involved in its operation. When the machine is operating in any program other than multiplication, the auxiliary clutch 701 is latched in the position shown in FIG. 24 and the cam 722 assumes the position shown in FIG. 32. In that event both the reversing arm 830 and the sensing, or actuating, arm 318 are held in their inoperative positions by the lobe of the cam 722. At the start of the actual multiplication program (at approximately 180° position in the override cycle), the clutch 701 is released and the cam cluster driven thereby is rotated approximately 150° to 180°. With this rotation, obviously, the lobe of cam 722 is rotated (in a counter-clockwise direction in FIG. 32) to a like position, and both the sensor actuating arm 818 and the reversing arm 830 are freed from restraint by the cam. At this time the spring 820 rocks the sensor actuating arm 818, which, in turn, rocks the sensor 815 (counter-clockwise in FIG. 32). If the segment 367 in the operative order registers a value of lower magnitude, the sensing member 805 lies in the position shown in phantom lines in FIG. 32 or in solid lines in FIGS. 11 and 13. In this situation the sensor 815 cannot rock sufficiently for its ear 824 to release the reversing lever 830. If the segment in the operative order registers a value of greater magnitude, then the sensing member 805 is rocked forwardly of the ear 817 of the sensor 815 and the sensor 815 can rock (counter-clockwise from the position shown in FIG. 32), whereupon the reversing arm 830 is unlatched and is permitted to rock under the bias of its spring 832.

The control link 673 (best shown in FIG. 33) is mounted on the lower end of the reversing arm 830 by means of pin 678. The rocking of the reversing arm 830 will, therefore, pull the control link 673 forwardly (to the right in FIGS. 32 and 33). If the slot 675 of this link engages the pin 683, such movement of the control link 673 will rock the setting plate 680 in a clockwise direction, thereby lifting links 686 and 689 so that the pin 692 will rise to engage the slot 738 of the positive setting cam yoke 726 (FIG. 34). This is the situation which occurs when the machine has been set for negative, or subtractive, multiplication and the control is effected by the reversing arm 830 upon the sensing of a value of higher magnitude in the operative multiplier segment. If, on the other hand, the machine has been conditioned for an additive multiplication, the link 661 will have rocked the control link 673 (counter-clockwise from the position shown in FIGS. 32 and 33). Such rocking of the control link 673 causes the cam edge 676 to engage and rock the control plate 680 (in a clockwise direction), and its notch 674 to engage the pin 682. At this time the pin 692, of course, lies in the slot 738. Then when the reversing arm 830 rocks (counter-clockwise in these figures), it pulls the lower end of the control plate 680 forwardly, thereby rocking plate 682 (counter-clockwise in FIG. 33) and depressing links 686, 689 and moving the pin 692 into the slot 736 of the negative setting yoke 727. By this means, the reversing of the digitation control mechanism, required by a multiplier of higher magnitude, is effected regardless of the original conditioning of the machine.

(b) *Cycle Modifying Mechanism*

It has already been mentioned that whenever operation is in the reverse sign character in any order, the number of cycles, or counts, controlled by the adjacent higher order segment must be modified in one direction or the other. If the higher segment represents a value of lower magnitude, the number of cycles of operation in the higher order must be increased by "1"; and if the higher order is also of a higher magnitude, and hence would control operation in the reverse sign character direction, the number of cycles must be reduced by "1." In either event, the number of cycles controlled by the higher order segment is modified in one direction or the other. It has also been mentioned, in connection with the description of the segments, shown particularly in FIGS. 11 to 14, inclusive, that each segment 367 carries a rack, or ratchet plate, 392 and that each arm 395 (which is mounted on the left side of each segment 367) has a laterally extending ear 394 which, whenever the arm 395 is rocked inwardly, will engage one of the ratchet teeth 393. The arm 395 is so rocked when the segment in the operative position is being fed from its "9" to its "10" position, as at that time the depression 399 on the inner face of this arm engages bar 391 and permits such rocking. Then, as the segment is fed from the "9" to the "10" position, the ear 394, through its engagement with the teeth 393 of the ratchet plate 392 on the adjacent higher order segment, shifts the higher order segment 367 a single increment. This shifting is permitted by virtue of the fact that the spring-pressed detent arm 372 can yield to enable the movement of its pin 374 into the adjacent interdental space on the segment 367. Thus the segment 367 can be shifted one angular increment from the position determined by its control bellcrank segment 366. The adjacent higher order segment will be held in such adjusted position by virtue of the engagement of the pin 374 with the interdental spaces on the associated rack. The spring 375 is of sufficient strength to cause the pin 374 and the associated teeth 386 to form a rather strong detent. By this means, the higher order segment will be adjusted one additional increment as the operative segment passes from its "9" to its "10" position, but will not be so adjusted if the segment is returned from some lower magnitude value position to its "0" position. Thus, in my invention, the single mechanism is operative to move the segment an additional step in a higher value direction. This incremental step is utilized to modify the number of cycles in the higher order by "1" and whether that "1" is added or subtracted depends on the position of the segment when it is sensed. If the value remains one of lower magnitude, the segment is returned to its "0" position, and hence will have to move one additional increment. On the other hand, if the value, after adjustment, is one of higher magnitude, then the segment is fed one increment toward "10," and will, therefore, require one less increment of motion to reach the "10" position.

(c) *Control of Direction of Feed of the Operative Segment*

It will be recalled from the description of the segment feeding mechanism shown in FIGS. 26 to 30, inclusive, that the segment feeding mechanism is controlled by the rocking of the shaft 624 upon which the reversing bellcrank 830 is rigidly mounted. The reversing bellcrank 830 can rock (clockwise in FIGS. 24 and 32) only when the magnitude sensor 815 senses a magnitude of greater value. Thus, the rocking of the reversing lever 830 is effective, not only to control reversing of the sign character in the product register, but also to reverse the direction of feed of the operative segment.

It will be recalled that it was mentioned in Section 1, sub-section (c), that a value of "9" is set in the multiplier unit by releasing the first sector 366 from its "0" latch 357 and letting it rotate under the bias of its spring 380 until it abuts against the "9" stop bar 335 (see FIG. 14). In this situation it will become necessary to move the control segment 367 forwardly one increment if the adjacent lower order also registers a value of high magnitude. For this purpose the segments 367 are relieved at 379 (FIG. 14), so that this sector can be moved one additional space when the sector 366 abuts bar 335 and registers a value of "9." Other than for this relieved section 379, the front face of the spoke of the sector normally will lie in a radial position corresponding to the front edge of the arm of the sector 336, as both sectors must be restored by the same restoring bail 871, which will be described below in Section 6 under the heading "Restore Mechanism."

It should also be noted at this point that the mechanism of the present invention is designed for repeat operation, i.e., a series of operations using the identical multiplier value in which the multiplier value is set for the first operation and retained indefinitely thereafter. In other words, the present mechanism is so designed that when a constant multiplier value is desired for a series of operations, a repeat key is operated which retains the multiplier value in the multiplier unit. The mechanism for the repeat multiplication operation will be described in Section 6(a) below. However, for the moment it should be noted that when a segment 367 registers a value of higher magnitude and it is fed forwardly to "10," the first section 366 is blocked against movement by its engagement with the set pin 355 or the "9" stop 335. In this situation, the detent (comprising the arm 372, pin 374, spring 375 and cooperating detent teeth 386 on the segment 367) yields to permit the segment 367 to assume an angular position greater than the position of its bellcrank 366. A situation of this type of condition is illustrated in FIG. 12, in which the first section 366 is held by the "5" pin in its value position, and the control segment is fed forwardly to a "10" position. This figure is illustrative of what happens when a "5" is set in one segmental assembly and the adjacent lower order segment represents a value of higher magnitude, so that the segment 367 is first moved to the "6" position as the adjacent lower segment goes from "9" to "10." Then, when the higher order segment is shifted to the operative position, the segment 367 is fed forwardly to "10." In this situation the segment 367 is fed forwardly to "10," as illustrated, while the segment 366 is blocked, the detent yielding to enable it to run to the last position, as shown. If, on the other hand, a value of "5" is set in a segment and the adjacent lower order represents a value of lower magnitude, the segment is fed back toward "0" (counter-clockwise in FIGS. 11 and 12). In that situation the spring 375 is strong enough to hold the parts in their original relative positions. The spring 380, which biases the bellcrank 366 toward a value position (clockwise in these figures), is weaker than the spring detent, so that normally both sectors are returned to "0" together. In that situation the return of a segment to "0" causes the tail 369 of the bellcrank 366 to latch on the "0" latch 357. However, it can be noted that it is not really important whether the sector 366 follows 367 or not, as both sectors are restored to the "0" position by a bail 871 at the end of each multiplication operation, even though the machine is set for repeat multiplication. When the machine is set for repeat multiplication, the means for restoring the value pins 355 is disabled, the multiplier carriage is escaped to the predetermined proper ordinal position, and the "0" latches 357 for the dials in which values have been set (all of those lying in the operative position or to the left thereof) are released to allow the segments to fall to their proper value position.

(d) *Corrective Operation After the Final Cycle*

It has been mentioned that if the highest order segment represents a value of greater magnitude, then it is necessary to shift the multiplier carriage one additional step, and the register carriage 80 also, and effect the single additive corrective cycle in the higher order position. This is readily accomplished by the mechanism which will now be described.

To the left of the highest order control segment 367 (in the eleventh ordinal position in a ten-order multiplier machine) is a partial control segment 840 (FIGS. 10 and 15). This segment is mounted on the quill shaft 365 and lies only a partial ordinal space from the highest order segment 367. In order to conserve space in the machine, this partial control segment is formed, as shown in FIG. 10, with an offset step 841 which carries two teeth: an extra long tooth 842 in the "0" position and a normal feed tooth 843 adapted to be engaged by the feed gear 586 when the segment has been fed an additional step to the left. The extra width is required to provide means for keeping the "0" sensing arm 646 rocked during the operation in the home, or eleventh, order, position and also in the overstroke which is required for the restoration of the parts to their normal condition. This segment 840 carries a single pin 844 which is engaged by one of the notches in a two-notch detent arm 845 mounted on the left end frame plate 334 by any suitable means, such as the crossrod 391. This pivot arm is biased to engage with the pin 844 by a suitable spring 846 and, of course, requires only two notches, as this segment can only have two positions. Preferably this partial segment is formed with an interior slot 848 adapted to encompass the crossbar 391. Also, preferably, the inner edge of this slot is provided with ratchet teeth 847 adapted to be engaged by the ear, or pawl, 394 on the arm 395 of the tenth order segment. By this means the eleventh order partial segment can be adjusted a single increment whenever the tenth order segment goes from its "9" to its "10" position, and when so adjusted the eleventh order segment will be detented in the adjusted position.

It has already been mentioned, that at the end of a multiplication operation following completion of operation in the tenth, or highest, order, the shift control mechanism conditions the machine for a shift of both the multiplier carriage and the register carriage. This first shifting operation shifts the carriage from its highest order operative position to its normal home position, but without restoring the parts to normal. Following this, in the machines with which my invention is preferably associated, it is customary to cause an additional step, or shift, of the multiplier carriage, without effecting a shift of the register carriage. In this additional step the multiplier carriage is shifted into a position in which the parts can be restored to normal and is immediately released. There are no operative teeth for the escapement pawl in this ordinal position, so the carriage shifts back to the left to its normal home position. Thus, if the tenth order registers a value of lesser magnitude, the tip of the "0" sensing arm 646 engages the long tooth 842 as the carriage is shifted from its highest ordinal operative position to its home position and thereby causes the additional shift. On the other hand, if the eleventh order segment has been adjusted because the tenth order segment registers a value of higher magnitude, then the "0" sensing arm 646 can fall inwardly as it will then be opposite the tooth 843. In that situation the first feeding operation of the segment causes the tooth 842 to engage arm 646 and thereby initiate the shifting required.

6. *Restore Mechanism*

During the last series of operations controlled by a normally set segment 367, the multiplier carriage 330 has its highest order segment 367 in the operative position (which is one order to the left from its home, or normal, position). Then at the end of this ordinal series of operations, the carriage is shifted to its home position and preferably is then, in a second cycle, shifted one additional order in which it cannot be locked in order to restore the elements to their "0," or normal latched, position. The mechanism for so restoring the multiplier mechanism to normal will now be described.

The restoring mechanism is operated by a cam 855 mounted on the auxiliary drive shaft 243 to the left of the intermediate frame plate 64 (FIGS. 8, 9 and 10). This cam, as best shown in FIG. 9, has a lobe with a gradual rise extending over an angle of approximately 180°, followed by an abrupt drop and a low dwell of about another 180°. It is evident that this cam rotates constantly during machine operation, but it is so located that it lies one ordinal space to the right of the multiplier carriage 330 when the carriage is in its home position. This cam, in the overshift cycle at the end of the multiplication operation, is adapted to engage a roller 856 (FIGS. 9 and 16) carried by a gear segment 857.

The gear segment is mounted on the right frame plate 333 of the multiplier carriage by any suitable means, such as a pivot stud 858. Thus, the cam 855 is effective, in the overshift cycle, after approximately one-third of a revolution, to engage the roller 856, and thereby rock the gear segment 857 for approximately half a cycle, releasing the follower roller shortly before the end of a cycle. This rocking of the gear segment takes place only in the second shifting cycle following termination of operation in the highest order in the multiplier unit, and hence follows the second, or overshifting, of the carriage. For this reason it is necessary to provide the rather prolonged dwell at the start of the cycle, for the carriage must be shifted to the overstroke position before the cam 855 can engage the roller 856.

The teeth of gear segment 857 constantly mesh with an idler pinion 859 that is rotatably mounted on the end plate 333 by any suitable means, such as a pivot stud 860. The pinion, in turn, meshes with the teeth of a second gear segment 861 that is pinned to, or otherwise rigidly secured on, a shaft 336, passing through the quill shaft 365 of the multiplier carriage 330. This second gear segment carries a tail 862 adapted to engage a stop pin 863 mounted on the end plate. The segment 861 also carries a pin 864 which serves as a seat for a spring 865 tensioned between the stud and the stop pin 863. This spring resiliently biases the segment 861 to an inoperative position (clockwise position shown in FIGS. 9 and 16) and holds the entire gear train in its inoperative position shown. When the roller 856 is engaged by the cam 855, the two segments 857 and 861 are rocked (counter-clockwise in these figures), thereby rocking the shaft 336 in the same direction.

The rocking of shaft 336 is utilized to positively restore all the multiplier segments 366 and 367 to a "0" position, it being particularly important to restore the segments 367 to a "0" position with respect to their control bellcranks 366 when moved from such a relationship. This is accomplished by means of a pair of arms 870 rigidly mounted on the shaft 336 adjacent the two frame plates 333 and 334. These arms carry a rod, or bail, 871 which normally lies slightly above the "9" stop bar 335 (see FIGS. 12 and 14). When rocked, however, it engages the radial portion of the segment 367 and the arm 366 to restore them both to the "0" position shown in FIG. 11, whereupon the control bellcrank 366 can again become latched by the "0" latch 357.

The rocking of the shaft 336 is also effective to restore the value pins 355 to their inoperative positions. This is accomplished by means of a pair of cams which, on the right-hand end, is preferably formed as a lobe 875 on the second gear segment 861 (FIG. 16) and on the left end is formed by a plate cam 876 (FIG. 15). The cam lobes are identical and are adapted to operate a restore frame that controls the restoration of any setting pins 355 which may have been projected from their normal, or "0" position. The restoring frame comprises a plate 877 normally lying immediately below the lower frame plate 332. This restore plate 877 is provided with a series of ordinally arranged slots registering with those in the lower plate 332, so that the pins 355 project through both. This plate is adapted to engage the toes, or feet, 354 of the pins 355, so that as the restore plate is moved away from the lower plate 332, it will restore any set pin to its normal, inoperative position. This movement is well shown by a comparison of FIGS. 11 and 12—FIG. 12 showing the plate 877 in its normal position, and FIG. 11 showing it in the operated position in which all projected pins 355 have been restored. The plate is provided at each end with an upstanding bracket 878 (FIGS. 9, 15 and 16) which overlap the end plates of the carriage frame 330. Each bracket is provided with a pair of elongated slots 879 which embrace pins 880 mounted in the end plates 333 and 334 of the multiplier carriage. The restore plate 877 is resiliently biased to its normal, raised, or inoperative, position by a pair of springs 881 tensioned between the pins 880 and ears formed on the plate.

The plate is moved from its inoperative to its operative position (from that shown in FIG. 12 to that shown in FIG. 11) by means of a pair of follower arms 882, one of which is pivotally mounted on each bracket 878. These arms are mounted on their respective brackets by any suitable means, such as pivot studs 883, and are biased to on operative position by a suitable spring 884. Overrocking of the arms 882 is prevented by means of an ear 885 on the follower arm 882, engaging the upper edge of the respective bracket 878. It can be noted that these follower arms carry rollers 886 which are adapted to engage the cam faces 875 and 876 already mentioned. It is evident that the rocking of the two gear segments 857 and 861 (FIGS. 9 and 16), from the operation of cam 855, causes the cam faces 875 and 876 to depress the rollers 886 and thereby depress the restore plate 877.

It will be recalled that the bellcrank 345 (FIG. 8) assumes an angular position representative of the multiplier carriage 330. In fact, its spring 350 is the power that operates the escapement mechanism for this carriage. The insertion of multiplier values in the segments of the carriage is, of course, accompanied by a rocking of this bellcrank (counter-clockwise in this figure). Then, as the multiplier carriage is restored to its home position order-by-order during the multiplication operation, the bellcrank 345 returns to the original ordinal position shown. As it is rocked one additional angular increment upon the overshifting of the multiplier carriage, the leftwardly extending tail 351 engages the lower end of the tail of the latch lever 461, rocking this latch lever (clockwise in FIGS. 18 and 19) to release the depressed multiplier key.

In my invention, the rocking of the bellcrank 345 during this overshifting cycle is effective to pull a link 950 (FIG. 8) forwardly. The forward end of this link is pivoted on the tail 351 of the bellcrank 345 by any suitable means, such as a pin 951. The rear end of this link is supported by a pin-and-slot connection on a pin 952 secured to an arm 953 (best shown in FIG. 32). This arm 953 is pinned to, or otherwise rigidly secured on, a shaft 954 which is rotatably mounted on the left side control plate 65 and the left side auxiliary frame plate 66. On its left end the shaft 954 carries an arm 955 (shown in phantom in FIG. 18 and in full lines in FIG. 19). The upper end of this lever engages a roller 956 secured on the forward arm of the V-shaped bellcrank 566. It will be recalled that this bellcrank is biased forwardly by a spring 557 into the position in which its rearward arm 555 engages the ear 549 of the first auxiliary clutch at approximately the half-cycle position. The rocking of the shaft 954 (counter-clockwise in FIGS. 18 and 19) by the rocking of bellcrank 345 through the overshifting of the carriage, causes arm 955 to rock the bellcrank 556 to clutch-disengaging position (counter-clockwise in FIGS. 18 and 19). Thereupon the auxiliary clutch 530 again becomes engaged and returns to its full-cycle position and all of the parts are restored to normal.

(a) *Repeat Operation*

The operation of the restoring plate 877 by means of the cams 875 and 876 can be prevented at the will of the operator by the use of a customary repeat key 895 (FIGS. 1, 8, 9 and 19). This key is mounted upon a vertical stem 896 formed on a setting slide 897 (FIGS. 8 and 19). This slide, as best shown in FIG. 8, is mounted on the upper multiplier keyboard frame plate 313 by a suitable pin-and-slot connection which may comprise a slot 898 in the slide embracing a pin 899 mounted on the frame plate. The key is moved forwardly or backwardly to set the repeat multiplier mechanism to operative or inoperative position, and when so set is detented in the adjusted position. A suitable detent can comprise a detent shoulder 900 on the slide and a cooperating detent arm 901. The detent arm is resiliently biased to engagement with the slide by any suitable spring, such as 902, and is pivoted on the upper frame plate by any suitable means, such as a pin 910. The slide is formed with a short vertical bracket 903 (FIGS. 8 and 19) upon which is riveted a long pin 904 (also shown in FIGS. 15 and 16).

The upper guide rail 337 (FIGS. 9, 15 and 16) is mounted between left side control plate 65 and auxiliary frame 64. The multiplier carriage 330 is slidably mounted on shaft 337 by bearings in the frame plates 333 and 334 of the multiplier carriage. A bail 911 (FIGS. 10, 15 and 16) is rotatably mounted on the guide rail 337, straddling the multiplier carriage 330 as its left leg 905 lies to the left of the left end plate 334 and its right leg 908 lies to the right of right end plate 333. The left leg 905 of the bail 911 is formed as an offset rocker (FIGS. 10 and 15), and its upper arm is slotted, as at 906, to embrace the pin 904. It is, therefore, obvious that the operation of the repeat key 895, and the consequent adjustment of the long pin forwardly or rearwardly in the machine, rocks the rocker arm 905 and hence the bail 911. The lower arm of the rocker 905 carries a roller 907 (FIG. 15) which, when the key 895 is pulled to its forward position and the shaft 337 is rocked (clockwise from the position shown in FIG. 15), will engage a tail 887 of the follower arm 882. When so engaged by the roller 907, the follower 882 is rocked (clockwise from the position shown in FIG. 15), so that the roller 886 on the upper end thereof will not be engaged by the cam 876. Similarly, the right leg 908 (FIG. 16) of the bail 911 has a downwardly projecting arm similar to the lower arm of the left leg 905. A roller 909 on this lower arm is adapted to engage the tail 887 of the right-hand follower arm 882, rocking the latter (counter-clockwise in FIG. 16, as is indicated by the phantom lines in this figure). By this means the movement of the repeat lever to its forward, or repeat, position disables the operation of the restoring plate 877—so that a value inserted in the multiplier carriage 330 will not be erased at the end of a multiplication operation. This disabling, however, does not disable the operation of the restoring bail 871, so that all of the segments are returned to their "0" position at the end of each operation, regardless of the setting of the repeat key 895.

It is customary in the multiplier mechanisms of the Friden patents above-mentioned to provide a repeat multiplier mechanism, such as that disclosed by the patent to Ellerbeck of June 4, 1957, No. 2,794,595. This mechanism serves the purpose of latching an escapement control means in an effective condition in which, at the end of the overstroke cycle, it resiliently returns the multiplier carriage to the predetermined ordinal position instead of latching it in its home position. This mechanism is fully described in the Ellerbeck patent just mentioned and it is believed unnecessary to repeat that description in detail.

However, it can be noted that the movement of the repeat key 895 forwardly from the position shown in FIGS. 18 and 19 moves a link 915 forwardly. This link 915 corresponds to link 290 of the Ellerbeck patent and is translated by means of the mechanism shown in FIG. 12 of the patent. This link is supported at its rear end by means of a pin 916 engaging a slot 917 in an operating arm 918. A spring 919 tensioned betwen a seat on the link 915 and a seat in the arm 918 biases the arm to follow movement of the link. The arm 918 is pivotally mounted on a bracket 920 mounted on the left side control plate 65 by a suitable pin-and-slot connection, such as a slot 921 in the arm embracing a pin 922 riveted on the bracket, as shown. Normally the arm 918 will hang in the lower position shown in FIGS. 18 and 19, but it can be lifted because of the pin-and-slot connection 921, 922, so that its upper end will engage and lift a tail 923 of the usual escapement mechanism. This escapement mechanism is well illustrated in FIG. 8 of the Ellerbeck Patent No. 2,794,595, and is adequately described in that patent. When the arm 918 is lifted to lift the ail 923 of the escapement mechanism, the escapement mechanism is disabled and the multiplier carriage is allowed to escape to the left as far as permitted by the normal ordinal stopping mechanism described in that patent.

The arm 918 is lifted to operate the escapement mechanism by means of a rocker 930 that is pivotally mounted on the left side control plate 65 by any suitable means, such as a pivot stud 931. The rear end of this arm is bifurcated to form a diagonal cam slot 932 which engages a pin 933 carried by the program bellcrank 564. It is evident that as the program bellcrank 564 rocks to its operative position (counter-clockwise in FIGS. 18 and 19), the rocker 930 is rocked (clockwise when viewed from the left as in these figures). This depresses an ear 934 on the forward end of the rocker, the ear normally lying in front of, and slightly above, the level of a shoulder 935 formed on the lower end of the arm 918. When the repeat key 895 is in its rearward position, the arm 918 is held rearwardly by link 915 and the shoulder 935 lies to the rear of the ear 934. However, when the repeat key 895 is pulled to its forward, or repeat, position, the movement of link 915 resiliently biases the arm 918 forwardly. Then, when the multiplication program is initiated and the rocker 930 is rocked, the ear 934 passes below the level of shoulder 935 and the arm 918 is snapped forwardly so that the shoulder 935 overlies the ear 934. At the end of the multiplying operation, the restore mechanism is operated and rocks the program bellcrank 564 to its normal, inoperative, position shown in these fgures. Such movement rocks the front end of the rocker 930 upwardly (counter-clockwise in these figures), thereby lifting the link 918 and permitting the escapement mechanism to release the carriage 330 to the selected ordinal position, as described in the Ellerbeck patent.

The lifting of the link 918 is also operative to release the "0" latch 357. This can readily be accomplished by means of a link 940, the upper end of which is pinned on the link 918 by any suitable means, such as a pivot stud 941. The lower end of the link 940 is pivotally secured to the rearwardly extending leg of a bellcrank 942 which forms the left-hand supporting leg for a bail 943 (FIGS. 9, 11, 13 and 14). The bail 943 is pivotally mounted on shaft 426 and lies immediately behind the lower end of the "0" latch 357 (to the right thereof in FIGS. 9, 11, and 13, and to the left thereof in FIG. 14). This bail 943 lies to the left of the "0" latch releasing arm 359 (FIG. 9), extending from the first adjusted position of the multiplier carriage to its extreme adjusted position. That is, the bail 943 lies behind all the "0" latches lying to the left of the home position of the multiplier carriage. Thus, the operation of the link 918, at the end of the restore cycle of the multiplication operation, is also effective to rock the bail 943 and hence release all of the "0" latches lying to the left of the home position. By this means the segments which have just been restored by operation of the bail 871 are immediately released to assume the position determined by the set pins 355—thereby erasing any adjustment in the relative position of the two sections of the segments which may have been occasioned by short-cut operations.

III. OPERATION

It is believed that operation of the mechanisms of my invention should be evident from the foregoing description. However, it will not be improper to briefly review the operation of the mechanisms described. An understanding of the operation of the mechanisms may be simply given by briefly reviewing the steps of a multiplication problem. For purposes of illustration, let us assume a multiplier value of "900565" and a multiplicand value of "7." The multiplicand value is first set in the main keyboard keys 100 at any preselected decimal point, say, for example, in the third order. The multiplier value is then entered into the multiplier keyboard keys 310 in sequence beginning with the highest digit and proceeding to the lowest. The depression of these value keys in sequence, beginning with the "9," by means of the mechanism shown in FIG. 9 and completely described in the Friden multiplier Patents Nos. 2,371,752 and 2,399,917, already mentioned, is operative to set the control segment assemblies 366, 367 in the highest six orders of the multiplier carriage 330 in the respective digital value positions. Specifically, the highest order segment assembly 366, 367 has been released by operation of the "0" latch 357 to release the bellcrank segment 366, and it will be stopped by the "9" stop bar 335 (see FIG. 14). The associated, or co-ordinal, control segment 367 assumes the same position. The bellcrank segment 366 is, of course, pulled to this position by its spring 380, and the control segment 367 assumes the same position because it is latched to the bellcrank 366 through the detent which includes the pin 374 and the detent teeth 386. Also the depression of the "9" key has been effective to operate the escapement mechanism (not described herein but fully described in the Friden patents above-mentioned) to permit the multiplier carriage 330 to escape one order to the left. Thereafter the "0" key 311 is depressed twice, both of which operations cause the further escapement of the carriage two steps, but as this key is not effective to release the "0" latch 357, the respective multiplier segment assemblies 366, 367 retain the "0" position shown in FIG. 11. Then the depression of the "5" key projects the "5" pin 355 (as shown in FIGS. 12 and 13); releases the "0" latch, so that the two segments are positioned as shown in FIG. 13; and again operates the escapement mechanism. The depression of the "6" key causes the projection of the "6" stop pin in the adjacent order and the positioning of the segments accordingly, together with the further escapement of the multiplier carriage. Finally, the depression of the "5" key operates the same mechanism to set a value of "5" in the segments 366, 367 in the sixth order from the left, and escape the carriage a sixth step to the left. Thus, at the end of this value insertion operation, the six higher order segments have assumed angular positions representative of the values of "9," "0," "0," "5," "6" and "5," respectively.

The depression of any of the control keys 405, 406 or 407 will thereafter initiate a multiplication operation. For purposes of exemplification, we will assume that the multiply key 405 has been depressed. The key 405 is latched down by the latch 413 (FIG. 17), and will be held in this position until the multiplication has been completed and the multiplier carriage is shifted one step to the right of its home position (i.e., until the overshift cycle).

The depression of this key rocks the bellcrank lever 420 (FIG. 17) to rock arm 425 and shaft 161 (clockwise in this figure). The rocking of the shaft 161, by means of the linkage shown in FIG. 4, causes forward translation of the switch control link 156 (to the right in FIG. 4) and the rocking of the clutch control levers 153 and 151 (counter-clockwise in this figure) to cause engagement of the clutch 150. In the first cycle of operation so caused, the registers are cleared as the rocking of shaft 161 has operated pusher 240 (FIG. 17) to move clutch control rod 239 to operate clearing clutch 238, and thereby operate the clearing mechanism shown in FIGS. 3, 8 and 17. Simultaneously with the clearing operation in this first cycle of operation, the program mechanism, illustrated in FIGS. 5 and 6, is enabled and becomes effective to initiate a sequential right shift of the carriage beginning in the second cycle of operation. This shifting continues until the carriage reaches its extreme left-hand position. When this position has been reached, the next attempted shifting operation of this sequential series causes operation of the override pawl 291 (FIG. 3), which depresses slide 295 to rock bellcrank 297 and push the link 298 (FIGS. 4 and 7) forwardly to rock the override bail 299. The rocking of this bail disables the shifting mechanism, as explained. The operation of the override bail 299, by means of the links 503 and 508 and arm 510 (FIG. 4), is also effective to rock the initiating shaft 512 (clockwise in FIGS. 4 and 18).

It is evident that if the accumulate multiply key 406 or the negative multiply key 407 had been depressed to initiate the multiplication operation, the clearing step would have been disabled by means of the rocking of shaft 471 (FIG. 17). It will be recalled that this shaft was operated by the rocking of arm 452, movement of link 455, rocking of bellcrank 467, and the rocking of arm 470 (FIG. 18).

The left end of the initiating shaft 512 is shown in FIG. 18. It will be obvious that the rocking of shaft 426 (counter-clockwise in this figure), resulting from the operation of any of the multiplier control keys, has enabled the multiplication initiating link 439 to rise from its inoperative position shown. When this occurs, the shoulder 441 on its forward end will become engaged by ear 514 on arm 513 rigidly affixed to the left end of shaft 512. Thus, the rocking of the shaft 512 translates the link 439 rearwardly only when machine operation has been initiated by the depression of one of the multiply control keys. The rear end of this link 439 is pinned to the clutch control lever 525, so that its rearward translation rocks the clutch control arm 525 (counter-clockwise in this figure) to release the auxiliary clutch for operation. The operation of the link 439 and the consequent engagement of the clutch 530 occurs at approximately the midpoint of the override cycle. The driven side of the clutch is immediately picked up, so that its driven shaft 538 and the cams 560 and 561 (FIGS. 21 to 24) are thereon immediately rotated. Immediately after the initial rotation of the shaft and cams, the lobe of cam 560 releases its follower roller 562, thereby enabling the program bellcrank 564 to rock under the pressure of its strong spring 568. This bellcrank 564 is rigidly secured on shaft 527, and hence the shaft rocks with the rocking of the bellcrank. The rocking of the shaft 527 (as shown in FIG. 32) rocks arm 660 which pulls the link 661 downwardly. As the machine was set for overall operation in the additive sign character direction, the hook 668 at the upper end of link 661 is in engagement with pin 669 on arm 670, so that the arm 670 is rocked downwardly (clockwise in this figure). The rocking of the arm 670 rocks the control link 673 (counter-clockwise in FIGS. 32 and 33) about its pivot 678 on bellcrank 830. Such rocking of the link 673 rocks the control plate 680 (in a clockwise direction in FIG. 33) and causes the engagement of pin 682 on the control plate with the notch 674 in the control link 673. Such rocking of the control plate lifts the link assembly 686, 689, so that the pin 692 carried by the link assembly is lifted into engagement with the notch 738 in the additive setting yoke 726 (FIG. 34). The setting arm 670 and link 673 remain throughout the multiplication operation, as the shaft 527 retains its rocked position until restored by operation of the program cam 560 in the restoring operation at the end of the multiplication operation. Hence, the arm 670 is set at the override cycle, and remains set throughout the multiplication program. Consequently the control link 673 is positioned in one or the other sign character positions, and remains so set throughout the operation. It can be noted, however, that the control link 673 will be translated forwardly when required for a reverse sign character operation, which translation is effective to also rock the control plate 680 to move the links 686 and 689 and therefore pin 692, as required.

The rocking of the shaft 527 has also rocked the arm 654 (FIG. 32) to release the arm 652 that is pinned to shaft 651, thereby enabling the shaft, under bias from spring 655, to rock the "0" sensing arm 646 (counterclockwise in this figure) to its sensing position in which it lies radially within the teeth 387 on the segment 367 lying in the operative ordinal position.

The rocking of the program bellcrank 564 has also lifted the link 575 (FIG. 18) to enable shaft 468 to rock under the bias of spring 580. The rocking of the shaft 468 (clockwise in FIG. 18 and counter-clockwise in FIGS. 26 and 27) causes the engagement of feed gear 586 with the teeth 387 of the operative segment 367. It has been mentioned that this feed gear 586 is rocked one increment with each cycle of operation, being driven by eccentric 610 and cam follower 611 (FIGS. 26 to 30). In the present instance, the machine has been set for positive operation and the sensor 815 (FIG. 32) has sensed a value of lower magnitude, so that the shaft 624 is rocked to the additive position shown in FIG. 28, and the feed mechanism is set for positive operation (counter-clockwise in FIG. 28). In this situation the feed gear 586 will feed the operative segment back to its "0" position and the counter dials 89 will register positively.

After approximately 120° rotation of the auxiliary shaft 538, following the initiation of operation thereof (at approximately the 300° position of the main drive shaft 132), the cam 561 (FIGS. 22 and 24) rides out from under its roller 565 to release the follower arm 566 and shaft 567 (FIG. 18). However, in most instances, and especially in the present case in which a value of "5" is set in the operative order of the multiplier unit, the arm 566 and shaft 567 are prevented from rocking to initiate a shifting cycle. It will be recalled that the rocking of shaft 527 (FIG. 32) and arm 654 released the arm 652 and shaft 651 for rocking under the influence of spring 655. This enabled the "0" sensing arm 646 to fall into a sensing position. This occurred immediately after the start of operation of the auxiliary clutch 530. It is seen by reference to FIG. 24 that the rocking of the shaft 651 rocked the clutch control bellcrank 709 (counter-clockwise in this figure) to release the clutch dog 704. Shortly thereafter a shoulder on the clutch dog 704 becomes engaged by the teeth of the driver 702 on the driven side of the clutch, and the cam cluster attached thereto rotates. Incidentally, this clutch is so engaged for rotation through an angle of about 150°, after which the ear 706 on the dog 704 is caught by hook 708 to stop the clutch in a "half-cycle" position. Such engagement of this auxiliary clutch begins at approximately the 230° position of the main drive shaft, so that the shift control cam 723 will have rotated through an angle of 60° to 75° prior to the time that the cam 561 releases the shift control arm 566. Therefore, at the time the cam 561 releases the arm and shaft 567, rotation of the shaft is blocked by the engagement of the roller 745 on arm 571 (FIG. 32) with the lobe 746 of the cam 723.

In the interim, however, the rotation of the secondary clutch 701 has rotated the sensing cam 722, and after a few degrees of such rotation, both bellcranks 818 and 830 are released by the lobe of cam 722. The release of bellcrank 818 by the cam 722 enables it to rock (in a counter-clockwise direction in FIG. 32) if permitted by the sensor lever 815. In this instance, it cannot rock as the sensor lever 815 is blocked by arm 805, and, therefore, the ear 824 on the sensor 815 remains in its upper position to engage shoulder 831 on lever 830—thereby blocking any rocking of lever 830 sufficient to reverse the sign character of the operation. Thus, in this instance, the control link 673 remains unchanged from the additive position in which it was first set, and the machine remains conditioned for additive operation. The feed mechanism is, therefore, retained in its additive position shown in FIG. 28 and the digitation control shaft 145 and consequently the gate 143 likewise positioned for addition, and all are held in the additive position throughout this ordinal series of operations.

At the end of the half-cycle of operation of the auxiliary clutch 530 (FIGS. 18 and 19), the ear 549 (FIG. 20) engages the end of arm 555 of the V-lever 556, thereby disabling the clutch 530. This happens at approximately the 360° position of the main drive shaft 132. The clutch 530, and the cams driven by it, remain in the half-cycle position until the end of that ordinal series of operations. The secondary clutch 701, however, still rotates somewhat until the ear 706 engages hook 708—but such rotation has no effect on the operation of the machine, for the prior operation of the "0" sensing arm 646 has already conditioned the machine for digitation.

Beginning in the next cycle (in the first full cycle following operation of the override pawl), the feed mechanism shown in FIGS. 26 to 30 is operative to feed the segment 367 additively, or back to "0" (in a counter-clockwise direction from the position shown in FIG. 13 to that shown in FIG. 12) one increment, or tooth, with each cycle of operation. Throughout this series of operations the digitation mechanism remains locked in the additive setting, for the cam 726 (FIG. 34) has also been positioned by the partial rotation of the secondary clutch 701 and must remain in that position to cause additive operation in the registers, for the clutch 701 and cams are stopped. Thus, the multiplicand value is added five times into the register dials 84. During the fifth such cycle of operation, the "0" tooth 389 engages the nose of the "0" sensing arm 646 and rocks it (counter-clockwise from the position shown in FIG. 13 to that shown in FIG. 11). This rocking occurs at approximately the 150° position of the main drive shaft, and immediately causes the hook 708 (FIG. 24) of the control bellcrank 709 to release the ear 706 of the clutch dog 704. The clutch becomes engaged at about the 195° position, and thereafter will rotate the cam cluster until the ear 706 engages the shoulder 707 on the other leg of the control bellcrank 709. Such rotation causes the lobe 746 of shift cam 723 (FIG. 32) to rock out from under the roller 745 at the upper end of the shift control arm 571. This arm is thus pulled by its spring 570 (counter-clockwise in FIG. 32) to initiate the shifting operations which are caused by the rocking of shaft 567. It is believed unnecessary to repeat the details of operation caused by the rocking of the shaft, for they are adequately described in Section 4(c), subsections (2) and (3). However, it should be noted that the rocking of this shaft does cause a right shift of the register carriage 80 one order, and similarly a right shift of the multiplier carriage 330 one order. Also the rocking of arm 571 has disabled the segment feed mechanism through the engagement of roller 749 on arm 571 (FIG. 32) with the cam tail 583 of arm 582 which is rigidly secured to shaft 468. The rocking of the shaft 468 occasioned thereby, rocks the feed mechanism from the operative position shown in FIG. 27 back to the inoperative position shown in FIG. 26, thereby disabling this mechanism. At the end of the first ordinal series of operations, the product register dials 84 will register a value of "35.00" and the counter dials will register a value of "5."

As the shifting operation of the multiplier carriage 330 progresses, the nose 645 of the "0" sensing arm 646 rides out from under the wide "0" tooth 389, thereby enabling the arm to rock under the bias of spring 655 before the end of the shift cycle. Such rocking again rocks the arm 713 (FIG. 24), and hence rocks clutch control bellcrank 709, so that the shoulder 707 releases ear 706 and the auxiliary clutch 701 will rotate another 150° until the ear 706 is caught by hook 708. The rotation of the cams resulting therefrom again causes cam 722 (FIG. 32) to rotate from under the snesing bellcrank 818 and the reversing bellcrank 830.

In this instance the sensor arm 815 will be enabled to rock, as the value in this order stands at "6" and hence the arm 805 will have rocked forwardly (clockwise in FIGS. 11 to 13), from the position shown in FIGS. 11 and 13 to that shown in FIGS. 12 and 14. Such rocking of the sensor 815 moves the ear 824 away from the shoulder 831 (FIG. 32) on reversing bellcrank 830. The force of spring 832 thereupon causes this arm to rock forwardly (counter-clockwise in FIG. 32) to pull the control link 673 forwardly. As this control link is pulled forwardly, as its slot 674 engages pin 682, it rocks the control plate 680 (in a counterclockwise direction in FIG. 33) and, therefore, moves the pin 692 on link 689 downwardly from engagement with notch 738 into engagement with the notch 736 in the subtractive yoke 727. The rotation of the subtraction cam 720 will rock the yoke 727 (counterclockwise in FIG. 34) as it does in each cycle, but now the pin 692 is in the slot 736 of follower 727, and the link 689 moves rearwardly (to the left in FIG. 33) and thereby sets the digitation control shaft 145 for subtractive operation.

The rocking of shaft 624, as previously described, through its associated linkage, will move the feed control linkage from the position shown in FIG. 28 to that shown in FIG. 29, thereby setting the feed mechanism for operation in the subtractive direction. Thereafter, in the series of operations in the second order (the tens order of the multiplier value), the segment feed mechanism (FIGS. 26 to 30) will feed the segment in the reverse direction (clockwise from the position shown in FIG. 13 to that shown in FIG. 12). In this case four such incremental feeds bring the "10" tooth 338 into engagement with the nose on the tip of the "0" sensing arm 646. When the segment is fed forwardly to the "9" position, the notch 399 on the control arm of that segment moves into engagement with the crossbar 391, thereby enabling the arm 395 to rock inwardly (clockwise in these figures). Thereupon, the ear 394 on this arm engages one of the teeth of the rack 392 on the adjacent higher order (as illustrated in FIG. 13). Then as the segment is fed from its "9" to its "10" position, the movement of the segment, through the ear 394, moves the control segment 367 of the adjacent higher order one step forwardly with relation to its setting bellcrank 366. This higher order segment is detented in this adjusted position by the detent pin 374 engaging the next interdental space on detent rack 386. The higher order segment is thereafter held in a position representative of a value of "6," although the setting bellcrank 366 still remains in its "5" position. Simultaneously with this operation the wide "10" tooth 388 has rocked "0" sensing arm 646 to initiate another interordinal shifting operation. At the end of the second ordinal series of operations the product dials 84 register a value of "999755.00" and the counter dials 89 register a value of "99965."

During the shifting cycle which follows this last operation, this mechanism just described operates as previously described and the sensor arm again senses a value of "6," for the former setting of "5" in the third order was adjusted to "6" in the last digitation operation in the second order. Thus, in this third order, the machine is set for operation in the reverse sign character direction. Therefore, operation in the third order is identical with that described in connection with the second. At the end of this third ordinal series of operations, the product register dials 84 will register a value of "9996955.00" and the counter dials 89 will register a value of "999565."

As the third segment moves into its "9" position during the third interordinal series of operations, its arm 395 will rock, thereby enabling the ear 394 thereon to engage the lowest rack tooth 393 in the adjacent, or fourth order, segment. Both portions of this segment assembly stand at "0" at this time. During the last incremental feed of the third order segment, the ear 394 forces the fourth order segment 367 one increment forwardly to register a value of "1." Thus, in the fourth ordinal series of operations, the machine will be operated in the selected sign character direction for the single cycle of operation necessary to feed the segment backwardly from its "1" position to its "0" position. As this single cycle of operation is completed the register will stand at "003955.00" and the counter dial will register "00565."

In the next ordinal position the segment 367 stands at "0," so the "0" sensing arm 646 is prevented from rocking to release clutch 701 for its half-cycle of rotation. The machine, therefore, is held in the shifting operation for another order as the shaft 567 (FIG. 32) remains in its rocked, or operative, position (counter-clockwise from the position shown in this figure). During the shifting cycle in which the multiplier register carriage (and also the register carriage 80) shift from the fifth to the sixth ordinal position, the sensor arm 815 senses the higher magnitude value caused by a registration of "9" in this order, so that the reversing arm 830 is enabled to operate to set both the feed mechanism and the digitation mechanism for operation in the reverse sign character direction. There will be a single subtractive cycle of operation in this order, which causes the product dials 84 to register a value of "999303955.00" and the counter dials 89 to register a value of "99900565."

At this time the highest order segment 367 is in the operative position, and as it moves from its "9" to its "10" position, the ear 394 on its control arm 395 engages one of the ratchet teeth 847 of the auxiliary segment 840, and moves it forwardly (counter-clockwise in FIG. 15) to represent a value of "1." Following this operation, the multiplier carriage 330 is shifted one order to the right to its home position and the register carriage 80 is also shifted one order to the right. It will be noted that as this shift cycle starts, the multiplier carriage has its highest order segment 367 in the operative position— one ordinal step to the left of the home position. At this time, therefore, the register carriage shifting mechanism is still enabled by the rocking of shaft 567. As the auxiliary segment 840 registers a value of "1," the "0" sensing arm is now permitted to rock when the multiplier carriage 330 returns to its home position. This causes a single cycle of operation in the selected sign character direction in the eleventh order, and gives a register reading in the product dials 84 of "6303955.00" and a counter reading in the counter dials 89 of "900565."

At this point the multiplication has been completed, but the multiplying mechanism is held for an additional shift of the multiplier unit 330 by the engagement of the "0" sensing arm 646 with the long tooth 842 (see FIG. 10) on the auxiliary segment 840. At this time the register carriage shifting mechanism will be disabled, because the multiplier unit has returned to its home position. However, the multiplier carriage is shifted one step, so that the restore cam 855 (FIG. 9) is enabled to engage the roller 856 (see also FIG. 16) on gear segment 857 during this shift cycle. Such engagement rocks the gear segment 857, idler pinion 859, and the second gear segment 861. The rocking of the second segment 861 rocks the shaft 336 on which it is secured, and also the arms 870 and bail 871 which are secured to the shaft, thereby restoring all of the segments 367 to their "0," or original, position. Simultaneously, and unless the multiplier mechanism has been set for repeat operation, the rocking of the secondary segment 861, through the engagement of cams 875 and 876 with the rollers 886 (FIGS. 15 and 16) of restore plate 877, causes the restore plate to be depressed to restore all of the pins 355 to their inoperative position. The machine is then ready for another problem.

While I have herein described and in the drawings have shown the preferred embodiment of the invention, it is to be understood that the invention is not limited to this exact form, but may comprehend other constructions and arrangements without departing from the spirit and scope of the invention.

I claim:
1. In a calculating machine having an accumulator, drive means for said accumulator operative additively or subtractively, means for shifting the relative ordinal position of the accumulator and said drive means, and a manual means for initiating a multiplication operation, the combination which comprises a plurality of ordinally arranged multiplier value elements each differentially adjustable to represent the various digital value positions of a multiplier, adjusting means operated concurrently with the operation of said actuating means for incrementally adjusting a selected one of said elements forwardly to a "10" position when registering a value of greater magnitude or backwardly to a "0" position when registering a value of lower magnitude, a shifting mechanism for shifting the relative ordinal position of said adjusting means and said elements, a program member operated by said selected element upon movement to either its "10" or its "0" position for terminating operation of the adjusting means and the accumulator drive means and for operating the shifting means and the shifting mechanism, a sensing means for sensing a lower magnitude value position or a higher magnitude value position of the selected one of said elements, means operated by said sensing means for controlling adjustment of an operative element forwardly or backwardly to said "10" or said "0" position, means operated by said sensing means for controlling the additive or subtractive operation of said accumulator drive means, a connecting member carried by each lower order element operable to engage the adjacent higher order element, and means operated by the selected one of said elements when being adjusted from a "9" position to the "10" position for operating said connecting member and thereby incrementally increasing the value of the adjacent higher order element a single incremental step.

2. In a calculating machine for performing multiplication operations having an accumulator, an actuator therefor, means for shifting the relative ordinal positions of said accumulator and said actuator, sign character control means for controlling the operation of said accumulator by said actuator additively or subtractively, and a manual means for selecting the overall sign character of a multiplication operation and for initiating operation of said actuator, the combination which comprises a plurality of ordinally arranged multiplier value elements each differentially adjustable for registering the digits of a multiplier value, said elements each having a shift-initiating position corresponding to a value of "0" or a value of "10," adjusting means operated concurrently with the operation of said actuator for incrementally adjusting the element in an operative ordinal position forwardly or backwardly from its adjusted position toward one of said shift-initiating positions, shifting mechanism for shifting the relative ordinal positions of said adjusting means and said elements, a shift-initiating member operated by said operative element upon movement to either of its shift-initiating positions for terminating operation of the adjusting means and for operating the shifting means and the shifting mechanism and initiating operation of the said actuator under control of the next element, a sensing means for sensing the lower magnitude position or the higher magnitude position of the operative one of said elements, means operated by said sensing means for controlling adjustment of the operative element forwardly or backwardly to said shift-initiating position, means controlled jointly by said sensing means and said manual means for controlling the additive or subtractive operation of said sign character control means, a normally inoperative coupling member carried by each element for coupling that element to the adjacent higher order element, means operative when the operable element is in a "9" value position for operating its coupling member, whereby the coupling member is effective to incrementally increase the value of the adjacent higher order element a single value increment as the operative element is adjusted to its "10" position.

3. In a calculating machine having an accumulator, a cyclically operable actuator, means for shifting the accumulator, means for controlling the operation of said accumulator additively or subtractively, a plurality of ordinally arranged multiplier value elements for storing the digits of a multiplier value, a mechanism for shifting said elements, and a manual means for initiating a multiplication operation, the combination which comprises a cyclically operable adjusting means for adjusting an operative one of said elements forwardly to a "10" position or backwardly to a "0" position concurrently with the cyclic operation of the actuator, means operated by an operative one of said elements upon adjustment to either a "0" position or a "10" position to terminate operation of said actuator and initiate operation of said shifting means and said shifting mechanism, means for sensing a lower magnitude position or a higher magnitude position of the operative one of said elements, means controlled by said sensing means for controlling operation of the said accumulator additively or subtractively and the operation of the adjusting means for adjusting the operative one of said elements forwardly or backwardly, a rack carried by each higher order element, a coupling member carried by each lower order element, a normally inoperative means for operating each coupling member to engage the rack of the adjacent higher order element, and means operated by the operative one of said elements upon adjustment from a "9" position to a "10" position for operating said normally inoperative means and thereby incrementally adjusting the adjacent higher order element a single incremental step.

4. In a calculating machine for performing multiplication operations having an accumulator, a cyclically operable actuator, means for shifting the accumulator, means for controlling the sign character of operation of said accumulator by said actuator, a multiplying mechanism including a plurality of ordinally arranged multiplier value elements shiftable ordinally as a unit, a mechanism for shifting said elements, and a positive and a negative multiply key, the combination which comprises a cyclically operable adjusting means for adjusting an operative one of said elements forwardly or backwardly to a "10" position or a "0" position concurrently with the cyclic operation of the actuator, means operated by the operative one of said elements upon adjustment to either a "0" position or a "10" position for terminating operation of said actuator and initiating operation of said shifting means and said shifting mechanism, means for sensing a lower value position or a higher value position of the operative one of said elements, means controlled by said sensing means for controlling operation of the sign character controlling means and the operation of the adjusting means for adjusting the operative one of said elements forwardly or backwardly, and a coupling member carried by each element for engaging the adjacent higher order element when an element is in a "9" and "10" value position, whereby the adjustment of the operative one of said elements from a "9" position to a "10" position incrementally adjusts the adjacent higher order element a single incremental step.

5. In a calculating machine for performing multiplication operations having an accumulator, an actuating means for operating said accumulator, means for shifting the accumulator with respect to said actuating means, means for controlling the sign character of operations of said accumulator by said actuating means, and a manual means for selecting the sign character of a multiplication operation and for initiating operation of said actuating means, the combination which comprises a plurality of ordinally arranged multiplier value elements each differentially adjustable for registering the digits of a multiplier value, said elements each having shift-initiating positions corresponding to a value of "0" and a value of "10," adjusting means operated concurrently with the operation of said actuating means for incrementally adjusting the element in an operative ordinal position forwardly or backwardly from its adjusted position toward one of said shift-initiating positions, a shifting mechanism for shifting the relative positions of said adjusting means and said elements, a shift-initiating member operated by said operative element upon movement to either of its shift-initiating positions for terminating operation of the adjusting means and the actuating means and for operating the shifting means and the shifting mechanism and initiating operation of the said actuating means under control of the adjacent higher order element, a sensing means for sensing the lower magnitude position or the higher magnitude position of the operative one of said elements, means operated by said sensing means for controlling adjustment of the operative element forwardly or backwardly to said shift-initiating position, means controlled jointly by said sensing means and said manual means for controlling the operation of said sign character controlling means, a normally inoperative coupling member carried by each element for coupling that element to the adjacent higher order element, means effective in the "9" value position of an element for operating said coupling means, whereby the operative one of said elements when being adjusted from a higher magnitude position to the "10" position will incrementally increase the value of the adjacent higher order element a single incremental step, and means for maintaining said so-adjusted element in its increased position.

6. In a calculating machine for performing multiplication operations having an accumulator, a cyclically operable actuating means therefor, means for shifting the accumulator with respect to said actuating means, means for controlling the sign character of operation of said accumulator by said actuating means, and a manual means for selecting the sign character of a multiplication operation and for initiating machine operation, the combination which comprises a plurality of ordinally arranged and sequentially operated multiplier value elements for registering the digits of a multiplier value, said elements being differentially settable to represent the various multiplier digits and having two shift-initiating positions corresponding to "0" and "10," cyclically operable adjusting means for incrementally adjusting one of said elements forwardly or backwardly to one of said shift-initiating positions concurrently with the cyclic operation of the actuating means, means for changing the operative ordinal relationship between said elements and said adjusting means for causing said adjusting means to adjust said elements in ordinal sequence, means operated by an operative one of said elements upon adjustment to either shift-initiating position to terminate operation of said actuating means and initiate operation of said changing means and said shifting means, means for sensing a lower value position or a higher value position of the operative one of said elements, means controlled by said sensing means for controlling operation of the actuating means in the selected or the reverse sign character and the operation of the adjusting means for adjusting the operative one of said elements forwardly or backwardly, a rockable member carried by each multiplier value element, which rockable member when rocked is adapted to engage the adjacent multiplier value member, and means for rocking said rockable member into such engagement when its respective multiplier value member registers a value of "9," whereby the adjustment of an operative multiplier value element from a "9" position to a "10" position will incrementally adjust the adjacent higher order element a single incremental step, and holding means associated with said elements for maintaining the same in an adjusted position.

7. In a calculating machine for performing short cut multiplication having an accumulator, actuating mechanism including a sign character reversing means for reversibly operating the said accumulator, means for shifting said accumulator relative to said actuating mechanism, sign character control means for adjusting the reversing means to operate said accumulator in a selected sign character direction or in a reverse sign character direction, power-driven means for cyclically operating said actuating means and shifting means, and a manual means for selecting the sign character of a multiplying operation and initiating operation of said power-driven means, the combination which comprises a multiplier storage mechanism having a plurality of differentially settable elements shiftable ordinally as a unit for controlling multiplying operations, manual means for successively setting said elements in sequence to represent the digits of a multiplier and escaping said storage mechanism one order, means operated by said power-driven means for adjusting the settable element of an operative order progressively toward a "0" position or a "10" position, mechanism for shifting said differentially settable elements to bring successive elements into operative position, means responsive to the adjustment of a settable element to a "0" or a "10" position for controlling the operation of said shifting means, said shifting mechanism, said actuating mechanism, and said adjusting means, positionable means for setting said sign character reversing means, power-driven means for operating said setting means, control means for controlling the adjustment of the setting means to a selected sign character position whenever the operative settable element is positioned to represent a value of one magnitude and to a reverse sign character position whenever the operative settable element is positioned to represent a value of another magnitude, control means for controlling the adjustment of the operative one of said settable elements toward its "0" position whenever the operative settable element is positioned to represent a value of said one magnitude and toward its "10" position when positioned to represent a value of said other magnitude, and a member carried by each element for engaging the adjacent higher order element when the operative element is in its "9" position, whereby the adjustment of the operable element from its "9" to its "10" position will adjust the adjacent higher element one value step toward a higher value position.

8. In a calculating machine for performing short cut multiplication having
  an accumulator,
  a reversible drive means for said accumulator for selectively operating the accumulator additively or subtractively,
  means for shifting said accumulator relative to said drive means,
  sign character control means for adjusting the drive means to operate said accumulator in a selected sign character direction or in a reverse sign character direction,
  power-driven means for cyclically operating said actuating means and shifting means,
  a multiplier storage mechanism having a plurality of differentially settable elements shiftable ordinally as a unit for controlling multiplying operations,
  manual means for successively setting said elements in sequence and escaping said storage mechanism one order,
  and a positive and a negative multiply key,
the combination which comprises
  means for adjusting the settable element of a selected order from a set position backwardly to a "0" position or forwardly to a "10" position,
  mechanism for shifting said differentially settable elements to bring successive elements into the selected position,
  means responsive to the adjustment of a settable element to a "0" or "10" position for controlling the operation of said shifting means and said shifting mechanism, positionable means for setting said sign character control means, control means for controlling the positioning of the positionable means to a selected direction position whenever the operative settable element is positioned to represent a value of one magnitude and to a reverse direction position when positioned to represent a value of another magnitude, control means for controlling the operation of the adjusting means to affect adjustment of the selected one of said settable elements toward its "0" position whenever the operative settable element is positioned to represent a value of said one magnitude and toward its "10" position when positioned to represent a value of said other magnitude, and means operated by the adjustment of the selected element toward its "10" position for adjusting the adjacent higher element one step toward a higher value position.

9. A multiplier mechanism for a calculating machine which comprises a multiplier storage mechanism having a plurality of differentially settable and ordinally arranged registering elements, manual means for successively setting said elements in sequence, power-operated reversible means for adjusting a settable element forwardly to a "10" or backwardly to a "0" position, mechanism for ordinally changing the relative ordinal positions of said adjusting means and said settable elements, means responsive to the adjustment of a settable element to a "0" or a "10" position for controlling the operation of said ordinal changing mechanism, control means for controlling the operation of the reversible means to a forward direction whenever the operative settable element is positioned to represent a value of one magnitude and a backward direction when positioned to represent a value of another magnitude, a normally inoperative coupling member carried by each element for coupling that element to the adjacent higher order element, means effective when the operable element is in its "9" position for operating its coupling member to couple the operative element and the adjacent higher order element, whereby the adjustment of the operable element to its "10" position adjusts the adjacent higher order element one step toward a higher value position.

10. In a calculating machine for performing short cut multiplication having
   (1) an accumulator,
   (2) a reversible drive means for said accumulator for selectively operating the accumulator additively or subtractively,
   (3) means for shifting said accumulator relative to said drive means,
   (4) a positionable sign character control member for adjusting the drive means to operate said accumulator additively or subtractively,
   (5) power-driven means for cyclically operating said actuating means and said shifting means,
   (6) a multiplier storage mechanism having a plurality of ordinally arranged and differentially settable gear segments shiftable ordinally as a unit for controlling multiplying operations,
   (7) manual means for successively setting said elements in sequence and escaping said storage mechanism one order, and
   (8) a positive and a negative multiply key,
the combination which comprises
   (9) mechanism for shifting said differentially settable segments to bring successive segments into an operative ordinal position,
   (10) means for adjusting the segment in the operative ordinal position from a set value position backwardly to a "0" position or forwardly to a "10" position,
   (11) means responsive to the adjustment of the segment in the operative ordinal position to a "0" or a "10" position for controlling the operation of said shifting means and said shifting mechanism,
   (12) a cam arm carried by each segment having one face representative of a value of greater magnitude and a second face representative of a value of lesser magnitude,
   (13) a sensing member operable to sense a face of said cam arm,
   (14) control means operated by said sensing member for controlling the operation of the adjusting means to effect adjustment of the operative order segment toward its "0" value position whenever the sensed face represents a value of lesser magnitude and toward its "10" value position whenever the sensed face represents a value of greater magnitude,
   (15) an ear carried by said cam arm operative in the "9" value position of the segment to couple said segment to the adjacent higher order segment, whereby the adjustment of the operative order segment from its "9" to its "10" value position will adjust the adjacent higher order segment one step toward a higher value position, and
   (16) holding means associated with said segments for maintaining them in an adjusted position.

11. In a calculating machine for performing short cut multiplication having
   (1) an accumulator,
   (2) a reversible drive means for said accumulator for selectively operating the accumulator additively or subtractively,
   (3) means for shifting said accumulator relative to said drive means,
   (4) a positionable sign character control member for adjusting the drive means to operate said accumulator additively or subtractively,
   (5) power-driven means for cyclically operating said acutating means and said shifting means,
   (6) a multiplier storage mechanism having a plurality of ordinally arranged and differentially settable gear segments shiftable ordinally as a unit for controlling multiplying operations,
   (7) manual means for successively setting said elements in sequence and escaping said storage mechanism one order, and
   (8) a positive and a negative multiply key,
the combination which comprises
   (9) mechanism for shifting said differentially settable segments to bring successive segments into an operative ordinal position,
   (10) means for adjusting the segment in the operative ordinal position from a set value position backwardly to a "0" position or forwardly to a "10" position,
   (11) means responsive to the adjustment of the segment in the operative ordinal position to a "0" or a "10" position for controlling the operation of said shifting means and said shifting mechanism,
   (12) a cam arm carried by each segment having one face representative of a value of greater magnitude and a second face representative of a value of lesser magnitude,
   (13) a sensing member operable to sense a face of said cam arm,
   (14) control means operated by said sensing member for controlling the operation of the adjusting means to effect adjustment of the operative order segment toward its "0" value position whenever the sensed face represents a value of lesser magnitude and toward its "10" value position whenever the sensed face represents a value of greater magnitude,
   (15) an ear carried by said cam arm operative in the "9" value position of the segment to couple said segment to the adjacent higher order segment, whereby the adjustment of the operative order segment from its "9" to its "10" value position will adjust the adjacent higher order segment one step toward a higher value position,
(16) holding means associated with said segments for maintaining them in an adjusted position, and
(17) means operated by said sensing member for controlling the positioning of the positionable sign character control member to a position determined by the operated multiply key whenever the operative segment is positioned to represent a value of lesser magnitude and to a reverse sign character position whenever the operative segment is positioned to represent a value of greater magnitude.

References Cited in the file of this patent

UNITED STATES PATENTS

| | | |
|---|---|---|
| 1,968,201 | Hamann | July 31, 1934 |
| 2,379,877 | Britten | July 10, 1945 |
| 2,886,238 | Plunkett | May 12, 1959 |

FOREIGN PATENTS

| | | |
|---|---|---|
| 509,747 | Great Britain | July 20, 1939 |

UNITED STATES PATENT OFFICE
CERTIFICATE OF CORRECTION

Patent No. 3,090,554                                              May 21, 1963

Arthur J. Malavazos

It is hereby certified that error appears in the above numbered patent requiring correction and that the said Letters Patent should read as corrected below.

Column 4, line 32, after "thereof" insert a comma; column 11, line 13, for "presentt" read -- present --; column 14, line 48, strike out the comma, second occurrence, and insert instead -- in --; column 16, line 72, after "pinboard;" insert -- and --; column 17, line 11, after "in" insert -- the --; column 19, line 71, for "The" read -- These --; line 75, for "solt" read -- slot --; column 23, line 28, after "on" insert a comma; column 24, line 16, for "ond" read -- and --; line 46, after "297" strike out the opening parenthesis; column 25, line 58, for "526" read -- 525 --; column 26, line 20, for "oof" read -- of --; column 28, line 70, after "gears" insert -- are --; column 29, line 1, for "permits" read -- permit --; column 35, line 22, for "explaineed" read -- explained --; column 44, line 68, for "336" read -- 366 --; column 49, line 65, for "betwen" read -- between --; column 50, line 3, for "ail" read -- tail --; column 54, line 68, for "snesing" read -- sensing --; column 62, line 38, for "acutating" read -- actuating --.

Signed and sealed this 25th day of February 1964.

(SEAL)
Attest:
ERNEST W. SWIDER                         EDWIN L. REYNOLDS
Attesting Officer                          Acting Commissioner of Patents